(12) United States Patent
Locke et al.

(10) Patent No.: US 10,901,373 B2
(45) Date of Patent: Jan. 26, 2021

(54) BUILDING MANAGEMENT SYSTEM WITH ARTIFICIAL INTELLIGENCE FOR UNIFIED AGENT BASED CONTROL OF BUILDING SUBSYSTEMS

(71) Applicant: Johnson Controls Technology Company, Auburn Hills, MI (US)

(72) Inventors: Robert Locke, Sonoma, CA (US); Sudhi R. Sinha, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 157 days.

(21) Appl. No.: 16/008,885

(22) Filed: Jun. 14, 2018

(65) Prior Publication Data

US 2018/0364654 A1    Dec. 20, 2018

Related U.S. Application Data

(60) Provisional application No. 62/520,380, filed on Jun. 15, 2017.

(51) Int. Cl.

| G05B 13/02 | (2006.01) |
|---|---|
| H04L 12/28 | (2006.01) |
| F24F 11/63 | (2018.01) |
| G05B 23/02 | (2006.01) |
| G06T 19/00 | (2011.01) |
| H04L 12/26 | (2006.01) |
| H04L 12/24 | (2006.01) |

(52) U.S. Cl.
CPC ......... *G05B 13/0265* (2013.01); *F24F 11/63* (2018.01); *G05B 23/0216* (2013.01); *G06T 19/006* (2013.01); *H04L 12/2827* (2013.01); *H04L 41/046* (2013.01); *H04L 43/08* (2013.01)

(58) Field of Classification Search
None
See application file for complete search history.

(56) References Cited

U.S. PATENT DOCUMENTS

| 8,285,744 B2 | 10/2012 | Dorgelo et al. |
|---|---|---|
| 9,817,383 B1 | 11/2017 | Sinha et al. |

(Continued)

FOREIGN PATENT DOCUMENTS

WO    WO-2007/125108 A1    11/2007

OTHER PUBLICATIONS

Di Benedetto et al., Fault-Tolerant Control of a Wireless HVAC Control System, May 21, 2014, 4 pages.

(Continued)

*Primary Examiner* — Ryan A Jarrett
(74) *Attorney, Agent, or Firm* — Foley & Lardner LLP

(57) ABSTRACT

A building management system with artificial intelligence based control of a building includes data collectors are configured to receive data and generate data streams for subsystems of the building. The system includes a learning engine configured to identify a building state of the building by correlating data of the data streams for the subsystems and provide the identified building state to cognitive agents. The system includes the cognitive agents, each of the cognitive agents configured to receive the identified building state from the learning engine, generate a control decision based on the received building state, and operate at least one of the plurality of subsystems of the building to control a physical condition of the building based on the control decision.

20 Claims, 18 Drawing Sheets

(56) References Cited

U.S. PATENT DOCUMENTS

| | | |
|---|---|---|
| 10,225,216 B2 | 3/2019 | Wise et al. |
| 2013/0173062 A1 | 7/2013 | Koenig-Richardson |
| 2016/0327298 A1 | 11/2016 | Sinha et al. |
| 2017/0316061 A1 | 11/2017 | Hubauer et al. |
| 2017/0322534 A1 | 11/2017 | Sinha et al. |

OTHER PUBLICATIONS

Liu et al., An Integrated Performance Analysis Framework for HVAC System Using Heterogeneous Data Models and Building Automation Systems, Nov. 6, 2012, 8 pages.

Search Report for International Application No. PCT/US2018/037589, dated Aug. 7, 2018, 17 pages.

BUILDING MANAGEMENT SYSTEM WITH ARTIFICIAL INTELLIGENCE FOR UNIFIED AGENT BASED CONTROL OF BUILDING SUBSYSTEMS

CROSS-REFERENCE TO RELATED PATENT APPLICATION

This application claims the benefit of and priority to U.S. Provisional Patent Application No. 62/520,380 filed Jun. 15, 2017, the entire disclosure of which is incorporated by reference herein.

BACKGROUND

The present disclosure relates generally to a building management system (BMS). The present disclosure relates more particularly to methods and apparatus for providing automated control of a BMS using artificial intelligence.

A BMS is, in general, a system of devices configured to control, monitor, and manage equipment in or around a building or building area. Buildings, such as commercial buildings, typically have a variety of systems installed. The systems are used to manage the security, fire, access control, video surveillance, and environmental factors that relate to the building and the occupants thereof. Such systems may each perform discrete operations. Such discrete operations may be scripted and in some instances could cause unwanted situations due to the predefined nature of the programmed actions.

Thus, there is a need for a unified building management system that has cognitive access to all of the disparate building systems and can intelligently (e.g. using artificial intelligence (AI)), and dynamically react to changing situational data in order to more effectively control those systems and create a safer and more efficient building environment. It would also be desirable to have a mechanism for the BMS to convey relevant operational information of each of the constituent systems to a building owner or manager.

SUMMARY

One implementation of the present disclosure is a building management system with artificial intelligence based control of a building. The system includes a processing system including one or more processing circuits and one or more non-transitory memory devices, wherein the processing system is configured to implement data collectors, a learning engine, and one or more cognitive agents. The data collectors are configured to receive data from subsystems of the building and generate data streams based on the received data, wherein a data stream of the data streams is associated with each of the subsystems of the building. The learning engine is configured to identify a building state of the building by correlating data of the data streams for the subsystems and provide the identified building state to the one or more cognitive agents. Each of the one or more cognitive agents is configured to receive the identified building state from the learning engine, generate a control decision based on the received building state, and operate at least one of the subsystems of the building to control a physical condition of the building based on the control decision.

In some embodiments, each of the one or more cognitive agents is configured to generate the control decision based on the received building state by generating the control decision with a reactive operator. The reactive operator is unique to a type of building subsystem associated with each of the one or more cognitive agents.

In some embodiments, the building state of the building is an emergency state indicating that the building is experiencing an emergency.

In some embodiments, the learning engine is configured to identify the building state of the building by correlating data from the data streams for the subsystems by extracting one or more features from the data streams. The one or more features include a portion of the data of the data streams, and the extracted features are transformed. The building state can be correlated by the transformed extracted features.

In some embodiments, data streams include an augmented reality data stream of an augmented reality system. In some embodiments, the learning engine is configured to identify a building component of interest to the user based on the augmented reality data stream, extract one or more features from the data streams of the subsystems, the extracted one or more features being associated with the building component of interest, determine, based on the one or more extracted features, a reason that the building component is of interest to the user, and provide the reason to the augmented reality system, wherein the augmented reality system is configured to present the reason to the user.

In some embodiments, the processing system is configured to implement a prioritization engine. In some embodiments, the prioritization engine is configured to generate a prioritization module for each of the one or more cognitive agents and send the prioritization module of each of the one or more cognitive agents to the one or more cognitive agents. In some embodiments, the one or more cognitive agents are configured to determine whether to override an operation of a particular subsystem of the subsystems based on the prioritization module and data of the particular subsystem or the building state.

In some embodiments, the data streams include a natural language data stream of a natural language input system. In some embodiments, wherein the learning engine is configured to determine, based on the natural language data stream, a particular state of interest to a user, wherein the particular state of interest includes a building draft state indicating that the building is experiencing an air draft and provide the building draft state to each of the one or more cognitive agents.

In some embodiments, one of the one or more cognitive agents is associated with a security subsystem of the subsystems, wherein the one of the one or more cognitive agents associated with the security subsystem is configured to determine, based on data of the security subsystem, whether one or more doors or windows are open in response to a reception of the building draft state. In some embodiments, one of the one or more cognitive agents is associated with an HVAC subsystem of the subsystems, wherein the one of the one or more cognitive agents associated with the HVAC subsystem is configured to determine, based on data of the HVAC subsystem, whether a damper of the HVAC subsystem is stuck in response to receiving the draft likely state.

In some embodiments, the subsystems include a fire detection subsystem, a video surveillance subsystem, and a heating, ventilation, and air conditioning (HVAC) subsystem. In some embodiments, the learning engine is configured to identify the building state of the building by correlating data of a data stream of the fire detection subsystem, a data stream of the video surveillance subsystem, and a data stream of the HVAC subsystem, wherein the building state is a fire state indicative of a fire in the building. In some embodiments, each of the one or more cognitive agents is configured to control the fire in the building in response to a reception of the fire state.

In some embodiments, each of the one or more cognitive agents is configured to generate a particular control decision based on the fire state by determining the particular control decision based on reactive operators, the reactive operators including a reactive operator for each of the one or more cognitive agents. In some embodiments, the one or more reactive operators include a first reactive operator that generates the particular control decision for the HVAC subsystem, the particular control decision for the HVAC subsystem causing the HVAC subsystem to operate to reduce an oxygen level of an unoccupied area of the building. In some embodiments, the one or more reactive operators include a second reactive operator that generates the particular control decision for the HVAC subsystem, the particular control decision for the HVAC subsystem causing the HVAC subsystem to operate to exhaust smoke from exit routes of the building. In some embodiments, the one or more reactive operators include a third reactive operator that generates the particular control decision for a human-machine interaction system, the particular control decision for the human-machine interaction system causing the human-machine interaction system to provide occupants of the space with details regarding the exit routes.

In some embodiments, the building state is a fire state, wherein one of the one or more cognitive agents is associated with dampers of the HVAC subsystem. In some embodiments, the one of the one or more cognitive agents is configured to receive a humidity value of outdoor air outside the building, wherein the humidity value is measured by the HVAC subsystem, determine whether the humidity value of outdoor air is greater than a predefined threshold, generate a control decision to open dampers in an area of a building associated with the fire in response to a determination that the humidity value of outdoor air is greater than the predefined threshold and in response to a reception of the fire state, and operate the dampers to open the dampers based on the control decisions to open the dampers.

Another implementation of the present disclosure is a method for controlling a building with artificial intelligence. The method includes receiving, by data collectors, data from subsystems of the building and generating, by the data collectors, data streams based on the received data, wherein a data stream of the data streams is associated with each of the subsystems of the building. The method includes identifying, by a learning engine, a building state of the building by correlating data of the data streams for the subsystems and providing, by the learning engine, the identified building state to one or more cognitive agents. The method includes receiving, by each of the one or more cognitive agents, the identified building state from the learning engine, generating, by each of the one or more cognitive agents, a control decision based on the received building state, and operating, by each of the one or more cognitive agents, at least one of the subsystems of the building to control a physical condition of the building based on the control decision.

In some embodiments, generating, by each of the one or more cognitive agents, the control decision based on the received building state includes generating the control decision with a reactive operator, wherein the reactive operator is unique to a type of building subsystem that each of the one or more cognitive agents is associated with.

In some embodiments, the building state of the building is an emergency state indicating that the building is experiencing an emergency.

In some embodiments, the data streams include an augmented reality data stream of an augmented reality system. In some embodiments, the method includes identifying, by the learning engine, a building component of interest to the user based on the augmented reality data stream, extracting, by the learning engine, one or more features from the data streams of the subsystems, the extracted one or more features being associated with the building component of interest, determining, by the learning engine, based on the one or more extracted features, a reason that the building component is of interest to the user, and providing, by the learning engine, the reason to the augmented reality system, wherein the augmented reality system is configured to present the reason to the user.

In some embodiments, the subsystems include a fire detection subsystem, a video surveillance subsystem, and a heating, ventilation, and air conditioning (HVAC) subsystem. In some embodiments, identifying, by the learning engine the building state of the building includes correlating data of a data stream of the fire detection subsystem, a data stream of the video surveillance subsystem, and a data stream of the HVAC subsystem, wherein the building state is a fire state indicative of a fire in the building. In some embodiments, the method further includes controlling, by each of the one or more cognitive agents, the fire in the building in response to a reception of the fire state by generating a particular control decision based on the fire state by determining the particular control decision based on one of the reactive operators, the reactive operators including a reactive operator for each of the one or more cognitive agents. In some embodiments, the reactive operators include a first reactive operator that generates the particular control decision for the HVAC subsystem, the particular control decision for the HVAC subsystem causing the HVAC subsystem to operate to reduce an oxygen level of an unoccupied area of the building, a second reactive operator that generates the particular control decision for the HVAC subsystem, the particular control decision for the HVAC subsystem causing the HVAC subsystem to operate to exhaust smoke from exit routes of the building, and a third reactive operator that generates the particular control decision for a human-machine interaction system, the particular control decision for the human-machine interaction system causing the human-machine interaction system to provide occupants of the space with details regarding the exit routes.

In some embodiments, data streams include a natural language data stream of a natural language input system. In some embodiments, the method further includes determining, by the learning engine, based on the natural language data stream, a particular state of interest to a user, wherein the particular state of interest includes a building draft state indicating that the building is experiencing an air draft and providing, by the learning engine, the building draft state to each of the one or more cognitive agents.

In some embodiments, one of the one or more cognitive agents is associated with a security subsystem of the subsystems. In some embodiments, one of the one or more cognitive agents is associated with an HVAC subsystem of the subsystems. In some embodiments, the method further includes determining, by the one of the one or more cognitive agents associated with the security subsystem, based on data of the security subsystem, whether one or more doors or windows are open in response to a reception of the building draft state and determining, by the one or more cognitive agents associated with the HVAC subsystem based on data of the HVAC subsystem, whether a damper of the HVAC subsystem is stuck in response to receiving the draft likely state.

Another implementation of the present disclosure is a building management system with artificial intelligence based control of a building. The system includes a processing circuit configured to implement data collectors, a learning engine, and one or more cognitive agents. The data collectors are configured to receive data from subsystems of the building and generate data streams based on the received data, wherein a data stream of the data streams is associated with each of the subsystems of the building. The learning engine is configured to identify a building state of the building by correlating data of the data streams for the subsystems, wherein the building state of the building is an emergency state indicating that the building is experiencing an emergency and provide the identified emergency state to the one or more cognitive agents. Each of the one or more cognitive agents is configured to receive the identified emergency state from the learning engine, generate a control decision based on the received emergency state for responding to the emergency that the building is experiencing, and operate at least one of the subsystems of the building to control a physical condition of the building based on the control decision.

In some embodiments, each of the one or more cognitive agents is configured to generate the control decision based on the received emergency state by generating the control decision with a reactive operator, wherein the reactive operator is unique to a type of building subsystem that each of the one or more cognitive agents is associated with.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
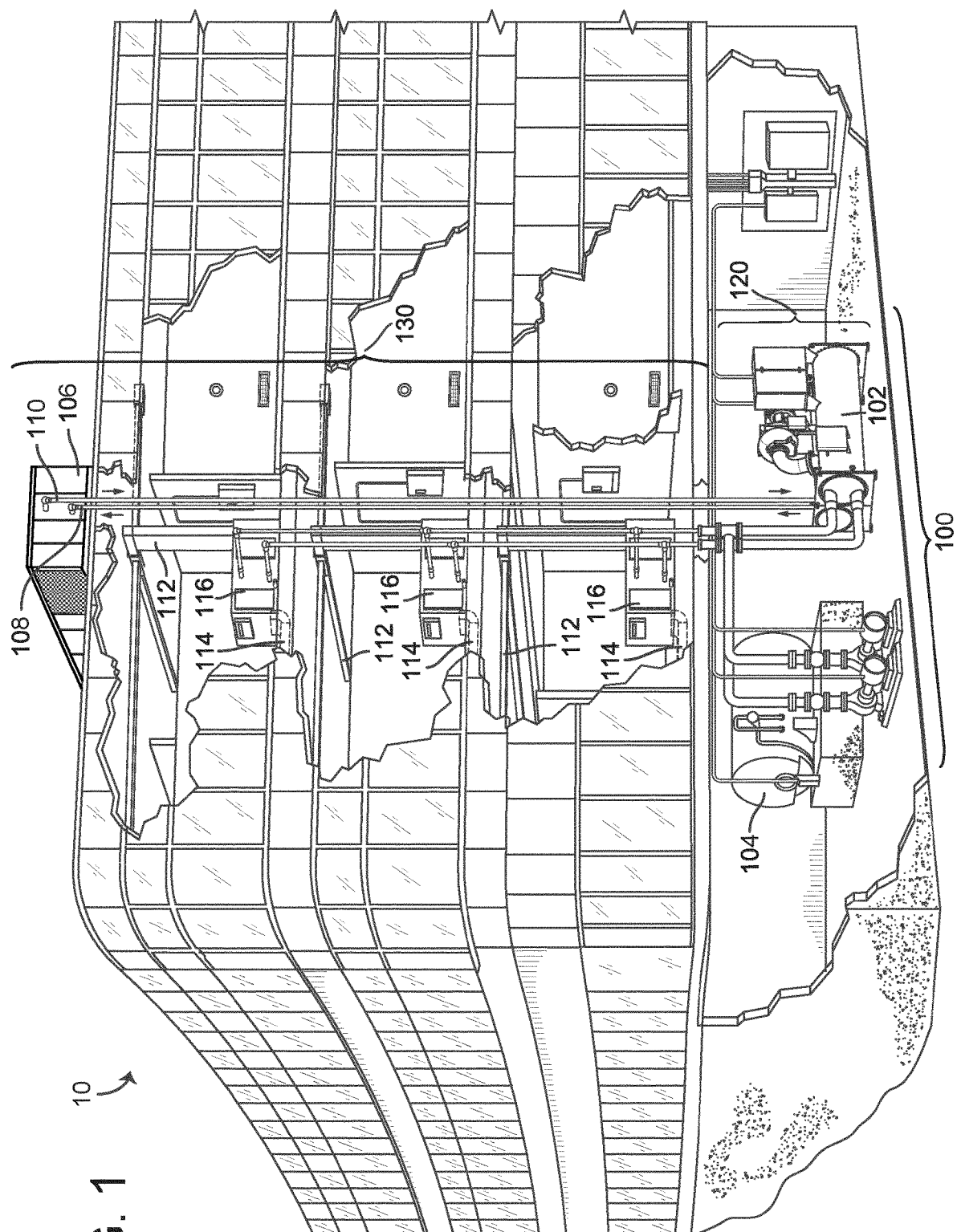
FIG. 1 is a schematic perspective view drawing of a building equipped with a building management system (BMS) and a HVAC system, according to an exemplary embodiment.

Referring generally to the FIGURES, a building management systems (BMS) using artificial intelligence for unified agent based control of a building with data of multiple different building systems is shown, according to various exemplary embodiments. The unified BMS can use artificial intelligence methodologies to intelligently and dynamically react to changing situational data in order to more effectively control multiple disparate systems to provide a safer and more efficient building environment. For example, the unified BMS can have the ability to interact with heating, ventilating and air conditioning (HVAC) systems, intrusion detection systems, access control systems, video surveillance systems, fire detection systems, fire suppression systems, elevator systems, escalator systems, lighting systems, backup power systems, and other systems within a building.

The disparate systems may each generate a stream of data based on one or more individual sensors and the status of operational conditions. The data streams can be transmitted to and understood by the BMS. The BMS may be located on the premises, or alternatively could be an application that operates in a cloud environment, as will be described below. Where the BMS operates in a cloud environment, the data from the individual systems is transmitted to the cloud environment for storage wherein the BMS can access and evaluate the data. The BMS can use the received data to generate a method of operation for each of the disparate systems. The method of operation may take into consideration the current state of the disparate building systems individually, and the overall current state of the building itself (e.g., the individual building systems collectively).

Moreover, such a system can also incorporate additional data from external sources such as weather, crime statistics, and the like in order to further enhance the operational decisions being made. Additionally, the BMS can implement artificial intelligence methodologies and systems in order to dynamically evaluate all of the above mentioned data, combine it with knowledge of historical system data and an understanding of the operation of the overall systems, to automatically generate improved and/or optimum control inputs to each of the disparate building systems. The artificial intelligence methods can also allow the BMS system to determine correlations between the system data and operations that can yield beneficial operating models for each system and create synergistic results.

Example synergistic results can include the BMS assisting building occupants in evacuating a building during a fire or other event. The artificial intelligence methods can use the location of the fire, as determined by the fire detection system to determine the possible evacuation routs that could be used by the occupants that are closest to the fire. The system can then use stored knowledge of the size of the hallways within the building to determine how many people are should to try and evacuate the building through a particular route. The system may then communicate other evacuation options to the evacuating occupants, and unlock appropriate doors, re-directed escalators or elevators, and use the HVAC system to redirect smoke or fumes with the overall goal of getting the occupants to safety as quickly as possible. These operations require artificially intelligent evaluation of data from the disparate building systems, predictive analysis using the artificial intelligence, and control of all the disparate building systems in a synergistic manner in order to achieve the desired result.

Systems and methods for agent-based BMS systems are further described in U.S. patent application Ser. No. 15/367,167, now U.S. Pat. No. 9,817,383, filed Dec. 1, 2016, U.S. patent application Ser. No. 15/586,104 filed May 3, 2017, and U.S. patent application Ser. No. 15/968,278 filed May 1, 2018 the contents of which are incorporated herein in their entireties.

Building Management System and HVAC System

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and any other system that is capable of managing building operations or devices, or any combination thereof.

The BMS that serves building 10 includes an HVAC system 100. HVAC system 100 can include HVAC devices (e.g., heaters, chillers, air handling units, pumps, fans, thermal energy storage, etc.) configured to provide heating, cooling, ventilation, or other services for building 10. For example, HVAC system 100 can include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 can include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination thereof. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 can include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
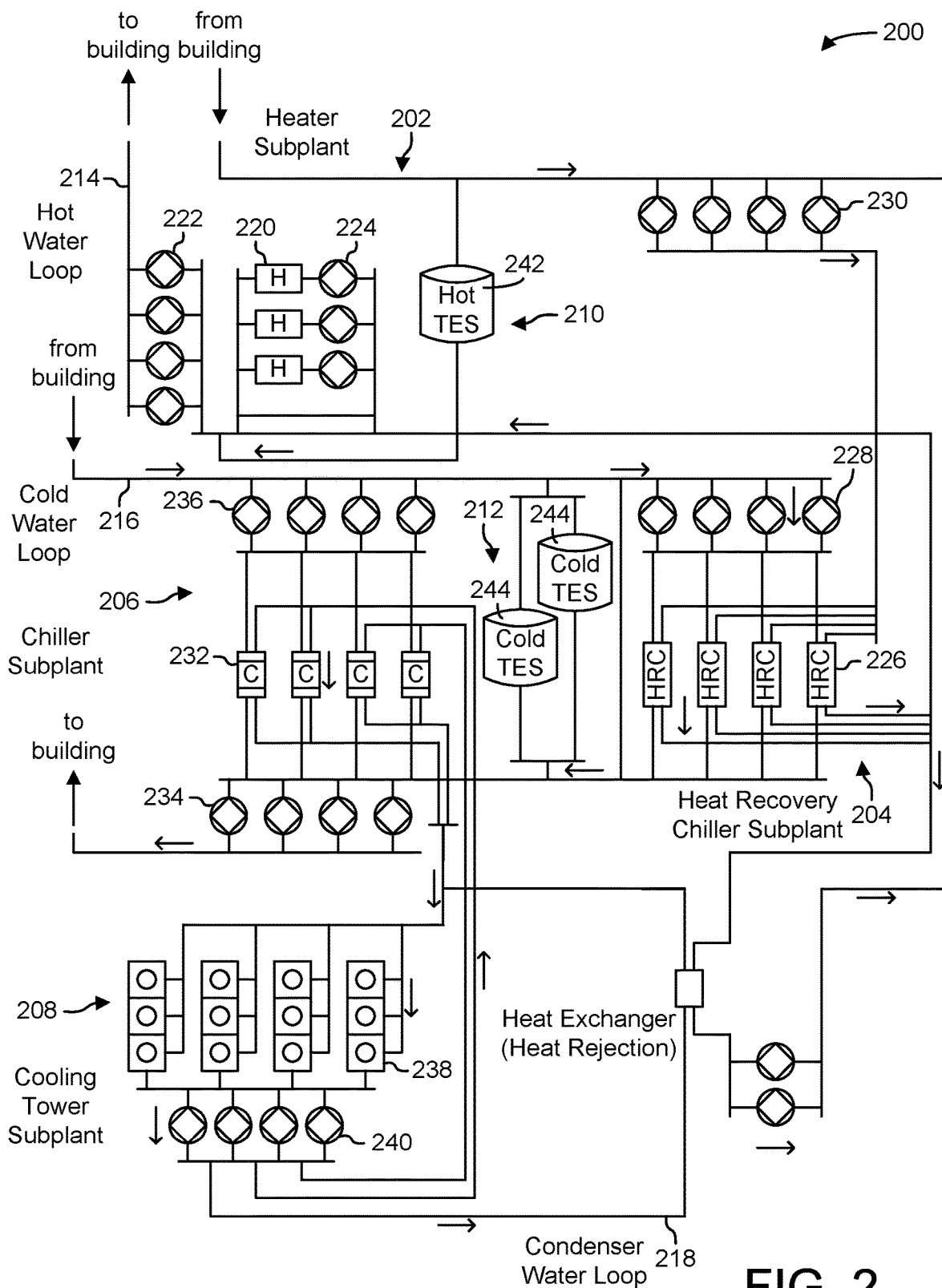
FIG. 2 is a schematic drawing of a waterside system which can be used as part of the HVAC system of FIG. 1, according to an exemplary embodiment.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the operation of the subplant. For example, heater subplant 202 can include heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 can include chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 can include heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 can include cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 can include a hot TES tank 242 configured to store the hot water for later use. Hot TES subplant 210 can also include one or more pumps or valves configured to control the flow rate of the hot water into or out of hot TES tank 242. Cold TES subplant 212 can include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
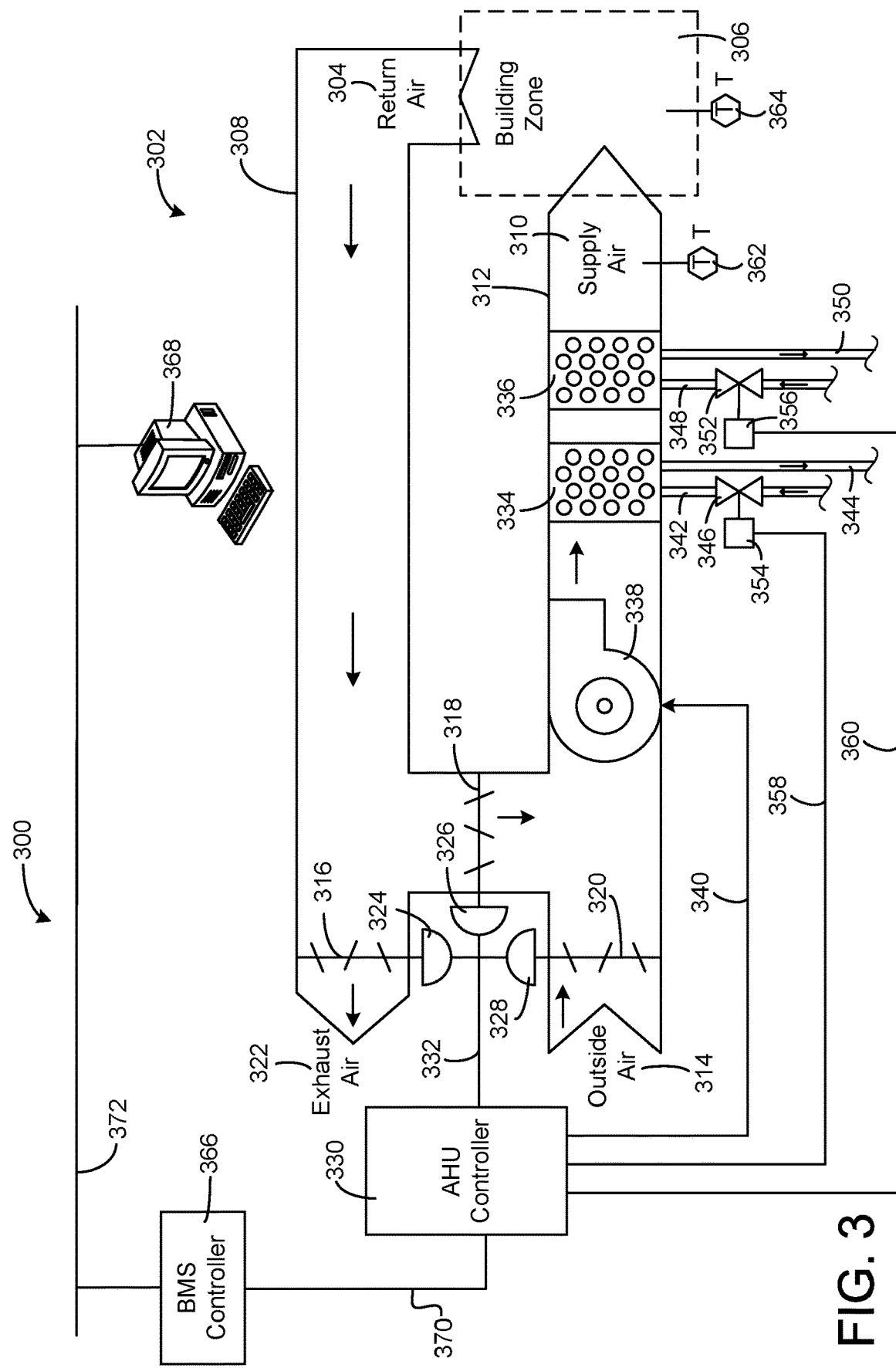
FIG. 3 is a block diagram of an airside system which can be used as part of the HVAC system of FIG. 1, according to an exemplary embodiment.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of thereof.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
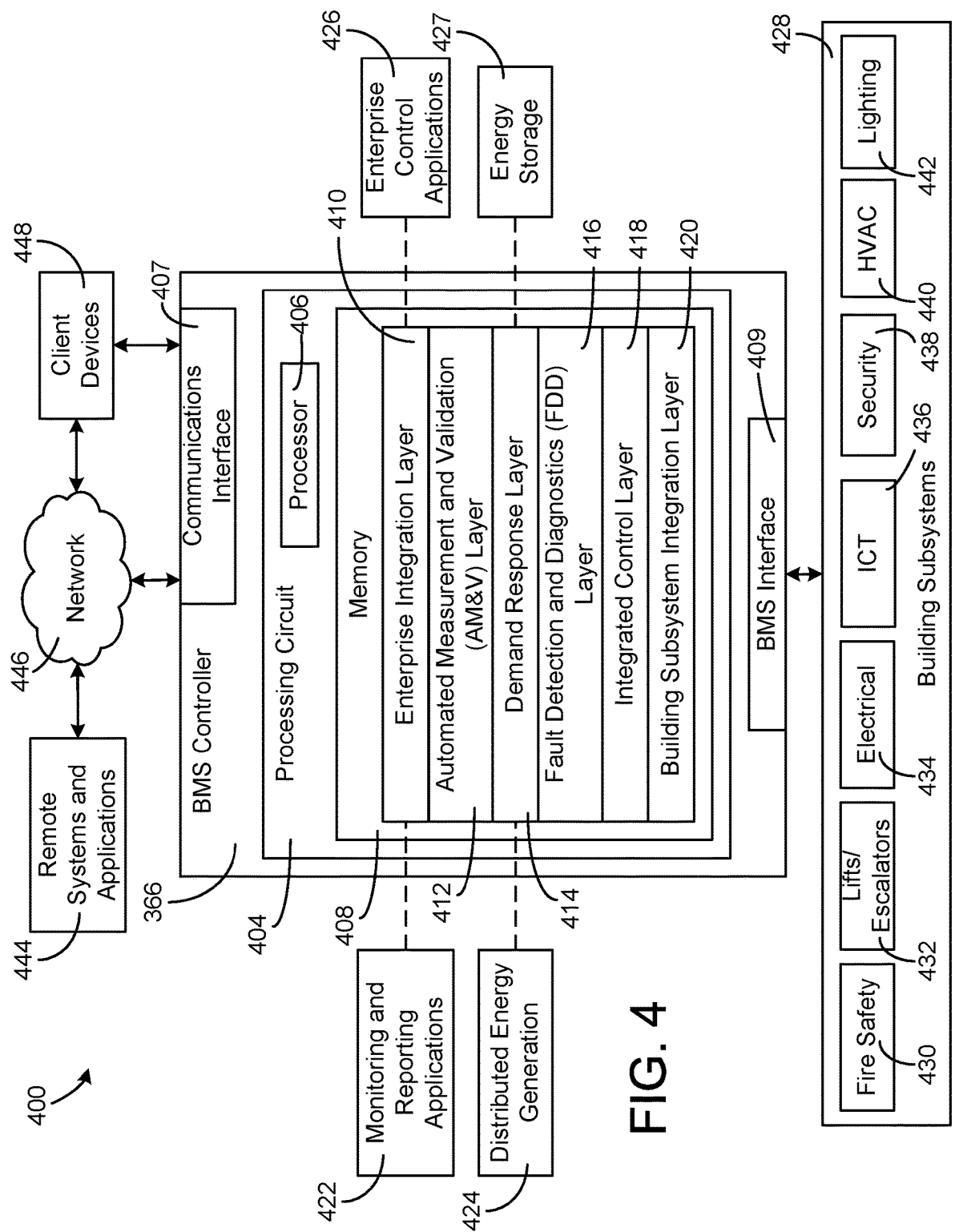
FIG. 4 is a block diagram of a BMS which can be used in the building of FIG. 1, according to an exemplary embodiment.

Referring now to FIG. 4, a block diagram of a building management system (BMS) 400 is shown, according to an exemplary embodiment. BMS 400 can be implemented in building 10 to automatically monitor and control various building operations. BMS 400 can include BMS controller 366 and building subsystems 428. Building subsystems 428 includes a building electrical subsystem 434, an information communication technology (ICT) subsystem 436, a security subsystem 438, a HVAC subsystem 440, a lighting subsystem 442, a lift/escalators subsystem 432, and a fire safety subsystem 430 in some embodiments. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual operations and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In some embodiments, communications interface 407 is a power line communications interface and BMS interface 409 is an Ethernet interface. In other embodiments, both the communications interface 407 and the BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine improved and/or optimal control actions for building subsystems 428 based on the inputs, generate control signals based on the improved and/or optimal control actions, and provide the generated control signals to building subsystems 428. The following paragraphs describe some of the general operations performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to improve and/or optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translates communications (e.g., sensor data, input signals, output signals, etc.) across multi-vendor/multi-protocol systems.

Demand response layer 414 can be configured to improve and/or optimize resource usage (e.g., electricity use, natural gas use, water use, etc.) and/or the monetary cost of such resource usage in response to satisfy the demand of building 10. The improvement and/or optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an improved and/or optimal set of control actions. The equipment models can include, for example, thermodynamic models describing the inputs, outputs, and/or operations performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

BMS Control Via Agents and Artificial Intelligence

Figure 5:
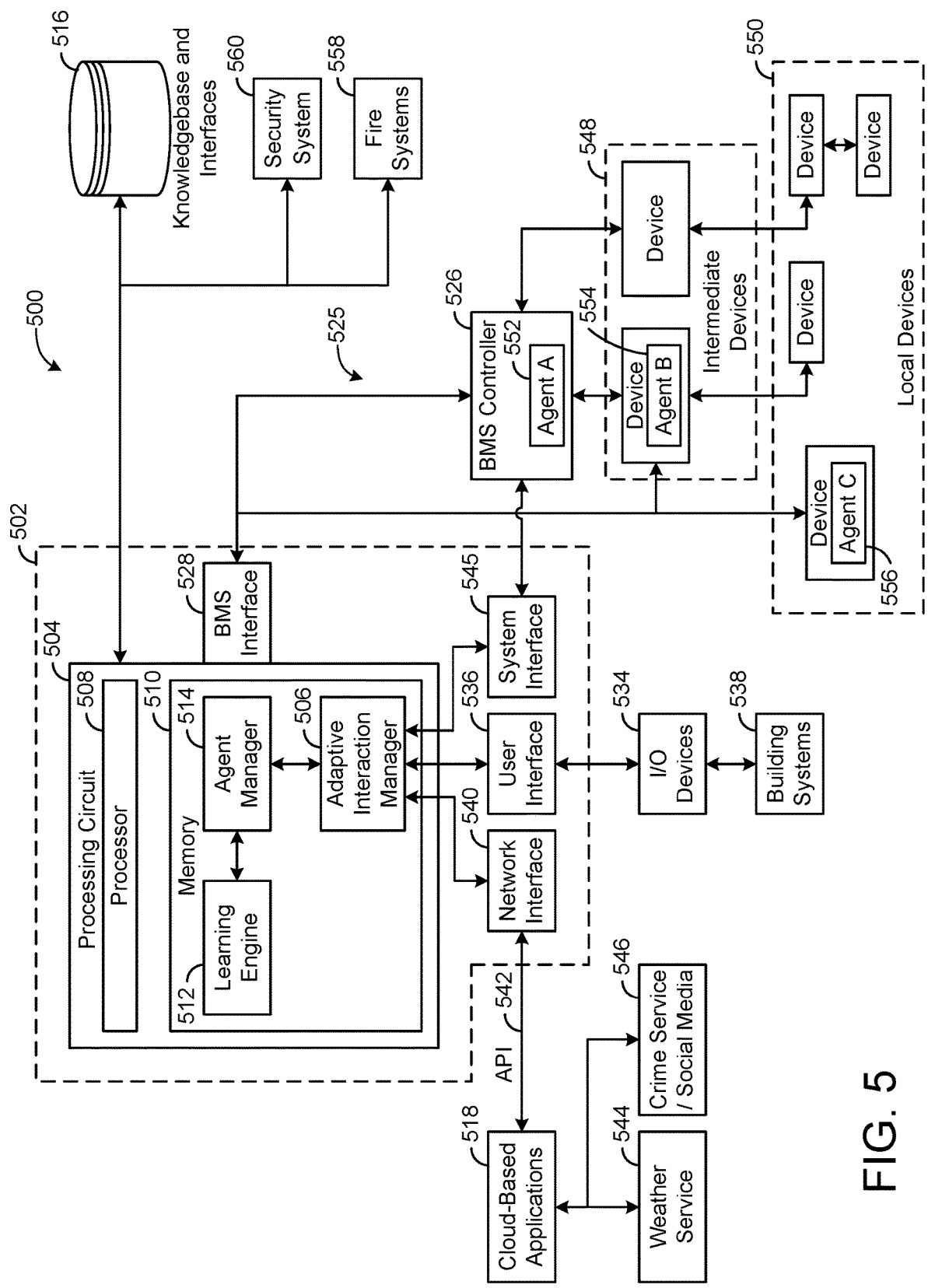
FIG. 5 is a block diagram illustrating an adaptive agent based control system including multiple agents and a learning engine, according an exemplary embodiment.

Referring now to FIG. 5, a block diagram illustrating a unified agent based building control system 500 is shown, according to an exemplary embodiment. The system 500 may be any of the BMS systems described herein, for example, can be implemented in the building 10 as described with reference to FIG. 1 and can include the heating, cooling, security, and other components and subsystems as described with reference to FIGS. 1-4. Further, the system 500 may be a peer-to-peer (P2P) network, such as a Verisys system from Johnson Controls. The system 500 may include a controller 502. The controller 502 may be a dedicated controller within a BMS. In some embodiments, the controller 502 is a cloud based server (e.g., an Internet based server). For example, the controller 502 may be physically located in one or more server farms and accessible via an Internet connection. In some examples, the controller may be a standalone device in a peer-to-peer (P2P) network, such as a Verisys system from Johnson Controls. The controller 502 may include a processing circuit 504 including an adaptive interaction manager 506. The processing circuit 504 may include a processor 508 and a memory 510. The processor 508 may be a general purpose or specific purpose processor, an application specific integrated circuit (ASIC), one or more field programmable gate arrays (FPGAs), a group of processing components, or other suitable processing components. The processor 508 is configured to execute computer code or instructions stored in the memory 510 or received from other computer readable media (e.g., CDROM, network storage, a remote server, etc.).

The memory 510 may include one or more devices (e.g., memory units, memory devices, storage devices, etc.) for storing data and/or computer code for completing and/or facilitating the various processes described in the present disclosure. The memory 510 may include random access memory (RAM), read-only memory (ROM), hard drive storage, temporary storage, non-volatile memory, flash memory, optical memory, or any other suitable memory for storing software objects and/or computer instructions. The memory 510 may include database components, object code components, script components, or any other type of information structure for supporting the various activities and information structures described in the present disclosure. The memory 510 may be communicably connected to the processor 508 via the processing circuit 504 and may include computer code for executing (e.g., by the processor 508) one or more processes described herein. When the processor 508 executes instructions stored in the memory 510, the processor 508 generally configures the processing circuit 504 to complete such activities.

The memory 510 may include the adaptive interaction manager 506, a learning engine 512 and an agent manager 514. The learning engine 512 may be used to generate and access historical information, user feedback information, etc. In some embodiments, the learning engine 512 may access a database 516 via the processing circuit 504. The database 516 may include data relating to one or more BMS, such as building layouts, system schematics, device information, control schemes, environmental ratings, historical data, etc. In some embodiments, the database 516 includes contextual information. The contextual information may include dictionaries, historical data, scripts, and/or other data for interpreting contextual information. The database 516 may further include a knowledgebase, which may include previous commands, user responses, generated outputs, device information, agent specific learning, etc. In some embodiments, the database 516 includes entity and/or time-series data as is described with reference to FIGS. 10-14.

The database 516 may further include one or more inferences. The inferences may include contextual inferences, historical inferences, etc. In some embodiments, the learning engine 512 may provide the inferences to the database 516. The learning engine 512 may further update the inferences, as well as other data, of the database 516 over time. The learning engine 512 may further access data within the database 516 to aid in the generation of agents, as will be discussed below. The database 516 may further include one or more universal truths associated with the system 500. In some embodiments, the universal truths may be associated with one or more BMS controllers or devices within the system 500. In some embodiments, the universal truths may be arranged in a universal truth table, which may be populated with universal truths for a given system, such as the system 500. Example universal truths may include a defined communication scheme between BMS devices and/or controllers.

In some embodiments, the adaptive interaction manager 506 provides communication between one or more I/O devices 534, one or more cloud-based applications 518, the processing circuit 504 and one or more devices, such as the BMS controller 526. The adaptive interaction manager 506 can include a user interface 536 for communicating with the one or more I/O devices 534. In some embodiments, the user interface 536 may be a wireless interface such as cellular (3G, 4G, LTE, CDMA, etc.), Wi-Fi, Zigbee, Bluetooth, RF, LoRa, etc. Additionally, the user interface 536 may include other wired interfaces such as USB, Firewire, Lightning Connectors, CAT5 (wired Internet), UART, serial (RS-232, RS-485), etc. The I/O devices 534 may be any device capable of communicating to the adaptive interaction manager 506, as well as providing a device for a user to interface with the system 500. The I/O devices 534 may include personal computing devices such as smart phones (iPhone, Android phone, Windows phone), tablet computers (e.g., an iPad, an Android Tablet, and Windows Surface, etc.), laptop computers, and/or desktop computers. The I/O devices 534 may further include a stand-alone device such as an Amazon Echo, a non-mobile device such as a voice capable thermostat, identification card readers, video cameras, fire detection devices, and the like.

The adaptive interaction manager 506 is configured to communicate with the cloud-based applications 518 via a network interface 540 in some embodiments. The network interface 540 may be an Internet based interface, such as Wi-Fi, CAT5, cellular (3G, 4G, LTE, CDMA, etc.), etc. However, other interfaces, such as Zigbee, Bluetooth, RF, LoRa, etc., are also considered. In some embodiments, the adaptive interaction manager 506 is configured to communicate with the cloud-based applications 518 via one or more APIs 542. In some embodiments, the APIs 542 are proprietary APIs for interfacing the adaptive interaction manager 506 with the cloud-based applications 518. In one example, the APIs 542 can be web hosted APIs provided by a third party provider, such as Amazon Cloud Services, Google, Apple, Microsoft, etc. In some embodiments, the APIs 542 interface with a proprietary voice recognition application, such as a voice recognition application from Johnson Controls. In other examples, the APIs 542 can interface with gesture recognition APIs, such as those from Johnson Controls. Further examples of possible APIs 542 can include enterprise resource planning (ERP), or other enterprise management software APIs for interfacing with a company or facility enterprise system (e.g. a SAP). Other possible APIs 542 may include e-mail and/or calendaring interface APIs, for interfacing with an e-mail/calendaring system such as Microsoft Outlook, Apple Mail, Google Gmail, Lotus Notes, etc.

In some embodiments, the APIs 542 interface with the cloud-based applications 518. The cloud-based applications 518 may be supplied by third parties. For example, the cloud-based applications 518 may include voice to text applications, such as Amazon Voice Services, Google Voice, Apple's Siri, or Microsoft's Cortana. The cloud-based applications 518 may further include gesture recognition applications such as those used by Microsoft Kinect. Further, other cloud-based applications 518 can include personal assistant applications such as Apple's Siri, and Microsoft's Cortana. By utilizing one or more cloud-based applications on a remote server, the system 500 can leverage more sophisticated and powerful contextual data processing technology than would be applicable to install on an individual server, system, or device. In some embodiments, cloud based voice recognition applications can provide 95% natural voice recognition accuracy. In other embodiments, the cloud-based applications 518 may include a weather service module 544, and a crime reporting module 546.

The weather service module 544 may provide weather information to the controller 502, and specifically to the learning engine 512. In some embodiments, the learning engine 512 may subscribe to one or more data feeds provided by the weather service module 544. The weather service module 544 may be configured to provide weather data to the learning engine 512, such as temperature, expected cloud cover, expected weather (e.g. rain, snow, high winds, etc.), humidity, dew point, and the like. Similarly, the crime reporting module 546 may provide various crime data to the learning engine 512. Crime data may include police calls, arrests within a geographical area, crime types (e.g. burglary, robbery, assault, etc.), crime patterns, and the like. While the weather service module 544 and the crime reporting module 546 are described above, it is contemplated that other data services may be provided by the cloud-based applications 518, such as traffic data, construction information, etc.

The adaptive interaction manager 506 is configured to communicate with one or more systems or devices associated with a facility or building in some embodiments. For example, the systems and devices can be or can include a BMS controller 526. The adaptive interaction manager 506 may communicate with the system via a system interface 545. The system interface 545 may be a serial interface, such as RS-232 or RS-485. In some embodiments, the system interface 545 is a UART interface. In still other examples, the system interface 545 may be a wireless interface such as cellular, Wi-Fi, Zigbee, Bluetooth, RF, LoRa, etc. Additionally, the system interface 545 may include other wired interfaces such as USB, Firewire, Lightning Connectors, CAT5 (wired Internet), etc. While FIG. 5 shows the adaptive interaction manager 506 communicating with a BMS controller 526 of the system 500, the adaptive interaction manager 506 may communicate with any device associated with the BMS 525. For example, the adaptive interaction manager 506 may be able to interface with the BMS controller 526, one or more intermediate devices 548, and/or one or more local devices 550. Example intermediate devices may include device controllers, sub-system controllers, RTUs, AHUs, security systems, fire suppression systems, door control systems, elevator control systems, escalator controls, etc. Example local devices may include thermostats, valves, switches, actuators, video cameras, door locks, fire alarms, motion sensors, occupancy sensor, and the like. In some embodiments, the system interface 545 may communicate with the BMS controller 526 via a network connection, such as a BACnet network connection. However, other networks, such as Ethernet, Local Area Network, etc., are also considered. Both the intermediate devices 548 and/or the local devices 550 can include a processing circuit e.g., the processing circuit 504. In some embodiments, the agents 552-556 operate via the processing circuit of the intermediate devices 548 and/or the local devices 550.

The BMS controller 526 may include one or more BMS controller agents 552. In some embodiments, the BMS controller 526 can communicate with the controller 102 via BMS interface 528 which may be the same and/or similar to BMS interface 409 as described with reference to FIG. 4. Similarly, the intermediate devices 548 may include intermediate device agents 554, and the local devices 550 may include local device agents 556. The agents may be adaptable computer programs capable of performing one or more tasks within their associated device. The agents may be used to process data, control one or more devices, provide communication between devices and/or other agents, and the like. The agents will be described in more detail below.

The adaptive interaction manager 506 may further interact with other systems associated with the BMS 525. Example system may include a fire systems 558 (e.g., a fire detection and/or suppression system), a security system 560, etc. Via the BMS 525, the fire systems 558, the security system 560, and/or other systems may all provide data to the adaptive interaction manager 506, which can process the information. In some embodiments, the fire systems 558, the security system 560, and/or other systems may provide contextual data to the adaptive interaction manager 506. In some embodiments, the adaptive interaction manager 506, via the system interface 545, communicates with the one or more systems or devices using one or more network connections.

For example, the network connections may include a wired connection to the Internet. However, other network connections are contemplated such as wireless connections such as cellular, Wi-Fi, Zigbee, Bluetooth, RF, LoRa, etc. Additionally, other network connections such as serial connections (RS-485, RS-232, USB), or other connections such as Firewire, Lightning Connectors, etc. may be used.

The fire systems 558 may include multiple elements associated with a facility or building fire detection and suppression system. For example, the fire systems 558 may include multiple devices such as thermal sensors, smoke detectors, heat sensors, alarm controls, pull stations, sprinkler systems, dry chemical systems (e.g. Halon), emergency lighting, and the like. In some embodiments, the fire systems 558 provide data to the adaptive interaction manager 506. The data may include occupancy data, detected or suspected fire events, evacuation routes, building layouts, sprinkler or dry chemical levels or pressures, etc.

The security system 560 may include multiple elements associated with a facility or building security system. For example, the security system 560 can include multiple devices such as cameras, microphones, motion detectors, thermal sensors, access devices (e.g., RFID locks, biometric locks, etc.), entry logs, etc. In some embodiments, the security system 560 provides data to the adaptive interaction manager 506. The data may include occupancy data provided by the motion detectors and/or thermal sensors. Further, the data may include video and/or digital images provided by the cameras. In some embodiments, the digital images may be provided to the cloud-based application 518 for processing via the adaptive interaction manager 506.

Figure 6A:
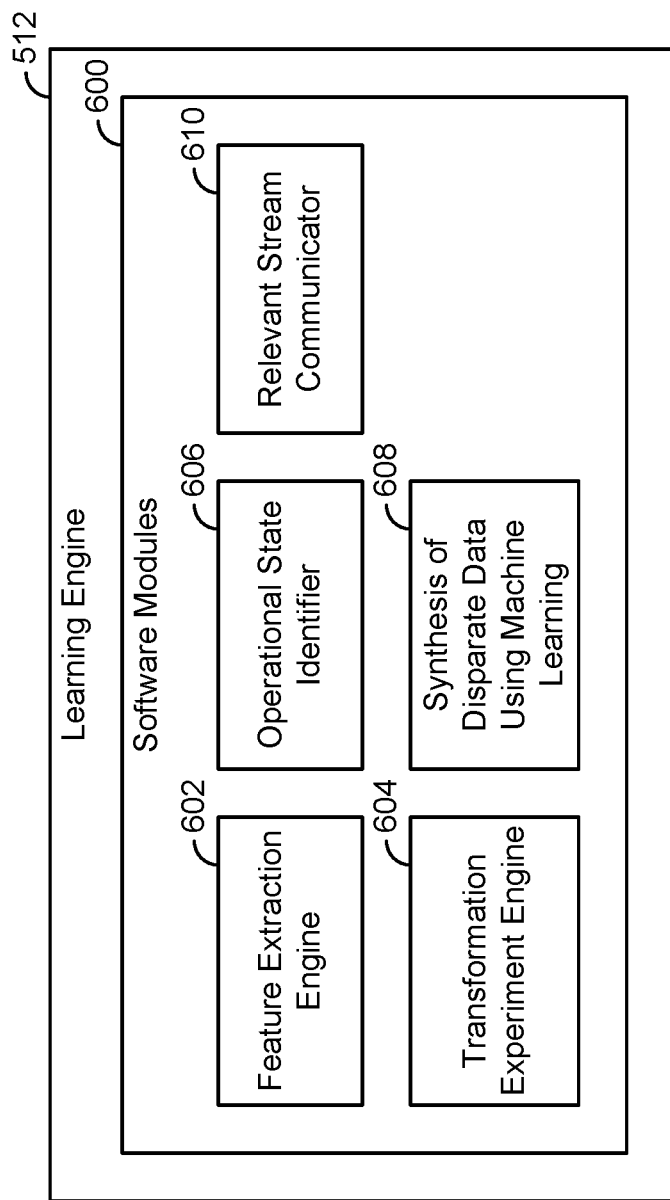
FIG. 6A is a block diagram illustrating the learning engine of FIG. 5 in greater detail, according to an exemplary embodiment.

Referring now to FIG. 6A, a block diagram showing a detailed view of the learning engine 512 is shown, according to an exemplary embodiment. The learning engine 512 may include a number of software modules 600. The software modules are shown to include a feature extraction engine 602, a transformation experiment engine 604, an operational state identifier 606, a synthesis of disparate data using machine learning module 608, and a relevant stream communicator 610. In some embodiments, the learning engine 512 is configured to communicate with the agent manager 514 to provide data for generating and managing one the software agents 552, 554, and 556 of FIG. 5. The learning engine 512 may further be configured to use feature extraction and transformation to correlate data from multiple data streams and to identify operational states of one or more device that are not necessarily discernable from existing point information from devices within the BMS. The learning engine may be further configured to observe the identification of the identified operational states and to provide the newly identified operational state to multiple cognitive agents, e.g., the agents 552, 554, and 556 of FIG. 5.

The feature extraction engine 602 may be configured to extract one or more features from a device, system, or data stream. As stated above, and as will be described in more detail below, the learning engine 512 may have access to a number of data streams providing real-time and time-series data to the learning engine 512. The feature extraction engine 602 may extract features from the data streams such as data points, time-series values, operational states, and the like. The extracted features may be provided to some or all of the other software modules within the learning engine 512. In some embodiments the feature extraction engine may extract features from the HVAC, fire, and/or security systems to identify a probable causation of the components of interest to the user. The transformation experiment engine 604 may transform one or more features extracted by the feature extraction engine 602. For example, the transformation experiment engine 604 apply one or more artificial intelligence algorithms to the extracted features to attempt to determine one or more conditions or states that are not readily apparent in the extracted features. For example, the transformation experiment engine may correlate data from the extracted features and/or the data received via one or more data streams to identify operation states of one or more devices, systems, or data points.

The operational state identifier 606 may be configured to determine the operational state of one or more devices or systems within the BMS. The operational state identifier may analyze the extracted features, data from one or more data streams, point and/or time-series data from one or more devices within the BMS, etc. The synthesis of disparate data using machine learning module may be configured to analyze the data provided by the feature extraction engine 602, the transformation experiment engine 604, and the operational state identifier 606.

In some embodiments, the synthesis of disparate data using machine learning module 608 can synthesize the data from the software modules and/or data streams to provide a unified data stream for processing by one or more software agents. In some embodiments, the synthesis of disparate data using machine learning module 608 uses machine learning algorithms to synthesize the received data.

As an example, the synthesis of disparate data using machine learning module 608 may be used to provide a synergistic result where the BMS is assisting building occupants evacuate a building experiencing a fire. The synthesis of disparate data using machine learning module 608 may use the location of the fire determined by the fire detection system to determine the possible evacuation routs that could be used by the occupants in the building that are closest to the fire. The synthesis of disparate data using machine learning module 608 can synthesize various data values, such as a size of evacuation hallways to determine how many occupants can safely evacuate through a particular egress route. The synthesis of disparate data using machine learning module 608 may further use video surveillance data to determine how many occupants are actively trying to evacuate through that egress route, and instruct one or more other systems, devices, or agents to communicate other options for those occupants while also generating instructions to unlock appropriate doors, re-direct escalators, and instruct the HVAC system to redirect smoke with the overall goal of evacuating the occupants as safely and quickly as possible. As will be described in more detail, the synthesis of disparate data using machine learning module 608 may provide the information to the agent manager 514, which may then communicate the synthesized data to various agents, e.g., the agents 552, 554, and/or 556 of FIG. 5. In some examples, the agents 552, 554, and/or 556 of FIG. 5 are configured to communicate with each other using the data provided by the synthesis of disparate data using machine learning module 608 to perform various response actions to a received building state.

In some embodiments, the synthesis of disparate data using machine learning module 608 is configured to analyze the data received from one or more data streams to determine a condition within the building 10. In some embodiments, the synthesis of disparate data using machine learning module 608 is configured to analyze the disparate data to provide a confidence factor relating to the one or more conditions within the system. For example, the synthesis of disparate data using machine learning module 608 may evaluate data from fire sensors, smoke detectors, heat sensors, thermal imagers, and other fire system sensors to determine that it is likely that a fire exists in the building. Based on the data from multiple fire systems devices, the synthesis of disparate data using machine learning module 608 may be able to provide a confident assertion that the fire indeed exists. By analyzing disparate data from disparate systems, the synthesis of disparate data using machine learning module 608 can reduce the incidence to false alarms within the BMS.

In another example, the synthesis of disparate data using machine learning module 608 may analyze disparate data to determine threat risks, and further developed a confidence level associated with the risk. For example, the synthesis of disparate data using machine learning module 608 is configured to parse data received from social media feeds of one or more occupants of a building associated with the BMS. The synthesis of disparate data using machine learning module 608 is configured receive data from one or more other building systems, such as the security system when determining the threat risk in some embodiments. Based on the analysis, the synthesis of disparate data using machine learning module 608 is configured to determine that there is an imminent threat, such as an active shooter situation in some embodiments. While described above in context of the learning engine 512, the synthesis of disparate data using machine learning module 608 may also be accessed by, or integrated with one or more software agents. Thus, the synthesis of disparate data using machine learning module 608 may be used to determine confident states within the BMS by analyzing multiple, disparate data streams provided to the learning engine 512.

The relevant stream communicator 610 may be configured to provide communication between the learning engine 512 and one or more data streams, as will be described in more detail below. The learning engine 512 may subscribe to multiple data streams which can be managed by the relevant stream communicator 610. In other embodiments, the relevant stream communicator 610 may be configured to manage data streams provided to, and received from the agent manager 514. For example, the agent manager 514 may be configured to provide one or more data streams to various agents within the BMS. The relevant stream communicator 610 can be configured to manage these data streams, and ensure that the correct data streams are provided to the agent manager 514 for communication to various agents. For example, specific agents may subscribe to one or more data streams, which can be communicated to the agents by the relevant stream communicator 610 via the agent manager 514.

Figure 6B:
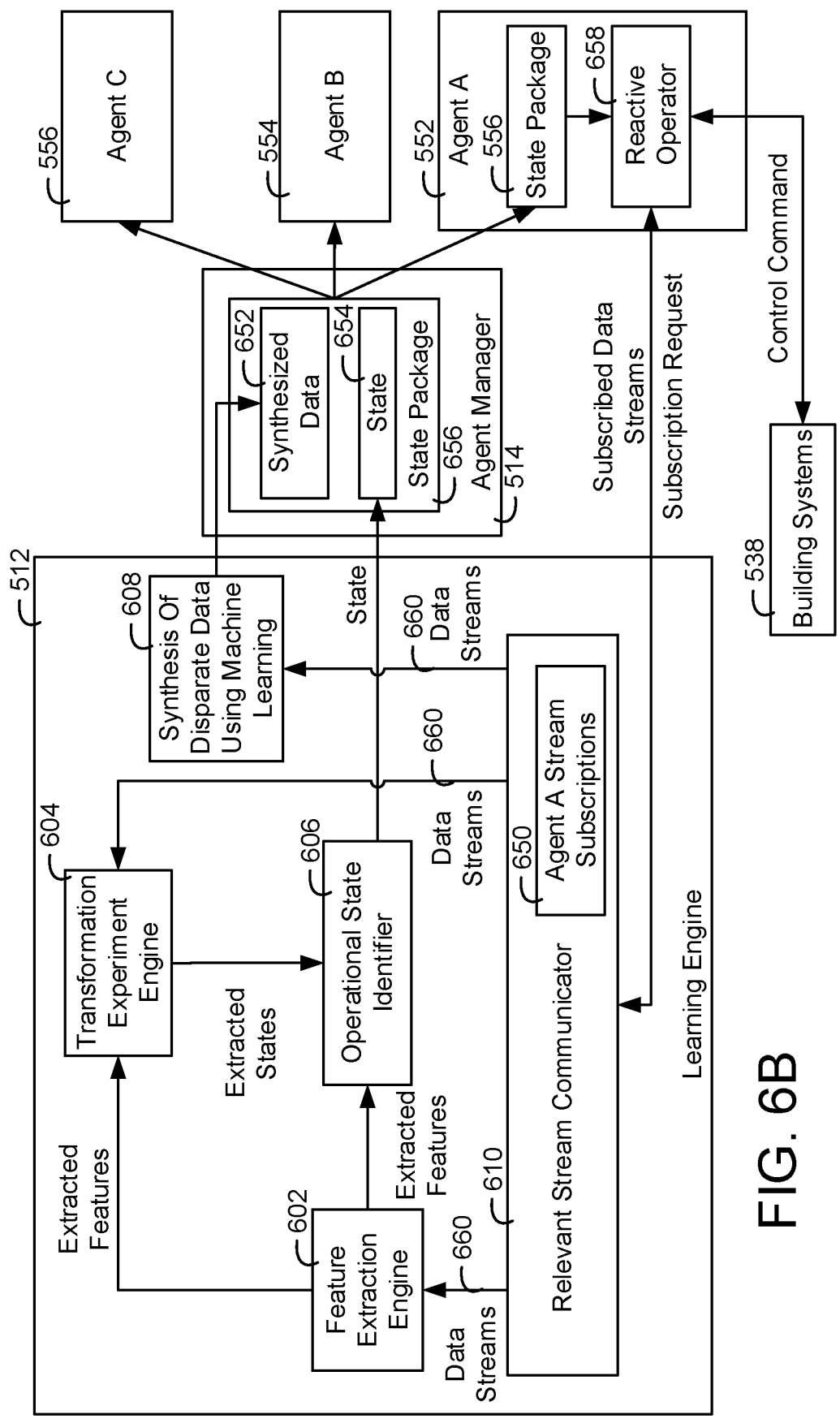
FIG. 6B is a block diagram illustrating the learning engine of FIG. 5 in greater detail, according to an exemplary embodiment.

Referring now to FIG. 6B, the learning engine 512 is shown in greater detail, according to an exemplary embodiment. The modules of the learning engine 512 can be connected and configured to communicate data among each other. The connections of FIG. 6A are exemplary, any connection between the software modules 600 can exist in various embodiments. The feature extraction engine 602 can receive data streams 660 from relevant stream communicator 610. The data streams may be the data streams described with reference to FIG. 7 and may be data streams of HVAC data of an HVAC subsystem, security system data of a security subsystem, fire detection and response data of a fire system, and/or any other data stream as described herein. Based on the data streams, the feature extraction engine 602 can be configured to extract features from the data streams. For example, for carbon monoxide levels of a carbon monoxide data stream, a feature may be carbon monoxide levels above a predefined amount. The features can be indicative of an unsafe condition, for example, data points indicative of a fire, data points indicative of extreme cold temperatures, data points indicative of a storm, etc. The feature extraction engine 602 can analyze the data streams received from relevant stream communicator 610 to generate extracted features and provide the extracted features to the transformation experiment engine 604 and/or the operational state identifier 606 to determine a state. Examples of extracted features are provided in the table below:

TABLE 1

Features and Actual States

| Feature | Data Stream | State |
|---|---|---|
| Temperature Data Points Above Predefined Level | HVAC Data Stream - Zone Temperature | Fire, Malfunctioning Equipment |
| Temperature Data Points | HVAC Data Stream - Zone Temperature | N/A |
| Average Temperature Data For Day | HVAC Data Stream - Zone Temperature | N/A |
| Carbon Monoxide Data Points Above Predefined Level | Fire Data Stream - Zone Carbon Monoxide Data Stream | Dangerous Gas Level |
| Carbon Monoxide Data Points | Fire Data Stream - Zone Carbon Monoxide Data Stream | N/A |
| Elevator Position Data Points At Value Between Floors For Predefined Length of Time | Elevator System Stream - Zone Oxygen Data Stream | Elevator Stuck |
| Smoke Detected Data Points | Fire System Data Stream - Smoke Detector Data Stream | Fire |
| Smoke Detector Location | Fire System Data Stream - Smoke Detector Data Stream | N/A |

Based on the extracted features, the operational state identifier 606 can determine a state 654. The state may be an indication of a particular state of a building. For example, a state may be that the building is drafty, that there is a fire, that a particular piece of building equipment is broken, etc. In some embodiments, the operational state identifier 606 can determine, based on the extracted features, what the states of the building are. For example, for every extracted feature received, there may be a corresponding state. For example, the correlations of Table 1 may be indicative of the states for particular features. The operational state identifier 606 can store one or more data structures that indicate the Table 1 and utilize the data structures to determine the state from the extracted features.

Based on the extracted features, the transformation experiment engine 604 can perform various transformation and/or machine learning algorithms to extract states from the extracted features. A data transformation may include applying a mathematical function to a set of data, for example, various scaling and/or data offsets. Based on the original data and/or the transformed, the transformation experiment engine 604 can perform various models, e.g., neural networks, Bayesian models, decision trees, etc. In some embodiments, the transformation experiment engine 604 receives data streams 660 and extracts states from the data streams 660 and/or the extracted features.

The transformation experiment engine 604 can determine extracted states based on correlating multiple data streams. For example, multiple data streams together may be indicative of various states of a building. The data streams, or features of the data streams, can be transformed (in preparation for machine learning and/or correlation) and/or analyzed via various machine learning processes to extract various states. In some embodiments, data for different subsystems or of different types of information need to be transformed into a particular data representation and/or further separated into various groupings. Transformation may include filtering, merging and/or separating data sets (e.g., merging or separating features), and/or scaling, and/or reducing data values.

The synthesis of disparate data using machine learning module 608 can be configured to generate synthesized data 652 based on the data streams 660. In some embodiments, the module 608 can analyze multiple disparate data streams of data streams 660 to generate the synthesized data 652. In some embodiments, the synthesized data 652 is a state confidence indication. For example, multiple data streams can be correlated to identify the confidence of state 654. For example, if the state 654 is a fire state, the synthesized data may indicate how likely the fire is. The confidence may be a probability, a score (e.g., between 0 and 10), a percentage, etc. Module 608 can utilize multiple rules and/or machine learning processes to identify the score. For example, various models can be used to analyze data streams 660 to identify a score value. The score value can be based on multiple disparate data streams. For example, a data stream for an HVAC subsystem data stream that indicates a particular room or area of a building is associated with a temperature above a predefined amount while a smoke detector in the same room of a fire system may indicate smoke. When both the smoke detector and sensed temperature are indicative of a fire, this may indicate that there is a high probability that the fire is occurring. The module 608 can be configured to analyze both temperature data and smoke detector data to identify a fire state probability.

In some embodiments, the module 608 can be configured to generate the synthesized data 652 to include a synthetic data stream and/or synthetic information. For example, the module 608 can determine, based on fire detection in various areas of a building by a fire detection and suppression subsystem, based on various building maps and evacuation plans, various temperatures of various areas of a building for an HVAC data stream, an evacuation route for the building. Evacuation route may indicate what route a user should take through a building in the event the state 654 is a fire state. Contextual information that the module 608 can use for generating the synthesized data 652 may be stored in database 516 and/or in entity and/or time-series data storage as described with reference to FIGS. 10-14.

The agent manager 514 is configured to generate a state package 656 in some embodiments. The state package 656 can include the synthesized data 652 and/or the state 654. The agent manager 514 is configured to distribute the state package 656 to the agents 552-556 in some embodiments. Each of the agents 552-556 can include a reactive operator. The reactive operator can rely on the state 654 and/or the synthesized data 652 as an input. Each of the reactive operators of each of the agents 552-556 may be specific to the agent and/or the building subsystem which the agent controls. For example, if agent 554 is associated with a sprinkler system, the agent 554 may include a reactive operator for controlling the sprinkler system. If the agent 554 is associated with an HVAC subsystem, the agent 554 can include a reactive operator for controlling building ventilation.

The agent 552 can be configured to receive and store the state package 656 and can also be configured to store a reactive operator 658. The agent 552 may be associated with building systems 538 (e.g., system security 560, fire systems 558, and/or the systems described with reference to FIGS. 1-4). Based on the state package 656 and the reactive operator 658, the agent 552 can generate control decisions for controlling physical conditions of the building 10 via the building systems 538. In some embodiments, the agent 552 is subscribed to one of the data streams 660. For example, relevant stream communicator 610 may store a stream subscription for agent 552, "Agent A Stream Subscriptions." Based on the subscriptions, the relevant stream communicator 610 can be configured to provide the agent 552 with a particular data stream of the data streams 660. In some embodiments, the relevant stream communicator 610 provides the subscribed streams to the agents 552-556 via the agent manager 514.

In some embodiments, the reactive operator 658 relies on certain input data streams. For example, the reactive operator 658 may require data inputs of streams other than data that can be received directly from a building subsystem to which the agent is connected. For example, agent 552 may require ambient weather data of a weather stream of a weather server. In this regard, if the agent 552 determines that to perform the reactive operator 658, the agent 552 requires the weather data stream, the agent 552 can update subscriptions 650 so that the relevant stream communicator 610 pushes weather data streams to the agent 552 for use in the reactive operator 658. In some embodiments, the data that the agent 552 requires to perform an operation based on the state 654 is dependent on the type of the state 654. In this regard, the agent 552 can determine, in response to receiving the state 694, what data the agent 552 requires to execute the reactive operator 658 for the state 654. The determined data can be collected by the agent 552 from the building systems 538, added as a subscription to subscriptions 650, and/or retrieved from another agent that stores and/or can retrieve the data.

Figure 6C:
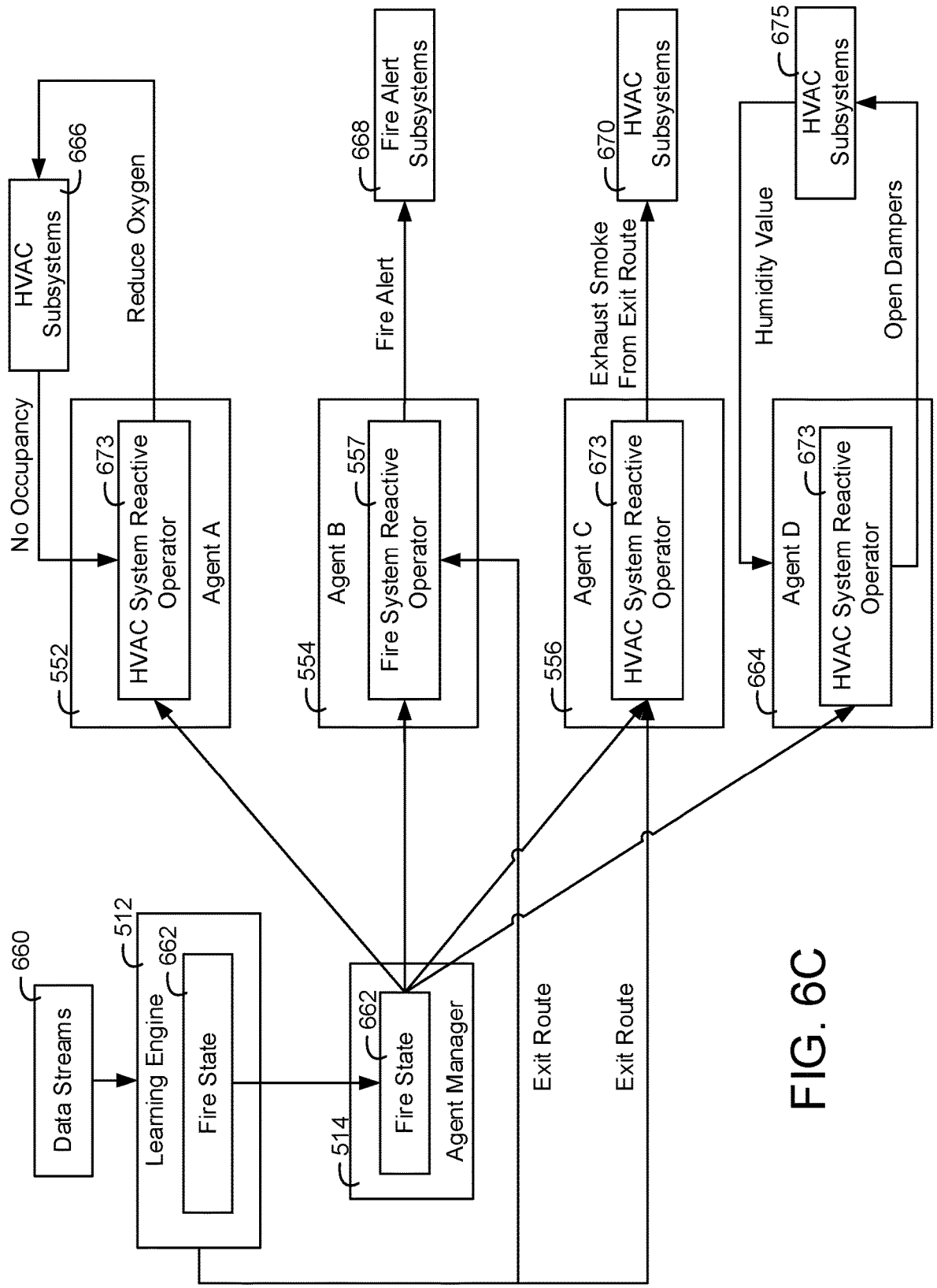
FIG. 6C is a block diagram illustrating the learning engine of FIG. 5 determining a fire state and providing the fire state to the agents of FIG. 5, according to an exemplary embodiment.

Referring now to FIG. 6C, a block diagram illustrating the learning engine 512 and the agents 552-556 and an agent 664 operating building subsystems based on a fire state 662 is shown, according to an exemplary embodiment. The agent 664 can be the same as and/or similar to the agents 552-556. The learning engine 512 is configured to determine the fire state 662 and the agent manager 514 is configured to distribute the fire state 662 to the agents 552-556 and the agent 664 in some embodiments. The fire state 662 may be the state 654 as described with reference to FIG. 6B but may indicate that the building 10 is experiencing a fire. The same fire state 662 is distributed to each of the agents 552-556 and 664, however, each of the agents 552-556 and 664 react differently to the fire state 662 based on the reactive operator of each of the agents.

Agent 552 can be associated with HVAC subsystems 666 and can be configured to control physical conditions of the building 10 based on the HVAC system reactive operator 673. The HVAC subsystems 666 may be heating, ventilation, and/or air conditioning devices and/or systems such as the HVAC systems described with reference to FIGS. 1-3. The HVAC reactive operator 673 can be configured to cause agent 552 to query HVAC subsystems 666 for an indication of occupancy in an area of a building that HVAC subsystems 666 is located and/or configured to control. HVAC subsystems 666 are configured to reply to agent 552 and indicate whether there is no occupancy in the area of the building. Agent 552, via HVAC system reactive operator 673, can control HVAC subsystems 666 to reduce oxygen in the unoccupied area of the building. For example, the agent 552 can control HVAC subsystems 666 to operate fans (e.g., an AHU supply fan) and/or exhaust and/or ventilation dampers to stop the circulation of air in the building. Reducing the circulation of air in the building can prevent the fire from spreading. If there is occupancy reported by HVAC subsystems 666, the reactive operator 673 can attempt to exhaust smoke via exhaust and/or ventilation dampers or fans to aid the occupant in evacuating the building.

Agent 554 can be associated with fire alert subsystems 668. In response to receiving the fire state 662 and the exit route as determined by the learning engine 512, the agent 554 can control the fire alert subsystems 668 to alert building occupants of the fire and/or to notify the occupants of an exit route through the building. The fire alert subsystems 668 may include one or more building speaker systems and/or may be the same and/or similar to the fire systems 558. The fire system reactive operator 557 can cause the agent 554, and/or the fire alert subsystems 668, synthesize voice commands based on the exit route and the fire state 662. The fire alert subsystems 668 can provide the building occupants with navigation directions, and cause building speaker systems, user devices, display screens, etc. to broadcast the synthesized voice commands and/or display text indicating direction for the exit route.

The agent 556 can be associated with HVAC subsystems 670. Agent 556 can include reactive operator 673. The reactive operator 673 of agent 556 may be the same as reactive operator s of the agent 552 and the agent 664, however, based on the location of the HVAC subsystems 670 that the agent 556 controls, a different control decision can be made by the agent 556 via the reactive operator 673. The agent 556 can receive the exit route indication and the fire state 662. The HVAC subsystems 670 may include dampers that can exhaust air (smoke in the event of a fire) from a particular area of the building. The agent 556 can determine whether the HVAC subsystems 670 are located in an area that is an exit route. For example, if the HVAC subsystems 670 are subsystems associated with a particular hallway that is part of the exit route, agent 556, based on reactive operator 673, can cause HVAC subsystems 670 to exhaust smoke from the particular hallway by controlling dampers and/or fans (e.g., exhaust fans and/or exhaust dampers) associated with the hallway.

The agent 664 can store the HVAC system reactive operator 673. The agent 664 is configured to determine, based on the HVAC system reactive operator 673 and an ambient humidity value outside the building, whether or not to cause HVAC subsystems 675 to exhaust smoke via fans and/or dampers. The HVAC subsystems 675 can be the same as and/or similar to the HVAC subsystems 666. If it is very humid outside the building (the humidity value is greater than a predefined amount), the HVAC system reactive operator 673 can cause the agent 556 to operate HVAC subsystems 670 to cause dampers to be opened in an area of the building so that humid air can be brought into the building. The humid air can help control the fire. The agent 664 can determine the humidity value by communicating with the HVAC subsystem 675. Alternatively, the agent 664 can communicate with a weather server to determine what the ambient humidity outside the building is. In some embodiments, before executing the reactive operator 673, the agent 664 can be configured to identify what inputs are required for the reactive operator 673. In some embodiments, ambient humidity may be a required and/or optional input for the reactive operator 673. In this regard, the agent 664 can collect ambient humidity to perform the reactive operator 673.

The reactive operators of the agents 556, 664, and 552 may be the same reactive operator (e.g., the reactive operator 673). In this regard, a single reactive operator can be deployed by the agent manager 514 to each agent associated with an HVAC subsystem, i.e., each of the reactive operators may be subsystem specific. However, in some embodiments, each of the reactive operators of the agents 552, 556, and/or 664 may be different even if each of the agents 552, 556, and/or 664 are all associated with the same type of building subsystem.

Figure 6D:
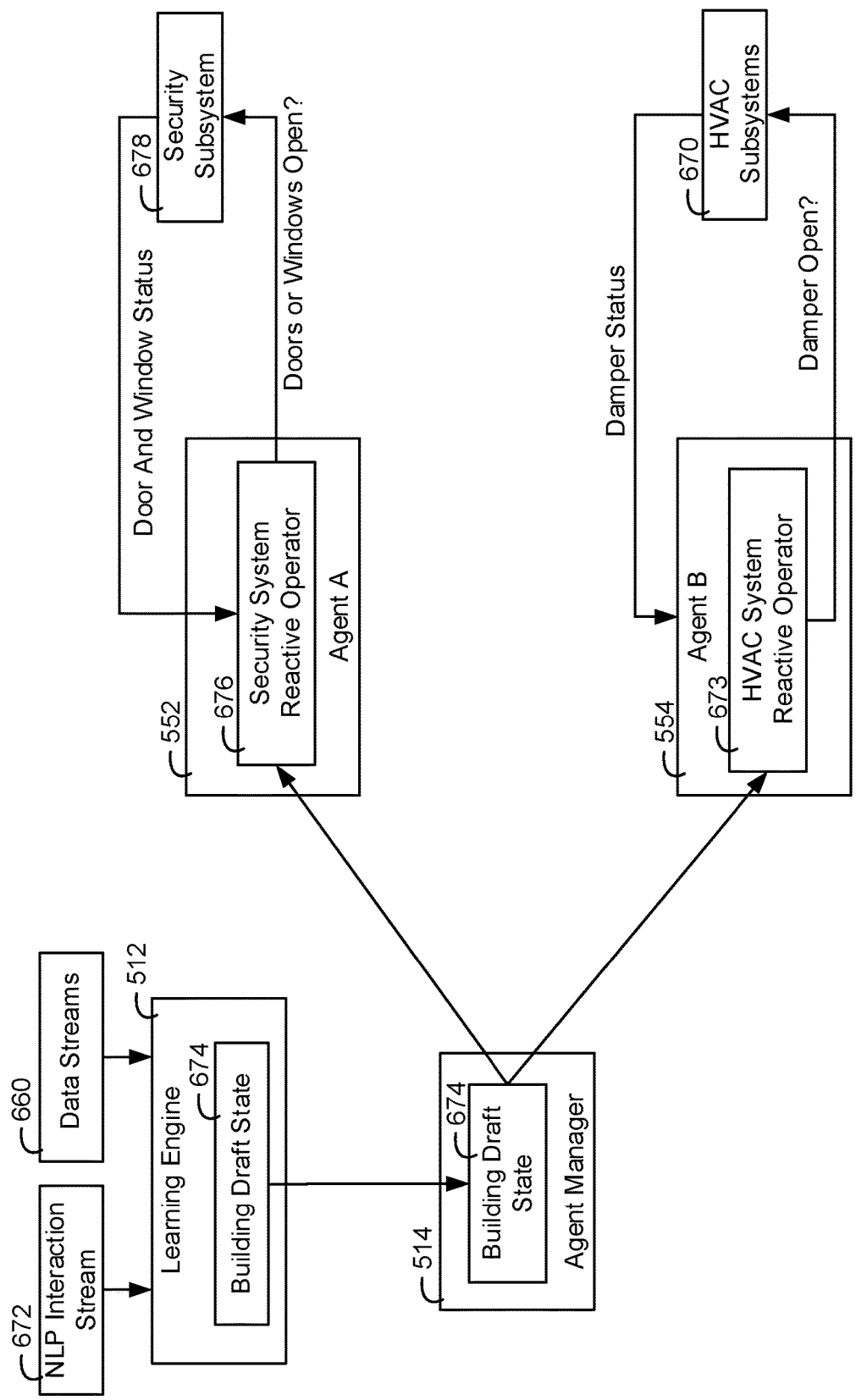
FIG. 6D is a block diagram illustrating the learning engine of FIG. 5 determining a draft state and providing the draft state to the agents of FIG. 5, according to an exemplary embodiment.

Referring now to FIG. 6D, a block diagram illustrating the learning engine 512 and the agents 552-556 and the agent 664 operating building subsystems based on a building draft state 674 is shown, according to an exemplary embodiment. In some embodiments, the learning engine 512 is configured to identify the building draft state 674. The learning engine 512 can determine that there is a building draft state 674 by analyzing a NLP interaction steam 672 and/or the data streams 660. The NLP interaction stream 672 can include text based input, e.g., voice recorded input and/or text input received from a user device and/or speaker. A user can state, "It feels drafty," "It is too cold," add/or any other indication that the building is uncomfortable. Based on the user input, learning engine can determine the building draft state 674. The NLP interaction stream 672 may be the same and/or similar to the NLP interaction stream as described with reference to FIG. 7.

The agent manager 514 can distribute the building draft state 674 to the agent 552 and the agent 554. In response to receiving the building draft state 674, the agents 552 and/or 554 can be configured to respond to the draft state with a description of what may be causing the building air draft within the building 10. The agent 552 can be associated with a security subsystem 678. The security subsystem 678 can include various access control systems that determine whether doors and/or windows are open or closed. The security subsystem 678 can include door and/or window locks that can lock and/or unlock doors or windows. The security subsystem 678 can be the same as and/or similar to security system 560 as described with reference to FIG. 5 and/or the security subsystem 438 as described with reference to FIG. 4. The agent 552 is configured to determine, based on reactive operator 676, whether the security subsystem 678 can detect the cause of the building draft state 674 by sending a request to security subsystem 678 to provide a response with information identifying doors and/or windows that are opened and/or closed, in some embodiments.

Based on the window and/or door status, the agent 552 can send a report to agent manager 514 identifying that one or more door and/or windows are open and/or the location of the doors and/or windows so that a user can go and close the door and/or window. The learning engine 512 can present a user, via a user device, with an indication of whether the doors and/or windows are open and/or which doors and/or windows are open and/or where each of the doors and/or windows are located.

The agent 554 can be associated with the HVAC subsystems 670. The HVAC subsystems 670 can be the same as and/or similar to the HVAC subsystems 666. The HVAC subsystems 670 can include one or more dampers. If the dampers are open and it is cold outside, the open dampers can cause a draft in the building 10. In response to receiving the building draft state 674, the agent 554 is configured to determine, based on a reactive operator 673, whether HVAC subsystems 670 are causing the draft in some embodiments. The reactive operator 673 can cause the agent 554 to send a damper status request to identify whether dampers of the HVAC subsystem 670 are open and/or closed. The HVAC subsystems 670 can reply with the status of the dampers. If one or more dampers are open, or a predefined number of dampers are open, the agent 554 can determine that the HVAC subsystems 670 are responsible for the draft. The reactive operator 673 can cause the HVAC subsystems 670 to close the dampers and/or some of the dampers. The agent 554 can send a message to the agent manager 514 which can be presented to a user via a user device indicating the number of dampers that are open and/or indicating that the agent 554 has taken actions to close the dampers to reduce the and/or eliminate the draft in the building.

In some embodiments, the agent 554 can determine, based on the damper status received from the HVAC subsystems 670, that damper of the HVAC subsystems 670 is stuck in an open position, causing the draft. In this regard, the agent 554 can provide a technician or a technician device with a work order to repair and/or replace the damper. In some embodiments, the work order includes a temporary fix, manually closing the damper, and a permanent fix, replacing the damper, so that the technician is instructed to eliminate the draft even if the technician does not have the proper parts and/or tools to replace the stuck damper. The agent 554 is configured to provide an indication of a stuck damper and/or a work order to the agent manager 514 and/or the learning engine 512 for presentation to a user.

The reactive operator 673 of the agent 552 that determines whether a damper of the HVAC subsystems 670 is open and/or stuck can be the same and/or different than a reactive operator that the agent 554 uses to respond to a fire state (e.g., the as described with reference to FIG. 6C). In this regard, the agent manager 514 may only need to deploy a single reactive operate that can take multiple building states as an input and respond appropriately to multiple situations for a building subsystem e.g., the HVAC subsystems 670.

Figure 6E:
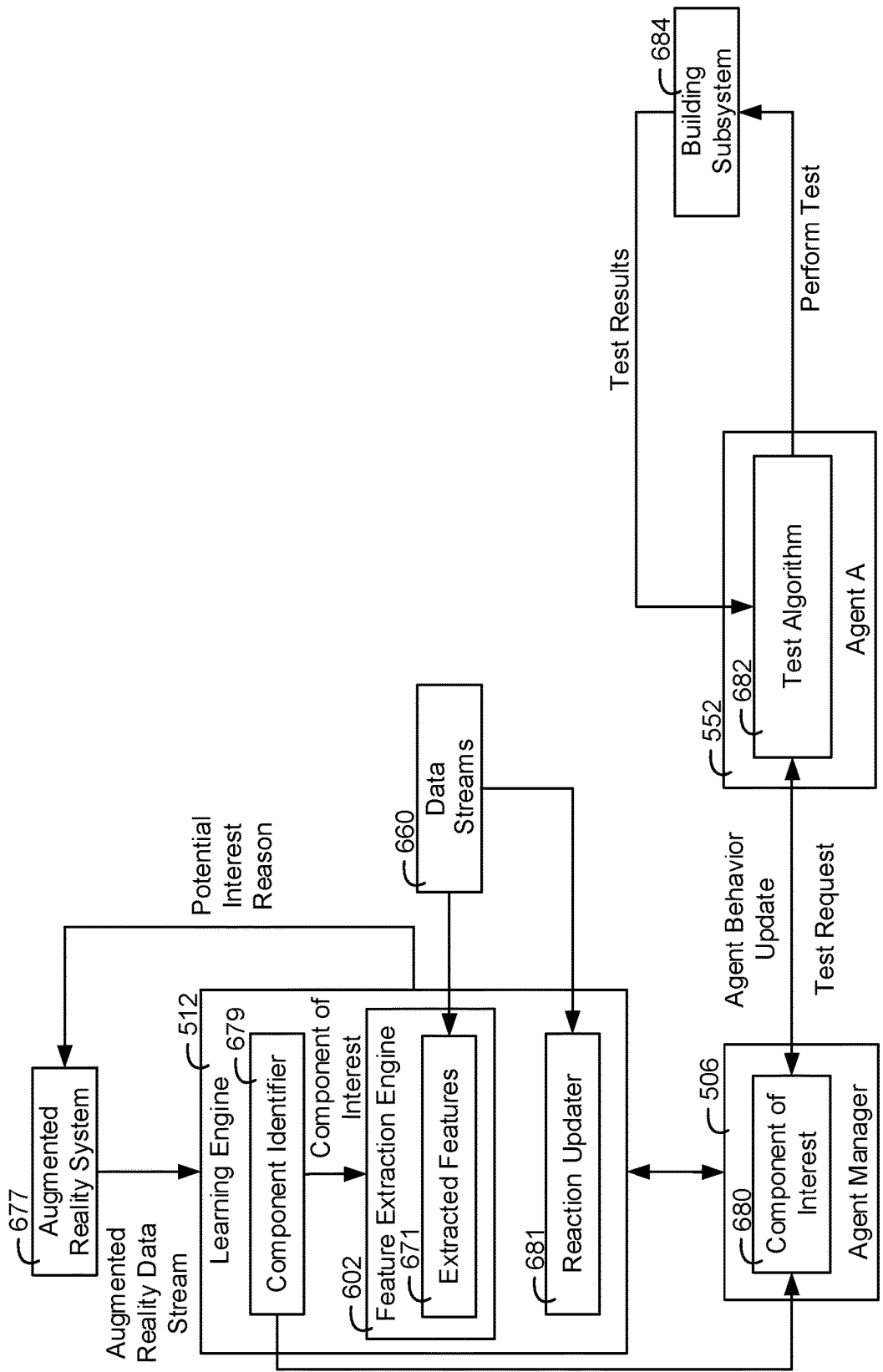
FIG. 6E is a block diagram illustrating the learning engine of FIG. 5 determining potential building component of interest for an augmented reality system, according to an exemplary embodiment.

Referring now to FIG. 6E, a block diagram of the learning engine 512 is shown communicating with an augmented reality system 677, according to an exemplary embodiment. An augmented reality system 677 may include a camera and display system, such as a smartphone and/or a visual headset (e.g., MICROSOFT® HoloLens), that a user can hold up in a building to capture images of the building and/or equipment of the building that the augmented reality system 677 can overlay information (e.g., temperature, humidity, building equipment age, building equipment faults, etc.). A user may talk with the augmented reality system 677 expressing interest in certain building components and/or systems, for example, a user may speak "How long has this VAV been installed," "What is the temperature in this room?" and/or any other question or request for information. Based on a database of information, the augmented reality system 677 can indicate the length of time that the VAV has been installed, a temperature of a room of a building, and/or any other requested information.

The augmented reality system 677 can generate an augmented reality data stream that the learning engine 512 can analyze to identify building information that may be of interest to a user. In some embodiments, the augmented reality data stream may include a user question (e.g., "Why is the air warm in this room?" "Is this thermostat working?" "How many occupants have walked through that door?" and various other user questions pertaining to a particular building component). In some embodiments, the augmented reality data stream may indicate how long a user has been looking at a particular piece of building equipment. For example, the augmented reality data stream may indicate how long a particular component has been within a frame captured by the augmented reality system 677. Furthermore, the augmented reality system 677 may include user eye tracking camera system which can identify what objects (e.g., building components) that the user has been looking at and for how long the user has been looking at the components. For example, the eye tracking system can capture a picture of a user's eye and identify what building components a user has been looking at by analyzing frames of the user's eye captured by the eye tracking system.

The learning engine 512 can include component identifier 679. The component identifier 679 can identify, based on the augmented reality data stream, what components of the building the user is interested. For example, if a user has asked a question about a specific piece of building equipment, this may indicate that the user is interested in that device. Furthermore, if a user has been looking at a particular piece of building equipment for a length of time greater than a predefined amount, this may also indicate that the user is interested in that component.

Based on a component of interest, a building device identified by the component identifier 679, feature extraction engine 602 can analyze data streams generated by the device and/or other systems. For example, a camera system could identify that a particular piece of building is on fire or generating smoke by extracting the extracted features 671 (e.g., the same as and/or similar to the extracted features described with reference to FIG. 6B. Learning engine 512 could determine, based on a security system with cameras that a chiller is not operating properly and/or may be in an emergency state.

In some embodiments, the component identifier 679 can provide an indication of a component of interest 680 to agent manager 514. The component of interest 680 can be provided to one or more agents, e.g., the agent 552. The agent 552 can include a test algorithm 682 which can operate building subsystem 684 to operate in a test mode to generate various results. The results may be retrieving stored data gathered during an operating period and/or controlling the building subsystem 684 and monitoring the results.

A reaction updater 681 can provide the user with the results generated by the agent 552 and/or extracted features 671 extracted from data streams 660 for the component of interest. The reaction updater 681 can provide information to the user via augmented reality system 677 and monitor a user reaction to the information. In some embodiments, the augmented reality data stream includes user reactions. The user reactions may be images of a face of a user that the reaction updater 681 is configured to analyze to extract facial expressions in some embodiments. Furthermore, based on audio streams, the reaction updater 681 is configured to extract verbal comments in some embodiments. For example, if the augmented reality system 677 provides a user with an indication that a supply fan of a building is running at 100% and the reaction updater 681 identifies that the user expresses surprise or concern, agent manager 514 can provide an indication to agent 552 to reduce the speed of the supply fan.

Figure 7:
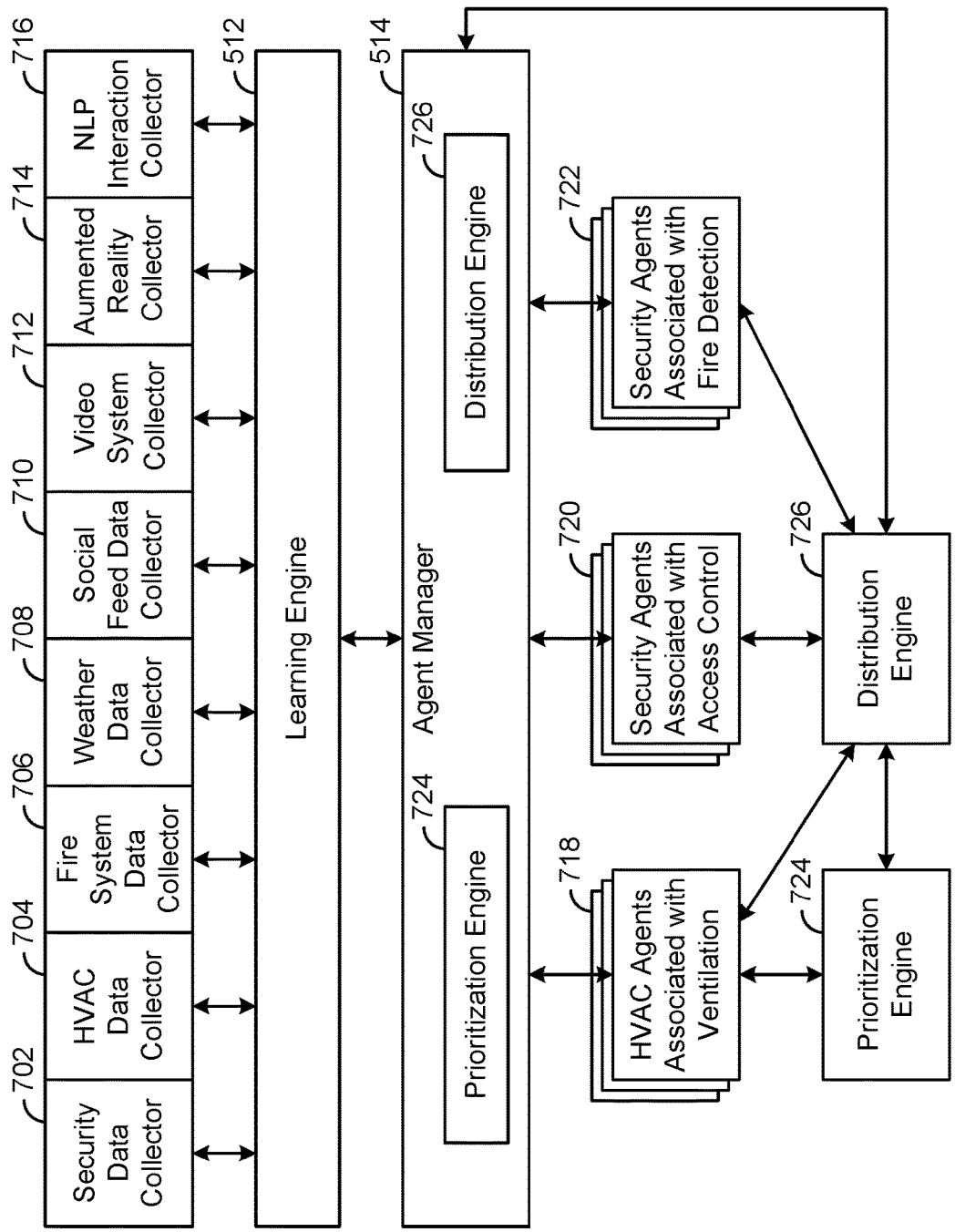
FIG. 7 is a block diagram illustrating a data flow within a unified building management system, according to an exemplary embodiment.

Referring now to FIG. 7, a block diagram illustrating a data flow 700 within a unified BMS is shown, according to exemplary embodiments. The learning engine 512 may be in communication with multiple data streams. The data streams (e.g., the data streams discussed with reference to FIGS. 6B-6E) may be generated by one or more data collection services or devices and provided to the learning engine 512 by the one or more data collection services. The data streams may be generated based on data collected by (e.g., from) security systems, fire systems, HVAC systems, video systems, weather services, social media services, and the like. In some embodiments, the learning engine 512 subscribes to the data streams. The data streams include a security data stream, an HVAC data stream, a fire system data stream, a weather data, a social feed data, a video system data stream, an augmented reality data stream, and a natural language processor (NLP) interaction data stream.

The security data collector 702 can generate a security data stream which can include data related to one or more security systems within a building. Example security data may include occupancy data, access data (e.g. key card access), door statuses (e.g. locked, unlocked, etc.), and the like. The HVAC data collector 704 can generate an HVAC data stream which can include data related to one or more HVAC components or systems with the BMS. For example, the HVAC data stream may include data such as HVAC device statuses (e.g. fan speeds, damper positions, AHU/RTU settings, system pressures, system temperatures, etc.), environmental values (e.g. temperature, humidity, etc.), setpoints, and the like. The HVAC data stream may also include data related to refrigeration systems, occupancy detections system, enterprise resource planning (ERP) systems, or other non-BMS related systems. In other embodiments, the refrigeration systems, occupancy detection systems, ERP systems, and the like may have their own data streams that are provided to the learning engine. The fire system data collector 706 can be configured to generate a fire system data stream which can include data related to the fire system, such as alarm status, fire detector status, sprinkler or dry chemical levels and pressures, fire department information, and the like.

The weather data collector 708 can be configured to generate a weather data stream that can include the same data as is provided by the cloud-based weather service 544. The social feed data collector 710 can be configured to generate a social media data feed which can include social media data that the social feed data collector 710 can be configured to provide to the learning engine 512. Example social data can include crime information, special events in or near the building, special alerts (e.g. silver alerts, amber alerts), social media data, and the like.

In some embodiments, social media data may be analyzed by the learning engine 512 to provide verification or corroboration of a detected event. The video system collector 712 can be configured to collect video system data from a video system, generate a video stream and provide the video stream including data from one or more cameras associated with the BMS to the learning engine 512. The augmented reality collector 714 can be configured to collect augmented reality data from an augmented reality system. The augmented reality collector 714 can generate an augmented reality data stream and provide the augmented reality data stream to the learning engine 512. The augmented reality data collected by the augmented reality collector 714 may be provided by one or more cloud-based services. In some embodiments, the learning engine may pass data to an augmented reality subsystem, such as video system data, and the augmented reality subsystem may provide augmented reality data, such as overlaying one or more data points on top of the video data. For example, where the video data is of a hallway in the building, the augmented reality subsystem may provide indications on the video such as HVAC component locations, sprinkler heads, pull stations, door status, etc.

The NLP interaction collector 716 can be configured to collect natural langue (e.g., text or spoken words) from an NLP system (e.g., a user device, a microphone, etc.) and generate an NLP data stream. The NLP data of the NLP data stream can include natural language commands and requests received by a BMS. For example, the BMS may be configured to accept natural language commands, such as voice or textual commands. The NLP interaction collector 716 may process the received natural language data and provide the processed data to the learning engine 512. In some embodiments, the learning engine 512 may be configured to analyze data from the NLP interaction collector 716 to detect one or more themes of the natural language system. The learning engine 512 may further extract information from the analyzed NLP data and themes to learn operator-interested states. Operated-interested states may include a verified "draft likely" state. In some embodiments, the NLP interaction collector 716 may collect data of one or more occupants indicating (e.g., stating) that they feel a draft or breeze within a certain location of the building. The learning engine 512, upon receiving the natural language input, may monitor other data streams for confirmation or cause of a draft within the building. This "draft likely" state may be transmitted to one or more agents in the BMS to check for possible sources of the draft, such as open doors and windows (e.g., as described with reference to FIG. 6D). The agents may further check the HVAC system for a potentially stuck damper or other airflow device (e.g., as described with reference to FIG. 6D). In some embodiments, the NLP interaction stream 716 may be configured to interface with an augmented reality subsystem to identify components of interest to a user. In some embodiments, the NLP interaction collector 716 may be used to monitor one or more reactions of occupants of the building or BMS users after an action has been performed by one or more of the agents, and/or the agents have presented the user with information. Based on the reaction, provided to the learning engine 512 via the NLP interaction stream, the learning engine 512 may learn what actions are and are not satisfactory to the users and base future actions accordingly.

The learning engine 512 may communicate data to, and receive data from the agent manager 514. For example, the agent manager 514 may be configured to communicate data received via one or more agents to the learning engine 512. The agent manager 514, as described above, may be configured to generate and manage one or more software agents within the BMS. As shown in FIG. 7, the example data flow includes HVAC agents associated with ventilation 718, security agents associated with access control 720, and security agents associated with fire detection 722. As shown in FIG. 7, the agent manager 514 includes a prioritization engine 726 and a distribution engine 726. The prioritization engine 724 is configured to generate one or more prioritization algorithms for the agents in some embodiments. The prioritization algorithms may reduce and/or optimize risk, cost, performance, safety, and customer empowerment. Based on the prioritization algorithms, the prioritization engine 724 may allow for agents to override normal sequences of operation to perform tasks or operations associated with higher priority actions. For example, in the event of a fire, the prioritization engine 724 may determine that safety is the top priority and override one or more normal operations. In further examples, if it is determined that some occupants of the building are closer to the fire, the prioritization engine 724 may prioritize their evacuation, and make sure elevators are positioned, or certain doorways are unlocked to assist those occupants closest to the fire first. While shown as a feature of the agent manager 514, the prioritization engine can be located in one or more distributed systems, or in the agents themselves. The prioritization engine 724 can update prioritization algorithms of the agents by generating updated variables for the prioritization algorithms, the prioritization algorithms being reward functions and the variables being variables for HVAC systems, fire and/or security systems, etc.

The distribution engine 726, may generate reports and/or other documents or outputs to a user within the BMS. In some embodiments, the distribution engine 726 can generate reports and/or dashboards that can be provided to a device or interface associated with the user, such as a smartphone, tablet computer, laptop computer, web-portal, or dedicated user interface within the BMS. In some embodiments, the distribution engine 726 can access one or more web applications to allow a user to access the reports and/or dashboards from any Internet-connected device. The distribution engine 726 may further be configured to distribute the generated reports and/or dashboards (e.g., based on data collected by various agents) to users based on an impact to their operation, or based on the needs of the system. Further, the distribution engine 726 is configured to provide data received by the learning engine to the agents 718, 720, 722. In some embodiments, the distribution engine 726 is configured to interface with the prioritization engine 724. The prioritization engine 724 can provide priority data to the distribution engine 726, which can be utilized by the distribution engine 726 to determine what information to distribute at a given time based on the priority of data at that time.

For example, the distribution engine 726 may distribute information to users such as the building manager, security professionals, first responders, service persons, and the like. The information provided to the users may be correlated by the learning engine 512 and provided to the distribution engine 726 via the agent manager 514. In some embodiments, the prioritization engine 724, using one or more artificial intelligence models and/or algorithms, can determine what information is most relevant to be provided to the user based on evaluating data, such as current operating data from one or more of the disparate systems. The data may be presented to the user via the distribution engine 726, and further tailored to the job function of the person requesting and/or receiving it. For example, if the fire systems 558 detect an electrical fire in an elevator bank, the information may be presented differently depending on the user receiving the information. For example, the information will be tailored differently for a firefighter, an elevator service person, a police officer, and so on, as each has a different behavior with regard to the same event. Such information can be communicated through a variety of visual methodologies. For example, the augmented reality subsystem may provide data an enhanced reality holographic device which allows conveyance of such information by superimposing it on the view of the related system. For example, if a service person is looking at the HVAC system, the relevant information for that equipment can be displayed to the service person.

Figure 8:
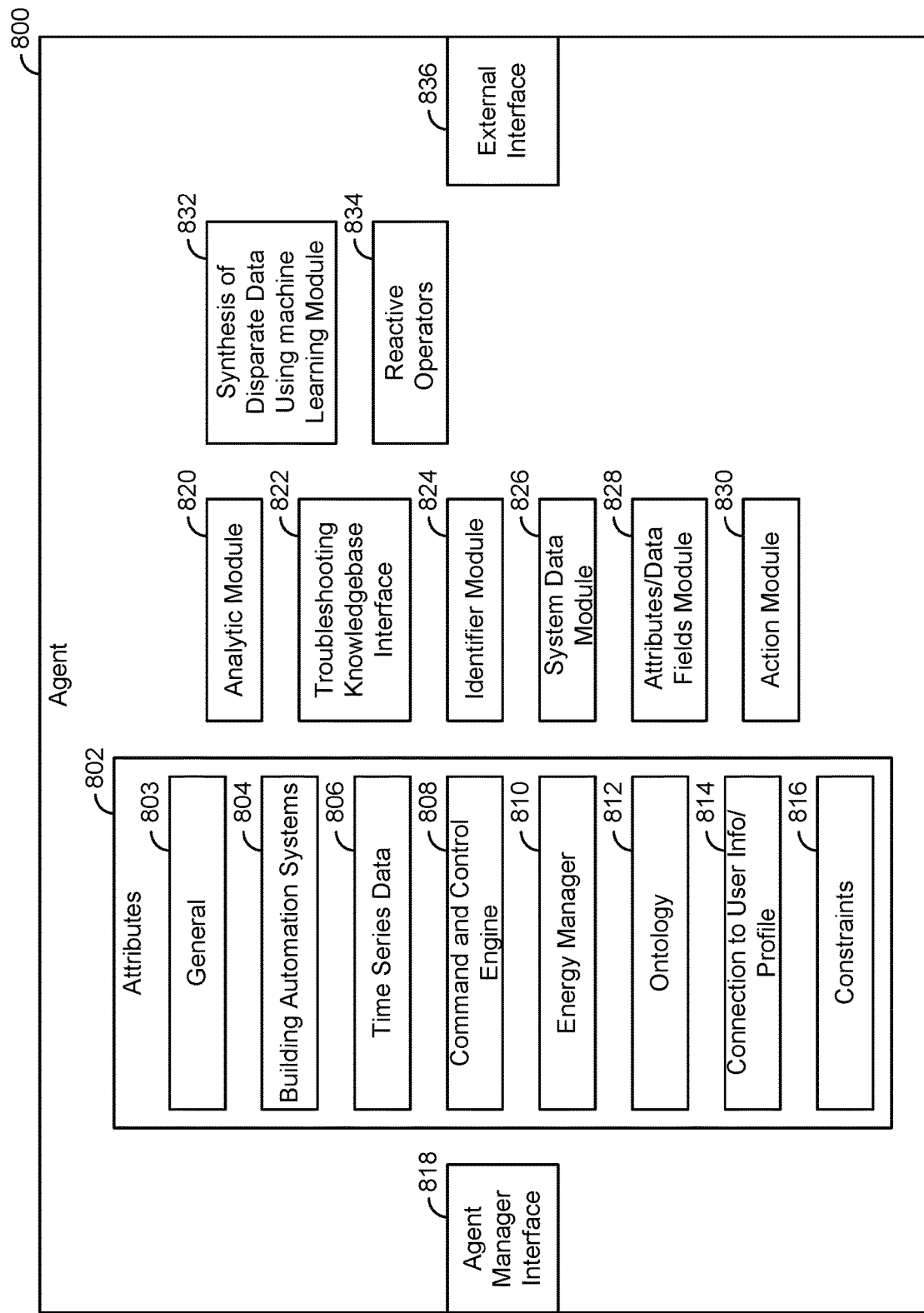
FIG. 8 is a block diagram of an adaptive agent of the agents of FIG. 5, according to an exemplary embodiment.

Referring now to FIG. 8, a block diagram of an agent 800 is shown, according to an exemplary embodiment. The agent 800 may be one or more of the agents 718, 720, 722 as described in FIG. 7 and/or any of the agents discussed with reference to FIGS. 5 and 6B-6D or elsewhere herein. The agent 800 may include a number of attributes 802, an analytic module 820, a troubleshooting knowledgebase interface 822, an identifier module 824, a system data module 826, an attributes/data field module, and an action module 830. The agent 800 may further include an external interface 836 and an agent manager interface 1018. The attributes 802 may be a number of connections and/or operations available to the agent 800. The agent 800 may include a general attribute 803, a building automation systems (BAS) attribute 804, a time series data attribute 806, a command and control engine attribute 808, an energy manager attribute 810, an ontology attribute 812, a user info/profile attribute 814, and a constraints attribute 816, a synthesis of disparate data using machine learning module 832, and one or more reactive operators 834. In one example, the synthesis of disparate data using machine learning module 832 performs the same operations as the synthesis of disparate data using machine learning module 608 described above. This can allow the agent 800 to synthesize one or more data streams provided to the agent 800. The attributes 802 may be used, in conjunction with the other elements of the agent 800 described above, by the agents to perform their designated operations. For example, the attributes 802 can include rules, permissions, historical data, etc. which can be used to perform designated tasks by the agent 800. In one example, the attributes 802 are located within the agent 800. In some embodiments, the attributes 802 simply provide for data access to the information associated with the attributes 802. The information associated with the attributes 802 may be gathered and provided by a central processing server, such as those described above.

The general attribute 803 may include information such as schedules (i.e. operating schedules, PM schedules, occupancy schedules, etc.), environmental conditions (e.g. temperature, humidity, weather, etc.) time, date, or other relevant general information. In some embodiments, the general attributes 803 are connected to external sensors, services, or databases. In some embodiments, the general attributes 803 may be provided by a controller, such as controller 502 described above. The controller 502 may have access to various services which can provide the general attributes 803 to the agent 800. Alternatively, the agent 800 may have access to the same sensors and services that the controller 502 may have. For example, the agent 800 may be able to access weather information by communicating with one or more environmental sensors in a BMS. In other examples, the agent 800 may have access to the Internet and can access weather information from known weather websites relevant to the location of the BMS, (e.g. Yahoo Weather, WeatherBug, etc.). Alternatively, BMS influencers such as weather and access to the Internet of other cloud-based applications may be provided by the adaptive interaction manager 506, as described above.

The BAS attributes 804 may include or have access to general building information such as layouts. The BAS attributes 804 may further include or have access to information relating a BMS associated with the building, including control schemes, device information, etc. Further, the BAS attribute 804 may have access to scheduling information relating to certain assets for the building. For example, the BAS attribute 804 may have access to schedules for one or more conference rooms associated with the building. Additional schedules, such as building occupancy schedules may also be accessed by the BAS attributes 804. The time series data attribute 806 may provide access to long term data records related to multiple operations associated with a building. In some embodiments, the time series data may be stored on a database, such as database 516 above, and accessed by the time series data attribute 806. The time series data attribute 806 may be accessed by a training module or a task-conditioning module, such as those described above, to allow the agent 800 to make decisions based on long term historical data. The command and control engine attribute 808 may include the necessary data, including permissions, to allow the agent 800 to perform control actions in addition to only monitoring actions.

The energy manager attribute 810 may include an enterprise optimization system (EOS). The EOS may allow for direct communication with a utility provider such as a water company, a power company, water treatment plant, etc. to allow the agent 800 to determine parameters such as utility rates, peak demand times, potential brown outs, etc. The energy manager attribute 810 may further allow for communication with distributed energy storage (DES) systems. The connections associated with the energy manager attribute 810 allow the agent 800 to manage energy usage for a facility, building, or even an individual room within a building. The ontology attribute 812 may provide a hierarchical listing of all the items within a given facility or building. Items may include one or more BMS devices (controllers, HVAC equipment, AHUs, VAVs, etc.), lighting, A/V resources, rooms, utilities, etc. In some embodiments, the ontology attribute 812 provides spatial locations and configurations of BMS devices within a building or facility. The ontology attribute 812 may further provide attributes between one or more BMS devices and an area of the building or facility. For example, the ontology attribute 812 may provide information such as "damper BX1F affects area XYZ of building Q." In some embodiments, the ontology attribute 812 may have access to the database 516, which may contain ontology data relating to a BMS, such as BMS 525.

The connection to user info/profile attribute 814 may include permissions associated with individual users. The connection user info/profile attribute 814 may further include other information about the user, such as workspace location, work schedule, direct reports, supervisor, listed skills, maintenance responsibilities, etc. The above attributes examples are exemplary only, and it is contemplated that more attributes or fewer attributes may be used in the agent 800, as required. Finally, the constraints attribute 816 may include constraints applied to the agent. In some embodiments, the constraints can be implemented by the agent generator 522 during generation of the agent 800. In some embodiments, the constraints are system based. For example, the constraint attributes 816 may include BMS related constraints such as fault tolerances, communication capabilities, etc. Example communication capability restrictions may include constraints based on system communication types (mesh, P2P, hierarchical, etc.). Further communication capability constraints may include baud rates, latency, bandwidth, etc. The constraint attributes 816 may further include information system constrains such as system storage capacity, system and/or device processing capability, timing and synchronization of data to the system, etc.

Figure 10:
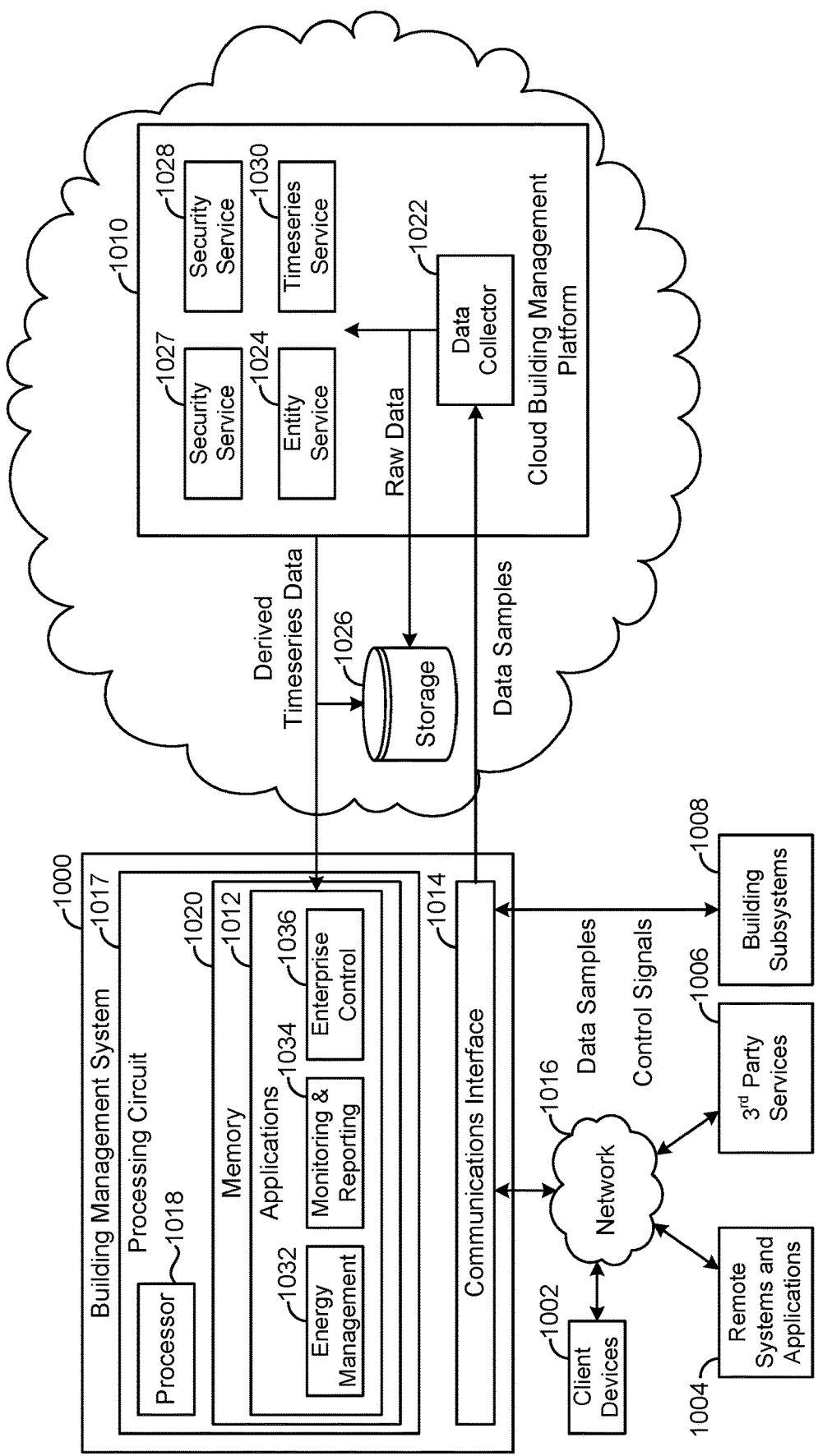
FIG. 10 is a block diagram of another building management system including an entity service and a timeseries service, according to an exemplary embodiment.

The analytic module 820 may be a computational module capable of analyzing data received via the agent manager interface 818, or from the system via the external interface 836. While FIG. 10 shows only a single analytic module 820, it is contemplated that multiple analytic modules 1004 may be located within a single agent 800. In some embodiment, an analytic module 820 can be created for each type of data received by the agent 800. In other embodiments, an analytic module 820 may be created for each operation or analysis operation assigned to the agent. In some embodiments, the agent 800 may generate analytic modules 1004 dynamically to better analyze data, or perform operations based on dynamically changing inputs. For example, the agent may detect a fault or other abnormal data pertaining to a BMS device. The agent 800 may then create a new analytic module 820 to receive the data and provide additional analysis.

The troubleshooting knowledgebase interface 822 may provide a connection to a troubleshooting knowledgebase stored on a database, such as database 516. The troubleshooting knowledgebase interface 822 may allow the agent 800 to access data and information provided over time by multiple agents, as well as by user such as service personnel, administrators, smart devices, etc. For example, the agent 800 may access one or more knowledgebases via the troubleshooting knowledgebase interface 822 to obtain historical data regarding maintenance for a given device or system. The troubleshooting knowledgebase interface 822 may therefore provide agents with historical maintenance data as well as previous solutions presented by the problems. In some embodiments, the agent 800 may use one or more analytic modules 1004 to analyze data received by troubleshooting knowledgebase interface 822 to help provide more helpful information to a user. For example, the agent 800 may perform a statistical analysis on the historical data received via the troubleshooting knowledgebase interface 822, such as a Monte Carlo analysis. This may be used to provide probabilities regarding possible problems and solutions with a given BMS device or system. The troubleshooting knowledgebase interface 822 may allow the agent 800 to analyze the historical data to perform problem categorization. Problem categorization may allow the agent 800 to analyze similar historical problems similar to the current problem and provide data and/or suggestions to a user.

In some embodiments, multiple agents may be used in parallel to perform certain actions. For example, multiple Agents may be used to address a problem by generating a hypothesis, and then subsequently testing the hypothesis. By using multiple agents, the workload can be spread out among multiple systems to allow for quicker analysis of data. In some examples, the parallel agents can use a divide and conquer technique to perform complex tasks more efficiently. For example, multiple agents can be generated to address a potentially faulty device. In one example, the Agents are generated only as needed. Furthermore, the parallel agents can communicate with each other to build upon the information gathered/learned by an individual agent, thereby allowing for more effective performance by the parallel agents as a whole.

The identifier module 824 may include identification data related to the generated agent 800. In some embodiments, the identifier module 824 can include a name and/or an address for the agent 800 within the system. In some embodiments, the agent 800 can generate its own address to allow for integration into an ad hoc network. In some embodiments, the identifier module 824 may include other identification data of the agent 800, such as assigned functionality, associated devices, communication protocol, size (e.g. kb, Mb, etc.), etc. In some embodiments, the data contained within the identifier module 824 may allow other agents in the system 500 to identify each other. This can be advantageous where multiple agents are present in a system, and or parallel agent architectures are implemented.

The system data module 826 may include information regarding the devices in the system 500. Further, the system data module 826 may include information such as communication protocols used between devices, the communication architecture (mesh, P2P, hierarchical), available communication ports, etc. The system data module 826 may further provide communication data such as required handshaking for communication between devices, and or in-kind communications. The system data may further include information relating to other active agents.

The attributes/data fields module 828 may include attributes of the agent 800. In some embodiments, the attributes can be those attributes provided by the agent generator 522 during the generation of the agent 800. In other embodiments, the attributes can be learned attributes. In some embodiments, the agent 800 can be configured to learn attributes over time. Example learned attributes may include report formats, data values, etc. The attributes/data fields module 828 may further include values received via the external interface 836 from the system, or via the agent manager interface 1018. In some embodiments, the values are sensed values, such as those provided by various sensing devices within a system. For example, voltage sensors, current sensors, temperature sensors, pressure sensors, etc., may all provide sensed values to the agent 800. The values may also be inferred values. In one example, the analytic module 820 may analyze one or more measured values provided by the attributes/data fields module 828 and infer one or more values associated with the measured values, and store the inferred value in the attributes/data fields module 828. For example, the analytic module 820 may receive a measured current flow value (Amps) associated with a coil of an actuator from the attributes/data fields module 828. The analytic module 820 may then infer a temperature of the actuator, and provide that inferred data to the attributes/data fields module 828.

Finally, the agent may include an action module 830. The action module 830 may generate outputs that can be output via the external interface 836 and/or the agent manager interface 1018. For example, the action module 830 may output a changed setpoint to a device in the BMS via the external interface 836. In some embodiments, the action module 830 may change the setpoint based on data provided by the analytic module 820, the troubleshooting knowledge-base interface 822 and/or one or more of the attributes 802. In other embodiments, the action module may output data to a user via the agent manager interface 1018. For example, the action module 830 may generate a report to be provided to a user, which can be communicated to the adaptive interaction manager 506 via the agent manager interface 1018. The adaptive interaction manager 506 may then output the report to a user via one or more of the I/O devices 534. In some embodiments, the agent manager interface 1018 may provide direct communication to the agent manager 514. In other embodiments, the agent manager interface 1018 may communicate with the agent manager 514 via a communication link to the adaptive interaction manager 506. The above modules and attributes shown within agent 800 are exemplary only, and it is considered that more modules/attributes and/or less modules/attributes may be present in an agent.

The reactive operators 834 in the agent 800 may be configured to perform certain operations, or produce various outputs based on received data. The data may be received from the learning engine 512, the agent manager 514, the prioritization engine 724, the distribution engine 726, and/or data collectors 702-716. The reactive operators may be algorithms and/or sets of rules for responding to particular states (e.g., building fire, building draft, etc.) received from the agent manager 514 and/or determined by the learning engine 512. The reactive operators 834 may analyze one or more identified operational states, such as those identified by the learning engine, to make a change to and/or operate one or more subsystems of the BMS. In some embodiments, the reactive operators 834 may utilize neural networks, fuzzy logic, condition-action rules, finite state machines, connectionist approaches, or other reactive learning algorithms to perform the required operations. In some embodiments, the reactive learning algorithms are configured to perform certain operations based on the information received from the learning engine 512. The various artificial intelligence models that the reactive operators 834 may be can utilize the state and/or various building data streams (e.g., data of a subsystem controlled by the agent, the synthesized data 652, and/or any other data stream as described herein) as an input and generate a control decision based on the input.

In one example, the agent 800 may receive an indication of an imminent threat risk from the learning engine 512 (e.g., a building state indicating an emergency). The reactive operators 834 within each agent may perform certain actions to mitigate or address the threat. Where the imminent threat is an active shooter event, a security system agent may, based on the received data, isolate one or more routes through the building by locking certain doors. Further, another security system agent may contact authorities, and provide the authorities with the location of the threat within the building. Finally, an agent associated with a human interaction device, such as a public announcement (PA) system, or interactive user display screens, may provide instructions to the occupants of the building on how to proceed. Further, different agents may provide different instructions to the occupants based on their location within the building. For example, those occupants not near the threat may be evacuated, while occupants closer to the threat may be secured and isolated from the threat.

In some embodiments, the agent 800 receives an indication of a confident fire state from the learning engine 512. The reactive operators 834 within the agent may interface with one or more systems or subsystems within the BMS to perform one or more actions based on the indication of a confident fire state. For example, an HVAC agent may instruct one or more HVAC devices to provide exhaust along egress routes to aid in removing any smoke from the egress routs. The reactive algorithm 1038 may further instruct certain HVAC devices to attempt to reduce oxygen in unoccupied areas to aid in preventing the fire from spreading further. Reactive operators 834 of a further agent may provide occupants of the building with details regarding possible exit routs, such as by interfacing with a human machine interaction system. Further, the reactive operators may continuously monitor the egress routes available to the occupants, and adapt the HVAC and security systems in real time based on the current egress routes. Certain agents may monitor outdoor ambient conditions, and open dampers to areas associated with the fire when an outdoor humidity is above a certain level, to attempt to further prevent the spread of the fire within the building.

The reactive operators 834 can be configured to perform a variety of operations within a BMS. By utilizing reactive operators in conjunction with the learning engine 512 and agent manager 514 described above, the agents can provide cognitive functionality based on extracted features and transformed data from multiple, disparate data streams. This can allow for not only more autonomous building management systems, but can also provide increased building efficiency, and stronger, more robust control based on varied data.

Figure 9:
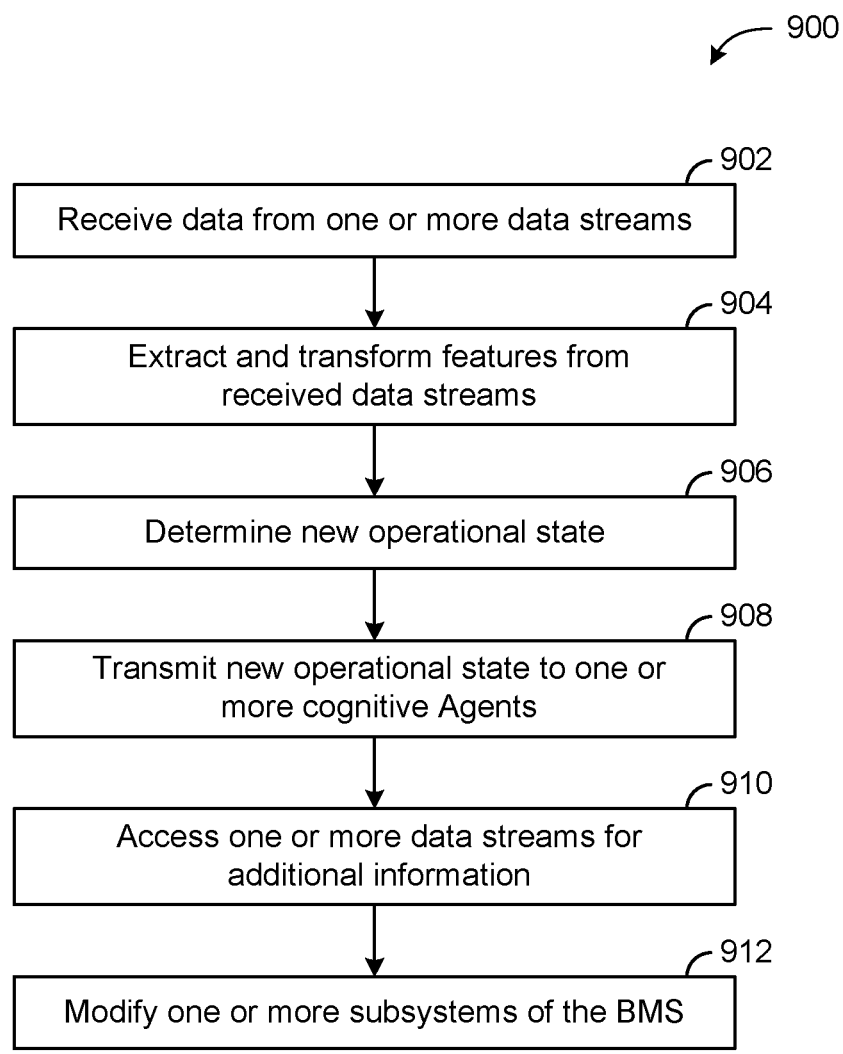
FIG. 9 is a flow chart illustrating a process for controlling one or more subsystems of a building with the learning engine and the agents of FIG. 5, according to an exemplary embodiment.

Referring now to FIG. 9, a process 900 for controlling one or more BMS subsystems via cognitive agents is shown, according to an exemplary embodiment. In some embodiments, the cognitive agents have a similar structure to the software agents discussed above. At process block 902, the data is received from one or more data streams. In some embodiments, the data streams are provided by the data collectors 702-716, described above. For example, the data streams may include security data, BMS data, fire system data, social feed data (e.g. social media feeds, crime information, event information, etc.), video system data, user input (e.g. natural language input data, direct user inputs, etc.), and the like. In some embodiments, the data is received by the learning engine 512 and/or collected by the collectors 702-716. In some embodiments, the data is received by one or more cognitive agents in communication with the learning engine 512. In some embodiments, the data is received by the learning engine 512 and transmitted to the cognitive agents via the agent manager 514 as described above. The agent manager 514 is configured to utilize a prioritization engine 724 and/or a distribution engine 726 to provide the data to the cognitive agents in some embodiments. In some embodiments, the cognitive agents are configured to collect data by themselves from the various building subsystems that the agents are associated with. In some embodiments, the cognitive agents can communicate (send and/or receive) data among each other that the particular cognitive agents have collected form the building subsystems that they are each associated with.

Once the data has been received, features may be extracted and transformed from the received data at process block 904. In some embodiments, the features are extracted and transformed within the learning engine 512. For example, the learning engine 512 may use the feature extraction engine 602 and/or the transformation experiment engine 604 to extract the features from the data. Based on the extracted features, one or more new operational states of a device or system within the BMS may be determined. In some embodiments, the learning engine 512 may determine the new operational states. However, in other embodiments the cognitive agents may determine the operational states. Where the learning engine 512 determines the new operational state, the learning engine 512 may transmit the new operational states to the cognitive agents, such as via the agent manager 514. In some embodiments, the new operational state may include information about an event within the BMS. For example, the new operational state may include an imminent threat risk (e.g. criminal event, such as looting, robbery, terrorism, active shooter, etc.; weather event; etc.), or an event, such as a confident fire state.

In some embodiments, multiple data points from multiple data streams must be evaluated to determine an operational state. For example, to determine the existence of a confident fire state, data from a fire detection system, a video system, and an HVAC system may be examined to determine the confident fire state. As an illustration, where the fire detection system indicates an activated fire alarm, the other data streams may be evaluated to confirm the fire state. Data from the video system may then be evaluated to determine if smoke or fire is visible. Further, data from the HVAC system may include determining a temperature in a space where there fire alarm was generated, to determine if a temperature increase exists to indicate a fire condition.

Once the new operational state is determined, the new operational state is transmitted to one or more cognitive agents within the system at process block 908. In some embodiments, the learning engine 512 may transmit the determined new operation state to the cognitive agents via the agent manager 514. In other embodiments, where a cognitive agent determines the new operational state, the cognitive agent may transmit the new operational state to one or more cognitive agents in the system. For example, the cognitive agent may transmit the new operational state to the other cognitive agents via the agent manager 514. Upon receiving the new operational state, the cognitive agents access one or more data sources to obtain additional information (process block 910). For example, an HVAC agent, such as the HVAC agents associated with ventilation 718 may access an occupancy data stream, a weather data stream, and HVAC data stream. Other agents, such as access control agents, such as security agents 720, may access occupancy data, door lock status data, video system data, fire system data, etc. Additionally, fire detection agents, such as security agents associated with fire detection 722, may access data streams such as fire system data streams, occupancy data, HVAC data, etc. Additionally, one or more of the cognitive agents may access system history data, current BMS status data, and/or other data streams as related to the new operational state.

At process block 912, the one or more cognitive agents may modify one or more subsystems of the BMS based on the new operational state and the data collected from the accessed data streams. For example, where the new condition is a fire condition, the HVAC agent may increase an exhaust air flow in areas having one or more occupants, while in unoccupied areas, the HVAC agent may modify the HVAC system to reduce the oxygen level to help prevent the spread of the fire event, based on data received from the occupancy data stream.

Further, the HVAC agent may access the weather data stream to determine one or more outdoor conditions. For example, where the outside air is humid, the HVAC agent may instruct one or more dampers in proximity to the fire state to open, thereby increasing the humidity level within the building. Similarly, the access control cognitive agent may analyze data received from the one or more data feeds to modify one or more subsystem within the BMS. For example, the access control cognitive agent may combine occupancy data and video system data to determine where occupants are and where they are heading (e.g. exiting the building). The access control agent may then unlock specific doors to provide an effective egress path for the occupants. The access control cognitive agent may further monitor the progress of the fire provided by the fire system data stream to ensure that the egress path provided to the occupants avoid fire and smoke as effectively as possible. Further, the access control cognitive agent may lock certain doors to prevent occupants from heading towards the fire, and/or to prevent the spread of the fire within the building. The access control cognitive agent may further utilize video system data to allow access for authorized persons, such as firefighters, paramedics, and the like.

Finally, the fire detection agents may evaluate the fire system data, and the occupancy data to activate one or more fire protection systems. For example, the fire detection agents may activate certain fire suppression systems, such as halon system, when there are no occupants. Alternatively, if certain occupants are unable to exit their location due to the fire, the fire suppression system may divert fire suppression system resources (e.g. sprinkler pressure), to attempt to suppress the fire near the occupants. Further, the fire detection agents may communicate with one or more HVAC agents to inform the HVAC agents of the need to attempt to protect one or more occupants, based on the information from the fire detection agents, the HVAC agents may increase exhaust air flow near the occupants, and increase the fresh air intake in order to attempt to remove smoke near the occupants.

As described above, the cognitive agents are further configured to communicate with each other to allow for multiple agents to coordinate between themselves to modify one or more subsystems based on a new operational state. This coordination ensures that one or more actions can be taken to address one or more new operational states within a BMS by allowing for agents associated with multiple disparate subsystems within the BMS to not only provide information between the agents, but also to allow for coordinated actions to be accomplished.

Cloud Building Management Platform Entity Service

Referring now to FIG. 10, a block diagram of another building management system (BMS) 1000 is shown, according to some embodiments. The BMS 1000 can be configured to collect data samples from client devices 1002, remote systems and applications 1012, 3$^{rd}$ party services 1006, and/or building subsystems 1008, and provide the data samples to cloud building management platform 1010 to generate raw timeseries data, derived timeseries data, and/or entity data from the data samples. The cloud building management platform 1010 can process and transform the data samples to generate derived timeseries data. Throughout this disclosure, the term "derived timeseries data" is used to describe the result or output of a transformation or other timeseries processing operation performed by various services of the building management platform 1010 (e.g., data aggregation, data cleansing, virtual point calculation, etc.). The term "entity data" is used to describe the attributes of various smart entities (e.g., IoT systems, devices, components, sensors, and the like) and the relationships between the smart entities. The derived timeseries data can be provided to various applications 1012 and/or stored in storage 1026 (e.g., as materialized views of the raw timeseries data). In some embodiments, the cloud building management platform 1010 separates data collection; data storage, retrieval, and analysis; and data visualization into three different layers. This allows the cloud building management platform 1010 to support a variety of applications 1012 that use the derived timeseries data and allows new applications 1012 to reuse the existing infrastructure provided by the cloud building management platform 1010.

It should be noted that the components of the BMS 1000 and/or the cloud building management platform 1010 can be integrated within a single device (e.g., a supervisory controller, a BMS controller, etc.) or distributed across multiple separate systems or devices. In other embodiments, some or all of the components of the BMS 1000 and/or the cloud building management platform 1010 can be implemented as part of a cloud-based computing system configured to receive and process data from one or more building management systems. In some embodiments, some or all of the components of the BMS 1000 and/or the cloud building management platform 1010 can be components of a subsystem level controller (e.g., a HVAC controller), a subplant controller, a device controller (e.g., the AHU controller 330, a chiller controller, etc.), a field controller, a computer workstation, a client device, or any other system or device that receives and processes data from building systems and equipment.

The BMS 1000 can include many of the same components as the BMS 400, as described with reference to FIG. 4. For example, the BMS 1000 can include a communications interface 1014 (including the BMS interface 409 and the communications interface 407 from FIG. 4). The interface 1014 can include wired or wireless communications interfaces (e.g., jacks, antennas, transmitters, receivers, transceivers, wire terminals, etc.) for conducting data communications with the client devices 1002, the remote systems and applications 1012, the 3$^{rd}$ party services 1006, the building subsystems 1008 or other external systems or devices. Communications conducted via the interface 1014 can be direct (e.g., local wired or wireless communications) or via a communications network 1016 (e.g., a WAN, the Internet, a cellular network, etc.).

The communications interface 1014 can facilitate communications between the BMS 1000, the cloud building management platform 1010, the building subsystems 1008, client devices 1002 and the external applications (e.g., the remote systems and applications 1012 and the 3$^{rd}$ party services 1006) for allowing user control, monitoring, and adjustment to BMS 1000. The BMS 1000 can be configured to communicate with the building subsystems 1008 using any of a variety of building automation systems protocols (e.g., BACnet, Modbus, ADX, etc.). In some embodiments, the BMS 1000 receives data samples from the building subsystems 1008 and provides control signals to building subsystems 1008 via the interface 1014. In some embodiments, the BMS 1000 receives data samples from the 3$^{rd}$ party services 1006, such as, for example, weather data from a weather service, news data from a news service, documents and other document-related data from a document service, media (e.g., video, images, audio, social media, etc.) from a media service, and/or the like, via the interface 1014 (e.g., via APIs or any suitable interface).

The building subsystems 1008 can include the building electrical subsystem 434, the information communication technology (ICT) subsystem 436, the security subsystem 438, the HVAC subsystem 440, the lighting subsystem 442, the lift/escalators subsystem 432, and/or the fire safety subsystem 430, as described with reference to FIG. 5. In various embodiments, the building subsystems 1008 can include fewer, additional, or alternative subsystems. For example, the building subsystems 1008 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control the building 10. In some embodiments, the building subsystems 1008 include the waterside system 200 and/or the airside system 300, as described with reference to FIGS. 2-3. Each of the building subsystems 1008 can include any number of devices, controllers, and connections for completing its individual operations and control activities. The building subsystems 1008 can include building equipment (e.g., sensors, air handling units, chillers, pumps, valves, etc.) configured to monitor and control a building condition such as temperature, humidity, airflow, etc.

Still referring to FIG. 10, the BMS 1000 is shown to include a processing circuit 1017 including a processor 1018 and memory 1020. The loud building management platform 1010 may include one or more processing circuits including one or more of the processors 1018 and the memory 1020. Each of the processors 1018 can be a general purpose or specific purpose processor, an application specific integrated circuit (ASIC), one or more field programmable gate arrays (FPGAs), a group of processing components, or other suitable processing components. Each of the processors 1018 is configured to execute computer code or instructions stored in the memory 1020 or received from other computer readable media (e.g., CDROM, network storage, a remote server, etc.).

The memory 1020 can include one or more devices (e.g., memory units, memory devices, storage devices, etc.) for storing data and/or computer code for completing and/or facilitating the various processes described in the present disclosure. Memory 1020 can include random access memory (RAM), read-only memory (ROM), hard drive storage, temporary storage, non-volatile memory, flash memory, optical memory, or any other suitable memory for storing software objects and/or computer instructions. The memory 1020 can include database components, object code components, script components, or any other type of information structure for supporting the various activities and information structures described in the present disclosure. The memory 1020 can be communicably connected to the processors via the processing circuits and can include computer code for executing (e.g., by the processor 508) one or more processes described herein.

Still referring to FIG. 10, the cloud building management platform 1010 is shown to include a data collector 1022. The data collector 1022 can receive data samples from the $3^{rd}$ party services 1006 and the building subsystems 1008 via the interface 1014. However, the present disclosure is not limited thereto, and the data collector 1022 may receive the data samples directly from the $3^{rd}$ party service 1006 or the building subsystems 1008 (e.g., via the network 1016 or via any suitable method). In some embodiments, the data samples include data values for various data points. The data values can be measured and/or calculated values, depending on the type of data point. For example, a data point received from a temperature sensor can include a measured data value indicating a temperature measured by the temperature sensor. A data point received from a chiller controller can include a calculated data value indicating a calculated efficiency of the chiller. A data sample received from a 3rd party weather service can include both a measured data value (e.g., current temperature) and a calculated data value (e.g., forecast temperature). The data collector 1022 can receive data samples from multiple different devices (e.g., IoT devices, sensors, etc.) within the building subsystems 1008, and from multiple different $3^{rd}$ party services (e.g., weather data from a weather service, news data from a news service, etc.) of the $3^{rd}$ party services 1006.

The data samples can include one or more attributes that describe or characterize the corresponding data points. For example, the data samples can include a name attribute defining a point name or ID (e.g., "B1F4R2.T-Z"), a device attribute indicating a type of device from which the data samples is received (e.g., temperature sensor, humidity sensor, chiller, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to the BMS 1000 and/or the cloud building management platform 1010. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was measured or calculated. In other embodiments, the data collector 1022 adds timestamps to the data samples based on the times at which the data samples are received. The data collector 1022 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by the data collector 1022 is as follows:

[<key, timestamp$_1$, value$_1$>, <key, timestamp$_2$, value$_2$>, <key, timestamp$_3$, value$_3$>]

where key is an identifier of the source of the raw data samples (e.g., timeseries ID, sensor ID, device ID, etc.), timestamp$_i$ identifies the time at which the ith sample was collected, and value$_i$ indicates the value of the ith sample.

The data collector 1022 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14: 10: 02) and an offset indicating that the local timestamp is six hours behind universal time (e.g., Offset=−6: 00). The offset can be adjusted (e.g., +1: 00 or −1: 00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, the data collector 1022 organizes the raw timeseries data. The data collector 1022 can identify a system or device associated with each of the data points. For example, the data collector 1022 can associate a data point with a temperature sensor, an air handler, a chiller, or any other type of system or device. In some embodiments, a data entity may be created for the data point, in which case, the data collector 1022 (e.g., via entity service) can associate the data point with the data entity. In various embodiments, data collector uses the name of the data point, a range of values of the data point, statistical characteristics of the data point, or other attributes of the data point to identify a particular system or device associated with the data point. The data collector 1022 can then determine how that system or device relates to the other systems or devices in the building site from entity data. For example, the data collector 1022 can determine that the identified system or device is part of a larger system (e.g., a HVAC system) or serves a particular space (e.g., a particular building, a room or zone of the building, etc.) from the entity data. In some embodiments, the data collector 1022 uses or retrieves an entity graph (e.g., via the entity service 1024) when organizing the timeseries data.

The data collector 1022 can provide the raw timeseries data to the services of the cloud building management platform 1010 and/or store the raw timeseries data in the storage 1026. The storage 614 may be internal storage or external storage. For example, the storage 1026 can be internal storage with relation to the cloud building management platform 1010 and/or the BMS 1000, and/or may include a remote database, cloud-based data hosting, or other remote data storage. The storage 1026 can be configured to store the raw timeseries data obtained by the data collector 1022, the derived timeseries data generated by the cloud building management platform 1010, and/or directed acyclic graphs (DAGs) used by the cloud building management platform 1010 to process the timeseries data.

Still referring to FIG. 10, the cloud building management platform 1010 can receive the raw timeseries data from the data collector 1022 and/or retrieve the raw timeseries data from the storage 1026. The cloud building management platform 1010 can include a variety of services configured to analyze, process, and transform the raw timeseries data. For example, the cloud building management platform 1010 can include a security service 1027, an analytics service 624, an entity service 1024, and a timeseries service 1030. The security service 1027 can assign security attributes to the raw timeseries data to ensure that the timeseries data are only accessible to authorized individuals, systems, or applications. The security service 1027 may include a messaging layer to exchange secure messages with the entity service 1024. In some embodiment, the security service 1027 may provide permission data to the entity service 1024 so that the entity service 1024 can determine the types of entity data that can be accessed by a particular entity or device. The entity service 1024 can assign entity information (or entity data) to the timeseries data to associate data points with a particular system, device, or space. The timeseries service 1030 and the analytics service 624 can apply various transformations, operations, or other operations to the raw timeseries data to generate derived timeseries data.

In some embodiments, the timeseries service 1030 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 1030 provide an efficient mechanism for the applications 1012 to query the timeseries data. For example, the applications 1012 can construct visualizations of the timeseries data (e.g., charts, graphs, etc.) using the pre-aggregated data rollups instead of the raw timeseries data. This allows the applications 1012 to simply retrieve and present the pre-aggregated data rollups without requiring the applications 1012 to perform an aggregation in response to the query. Since the data rollups are pre-aggregated, the applications 1012 can present the data rollups quickly and efficiently without requiring additional processing at query time to generate aggregated timeseries values.

In some embodiments, the timeseries service 1030 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, the timeseries service 1030 can calculate a virtual data point (pointID$_3$) by adding two or more actual data points (pointID$_1$ and pointID$_2$) (e.g., pointID$_3$=pointID$_1$+pointID$_2$). As another example, the timeseries service 1030 can calculate an enthalpy data point (pointID$_4$) based on a measured temperature data point (pointID$_5$) and a measured pressure data point (pointID$_6$) (e.g., pointID$_4$=enthalpy(pointID$_5$, pointID$_6$)). The virtual data points can be stored as derived timeseries data.

The applications 1012 can access and use the virtual data points in the same manner as the actual data points. The applications 1012 may not need to know whether a data point is an actual data point or a virtual data point since both types of data points can be stored as derived timeseries data and can be handled in the same manner by The applications 1012. In some embodiments, the derived timeseries are stored with attributes designating each data point as either a virtual data point or an actual data point. Such attributes allow the applications 1012 to identify whether a given timeseries represents a virtual data point or an actual data point, even though both types of data points can be handled in the same manner by the applications 1012. These and other features of the timeseries service 1030 are described in greater detail with reference to FIG. 13.

In some embodiments, the analytics service 1028 analyzes the raw timeseries data and/or the derived timeseries data to detect faults. The analytics service 1028 can apply a set of fault detection rules to the timeseries data to determine whether a fault is detected at each interval of the timeseries. Fault detections can be stored as derived timeseries data. For example, the analytics service 1028 can generate a new fault detection timeseries with data values that indicate whether a fault was detected at each interval of the timeseries. The fault detection timeseries can be stored as derived timeseries data along with the raw timeseries data in the storage 1026.

In some embodiments, the analytics service 1028 analyzes the raw timeseries data and/or the derived timeseries data with the entity data to generate alerts or warnings, analyze risks, and determine threats. For example, the analytics service 1028 can apply probabilistic machine learning methods to model risks associated with an asset. An asset may be any resource or entity type, such as, for example, a person, building, space, system, equipment, device, sensor, and the like. The analytics service 1028 can generate a risk score associated with an asset based on model parameters. The model parameters can be automatically updated based on feedback on the accuracy of the risk predictions. For example, the feedback may be explicit (e.g., based on questionnaires, disposition of alerts, and the like) or implicit (e.g., analyzing user actions on each threat or alert to estimate the importance of a particular event, and the like). The risk score may be stored as derived timeseries. For example, the analytics service 1028 (e.g., via the timeseries service 1030) can generate a risk score timeseries with data values indicating the risk score at each interval of the timeseries. The risk score timeseries can be stored as derived timeseries data along with the raw timeseries data in the storage 1026. The risk scores can then be retrieved, for example, by a risk dashboard from the timeseries service 1030.

Still referring to FIG. 10, the BMS 1000 is shown to include several applications 1012 including an energy management application 1032, monitoring and reporting applications 1034, and enterprise control applications 1036. Although only a few of the applications 1012 are shown, it is contemplated that the applications 1012 can include any of a variety of suitable applications configured to use the raw or derived timeseries generated by the cloud building management platform 1010. In some embodiments, the applications 1012 exist as a separate layer of the BMS 1000 (e.g., a part of the cloud building management platform 1010 and/or the data collector 1022). In other embodiments, the applications 1012 can exist as remote applications that run on remote systems or devices (e.g., remote systems and the applications 1012, the client devices 1002, and/or the like).

The applications 1012 can use the derived timeseries data to perform a variety of data visualization, monitoring, and/or control activities. For example, the energy management application 1032 and the monitoring and reporting application 1034 can use the derived timeseries data to generate user interfaces (e.g., charts, graphs, etc.) that present the derived timeseries data to a user. In some embodiments, the user interfaces present the raw timeseries data and the derived data rollups in a single chart or graph. For example, a dropdown selector can be provided to allow a user to select the raw timeseries data or any of the data rollups for a given data point.

The enterprise control application 1036 can use the derived timeseries data to perform various control activities. For example, the enterprise control application 1036 can use the derived timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for building subsystems 1008. In some embodiments, the building subsystems 1008 use the control signals to operate building equipment. Operating the building equipment can affect the measured or calculated values of the data samples provided to the BMS 1000 and/or the cloud building management platform 1010. Accordingly, the enterprise control application 1036 can use the derived timeseries data as feedback to control the systems and devices of the building subsystems 1008.

Figure 11:
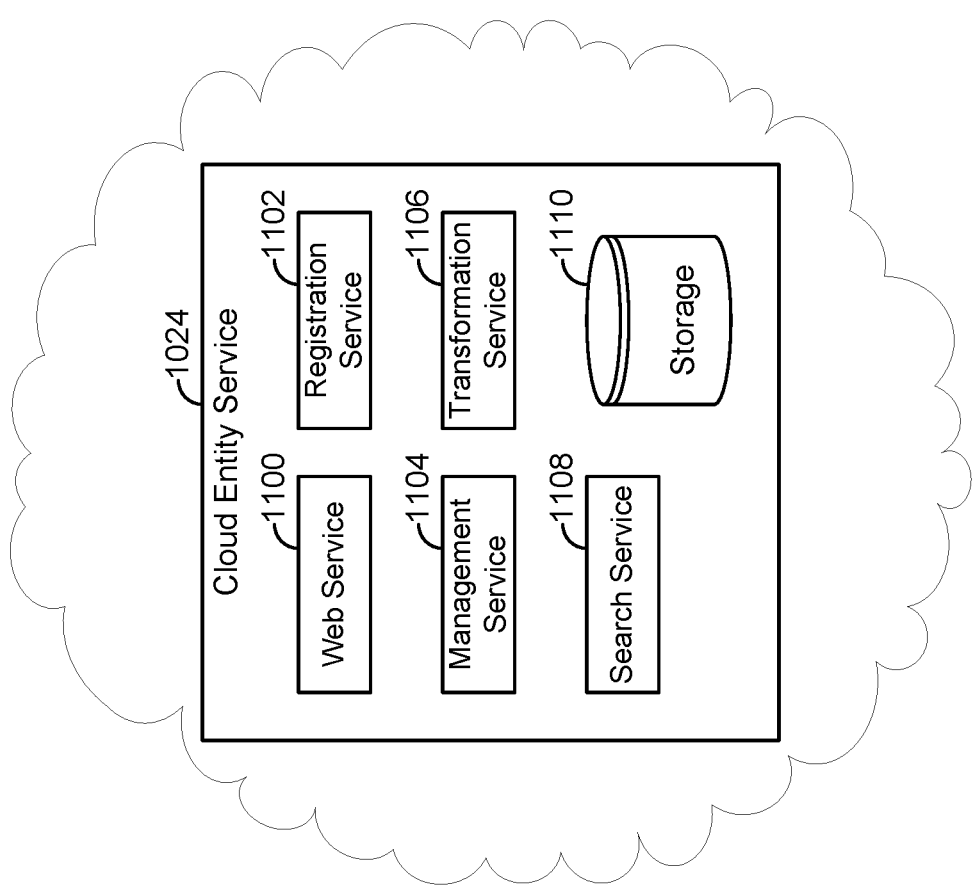
FIG. 11 is a block diagram illustrating the entity service of FIG. 10 in greater detail, according to an exemplary embodiment.

Referring now to FIG. 11, a block diagram illustrating the entity service 1024 in greater detail is shown, according to some embodiments. The entity service 1024 registers and manages various buildings (e.g., building 10), spaces, persons, subsystems (e.g., the subsystems 428), devices (e.g., the devices of the waterside system 200 and the airside system 300), and other entities in the cloud building management platform 1010. According to various embodiments, an entity may be any person, place, or physical object, hereafter referred to as an object entity. Further, an entity may be any event, data point, or record structure, hereinafter referred to as data entity. In addition, an entity may define a relationship between entities, hereinafter referred to as a relational entity.

In some embodiments, an object entity may be defined as having at least three types of attributes. For example, an object entity may have a static attribute, a dynamic attribute, and a behavioral attribute. The static attribute may include any unique identifier of the object entity or characteristic of the object entity that either does not change over time or changes infrequently (e.g., a device ID, a person's name or social security number, a place's address or room number, and the like). The dynamic attribute may include a property of the object entity that changes over time (e.g., location, age, measurement, data point, and the like). In some embodiments, the dynamic attribute of an object entity may be linked to a data entity. In this case, the dynamic attribute of the object entity may simply refer to a location (e.g., data/network address) or static attribute (e.g., identifier) of the linked data entity, which may store the data (e.g., the value or information) of the dynamic attribute. Accordingly, in some such embodiments, when a new data point (e.g., timeseries data) is received for the object entity, only the linked data entity may be updated, while the object entity remains unchanged. Therefore, resources that would have been expended to update the object entity may be reduced.

However, the present disclosure is not limited thereto. For example, in some embodiments, there may also be some data that is updated (e.g., during predetermined intervals) in the dynamic attribute of the object entity itself. For example, the linked data entity may be configured to be updated each time a new data point is received, whereas the corresponding dynamic attribute of the object entity may be configured to be updated less often (e.g., at predetermined intervals less than the intervals during which the new data points are received). In some implementations, the dynamic attribute of the object entity may include both a link to the data entity and either a portion of the data from the data entity or data derived from the data of the data entity. For example, in an embodiment in which periodic temperature readings are received from a thermostat, an object entity corresponding to the thermostat could include the last temperature reading and a link to a data entity that stores a series of the last ten temperature readings received from the thermostat.

The behavioral attribute may define a behavior of the object entity, for example, based on inputs, capabilities, and/or permissions. For example, behavioral attributes may define the types of inputs that the object entity is configured to accept, how the object entity is expected to respond under certain conditions, the types of operations that the object entity is capable of performing, and the like. As a non-limiting example, if the object entity represents a person, the behavioral attribute of the person may be his/her job title or job duties, user permissions to access certain systems or locations, expected location or behavior given a time of day, tendencies or preferences based on connected activity data received by entity service 1024 (e.g., social media activity), and the like. As another non-limiting example, if the object entity represents a device, the behavioral attributes may include the types of inputs that the device can receive, the types of outputs that the device can generate, the types of controls that the device is capable of, the types of software or versions that the device currently has, known responses of the device to certain types of input (e.g., behavior of the device defined by its programming), and the like.

In some embodiments, the data entity may be defined as having at least a static attribute and a dynamic attribute. The static attribute of the data entity may include a unique identifier or description of the data entity. For example, if the data entity is linked to a dynamic attribute of an object entity, the static attribute of the data entity may include an identifier that is used to link to the dynamic attribute of the object entity. In some embodiments, the dynamic attribute of the data entity represents the data for the dynamic attribute of the linked object entity. In some embodiments, the dynamic attribute of the data entity may represent some other data that is derived, analyzed, inferred, calculated, or determined based on data from data sources.

In some embodiments, the relational entity may be defined as having at least a static attribute. The static attribute of the relational entity may semantically define the type of relationship between two or more entities. For example, in a non-limiting embodiment, a relational entity for a relationship that semantically defines that Entity A has a part of Entity B, or that Entity B is a part of Entity A may include:

hasPart{Entity A, Entity B} where the static attribute hasPart defines what the relationship is of the listed entities, and the order of the listed entities or data field of the relational entity specifies which entity is the part of the other (e.g., Entity A→hasPart→Entity B).

In various embodiments, the relational entity is an object-oriented construct with predefined fields that define the relationship between two or more entities, regardless of the type of entities. For example, the cloud building management platform 1010 can provide a rich set of pre-built entity models with standardized relational entities that can be used to describe how any two or more entities are semantically related, as well as how data is exchanged and/or processed between the entities. Accordingly, a global change to a definition or relationship of a relational entity at the system level can be effected at the object level, without having to manually change the entity relationships for each object or entity individually. Further, in some embodiments, a global change at the system level can be propagated through to third-party applications integrated with the cloud building management platform 1010 such that the global change can be implemented across all of the third-party applications without requiring manual implementation of the change in each disparate application.

Figure 12:
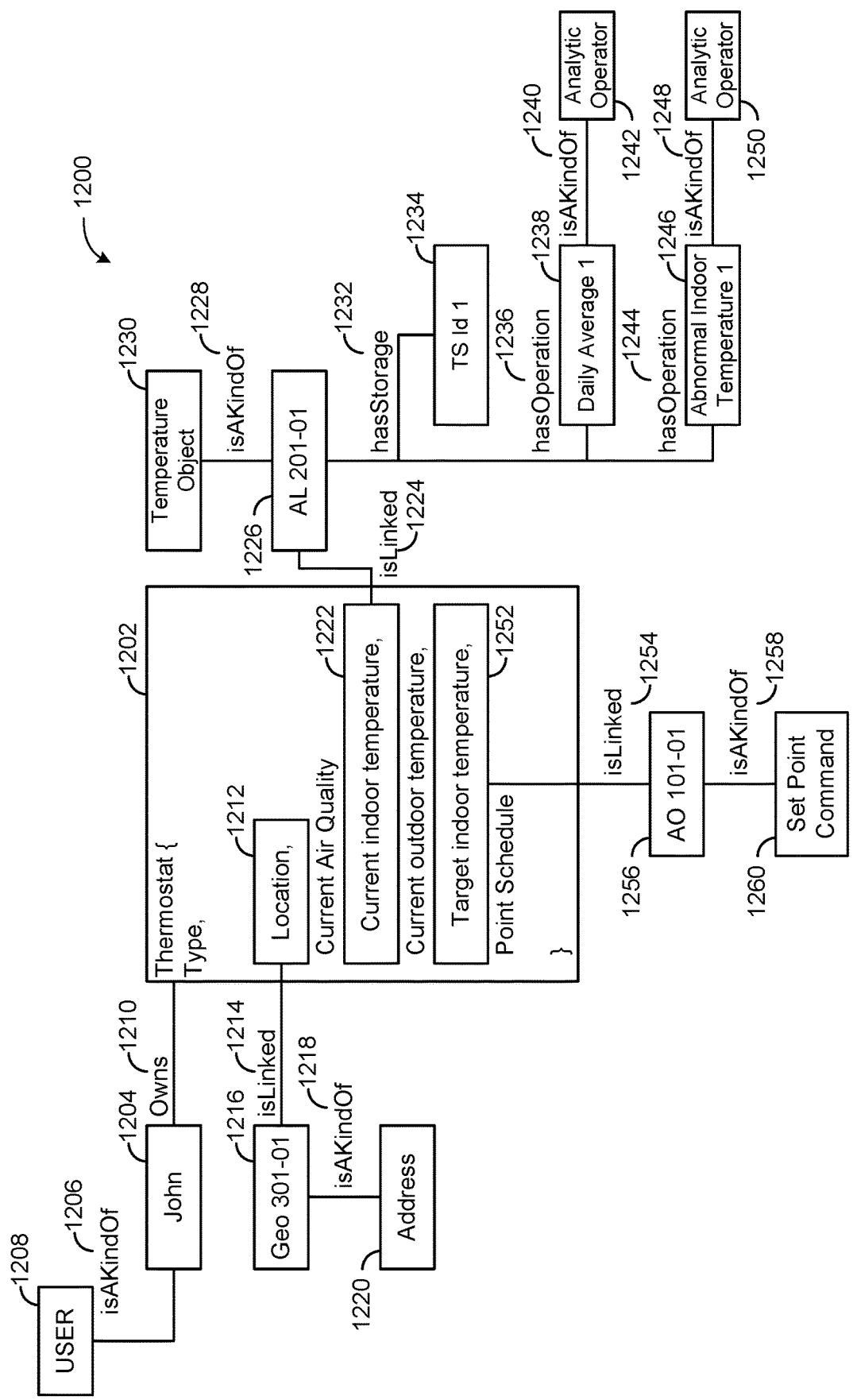
FIG. 12 in an example entity graph of entity data, according to an exemplary embodiment.

For example, referring to FIG. 12, an example entity graph of entity data is shown, according to some embodiments. The term "entity data" is used to describe the attributes of various entities and the relationships between the entities. For example, entity data may be represented in the form of an entity graph. In some embodiments, entity data includes any suitable predefined data models (e.g., as a table, JSON data, and/or the like), such as entity type or object, and further includes one or more relational entities that semantically define the relationships between the entities. The relational entities may help to semantically define, for example, hierarchical or directed relationships between the entities (e.g., entity X controls entity Y, entity A feeds entity B, entity 1 is located in entity 2, and the like). For example, an object entity (e.g., IoT device) may be represented by entity type or object, which generally describes how data corresponding to the entity will be structured and stored.

For example, an entity type (or object) "Thermostat" may be represented via the below schema:

```
Thermostat{
    Type,
    Model No,
    Device Name,
    Manufactured date,
    Serial number,
    MAC address,
    Location,
    Current air quality,
    Current indoor temperature,
    Current outdoor temperature,
    Target indoor temperature,
    Point schedule (e.g., BACnet schedule object)
}
``` where various attributes are static attributes (e.g., "Type," "Model Number," "Device Name," etc.,), dynamic attributes (e.g., "Current air quality," "Current outdoor temperature," etc.), or behavioral attributes (e.g., "Target indoor temperature," etc.) for the object entity "thermostat." In a relational database, the object "Thermostat" is a table name, and the attributes represents column names.

An example of an object entity data model for a person named John Smith in a relational database may be represented by the below table:

| First Name | Last Name | Tel. No. | Age | Location | Job Title |
|---|---|---|---|---|---|
| John | Smith | (213)220-XXXX | 36 | Home | Engineer | where various attributes are static attributes (e.g., "First Name," "Last Name," etc.,), dynamic attributes (e.g., "Age," "Location," etc.), or behavioral attributes (e.g., "Engineer") for the object entity "John Smith."

An example data entity for the data point "Current indoor temperature" for the "Thermostat" owned by John Smith in a relational database may be represented by the below table:

| Present-Value | Description | Device_Type | Unit of measure |
|---|---|---|---|
| 68 | "Current indoor temperature of John's house" | Thermostat | Degrees-F. | where various attributes are static attributes (e.g., "Description" and "Device_Type") and dynamic attributes (e.g., "Present-Value").

While structuring the entities via entity type or object may help to define the data representation of the entities, these data models do not provide information on how the entities relate to each other. For example, a BMS, building subsystem, or device may need data from multiple sources as well as information on how the sources relate to each other in order to provide a proper decision, action, or recommendation. Accordingly, in various embodiments, the entity data further includes the relational entities to semantically define the relationships between the entities, which may help to increase speeds in analyzing data, as well as provide ease of navigation and browsing.

For example, still referring to FIG. 12, an entity graph 1200 for the Thermostat object entity 1202 includes various class entities (e.g., User, Address, SetPoint Command, and Temperature Object), relational entities (e.g., isAKindOf, Owns, isLinked, hasStorage, and hasOperation), and data entities (AI 201-01, TS ID 1, Daily Average 1, Abnormal indoor temp 1, AO 101-1, and Geo 301-01). The relational entities describe the relationships between the various class, object, and data entities in a semantic and syntactic manner, so that an application or user viewing the entity graph 1200 can quickly determine the relationships and data process flow of the Thermostat object entity 1202, without having to resort to a data base analyst or engineer to create, index, and/or manage the entities (e.g., using SQL or NoSQL).

For example, the entity graph 1200 shows that a person named John (object entity) 1204 isAKindOf (relational entity) 1206 User (class entity) 1208. John 1204 Owns (relational entity) 1210 the Thermostat 1202. The Thermostat 1202 has a location attribute (dynamic attribute) 1212 that isLinked (relational entity) 1214 to Geo 301-01 (data entity) 1216, which isAKindOf (relational entity) 1218 and Address (class entity) 1220. Accordingly, Geo 301-01 1216 should have a data point corresponding to an address.

The Thermostat 1202 further includes a "Current indoor temperature" attribute (dynamic attribute) 1222 that isLinked (relational entity) 1224 to AI 201-01 (data entity) 1226. AI 201-01 1226 isAKindOf (relational entity) 1228 Temperature Object (class entity) 1230. Thus, AI 201-01 1226 should contain some sort of temperature related data. AI 201-01 1226 hasStorage (relational entity) 1232 at TS ID 1 (data entity) 834, which may be raw or derived timeseries data for the temperature readings. AI 201-01 1226 hasOperation (relational entity) 1236 of Daily Average 1 (data entity) 1238, which isAKindOf (relational entity) 1240 Analytic Operator (class entity) 1242. Thus, Daily Average 1 results from an analytic operation that calculates the daily average of the indoor temperature. AI 201-01 1226 further hasOperation (relational entity) 1244 of Abnormal Indoor Temperature (data entity) 1246, which isAKindOf (relational entity) 1248 Analytic Operator (class entity) 1250. Accordingly, Abnormal Indoor Temperature results from an analytic operation to determine an abnormal temperature (e.g., exceeds or falls below a threshold value).

In this example, the data entity AI 201-01 1226 may be represented by the following data model:

```
point {
    name: "AI 201-01";
    type: "analog input";
    value: 72;
    unit: "Degree-F";
    source: "Temperature Sensor 1"
}
``` where "point" is an example of a data entity that may be created by cloud building management platform 1010 to hold the value for the linked "Current indoor temperature" 822 dynamic attribute of the Thermostat entity 1202, and source is the sensor or device in the Thermostat device that provides the data to the linked "Current indoor temperature" 1222 dynamic attribute.

The data entity TS Id 1 534 may be represented, for example, by the following data model:

```
timeseries {
    name: "TS Id 1";
    type: "Daily Average";
    values: "[68, 20666, 70, 69, 71];
    unit: "Degree-F";
    point: "AI 201-01";
    source: "Daily Average 1"
}
``` where the data entity Daily Average 1 1238 represents a specific analytic operator used to create the data entity for the average daily timeseries TS Id 1 1238 based on the values of the corresponding data entity for point AI 201-01 1226. The relational entity hasOperation shows that the AI 201-01 data entity 1226 is used as an input to the specific logic/math operation represented by Daily Average 1 1238. TS Id 1 834 might also include an attribute that identifies the analytic operator Daily Average 1 1238 as the source of the data samples in the timeseries.

Still referring to FIG. 12, the entity graph 1200 for Thermostat 1202 shows that the "Target indoor temperature" attribute (dynamic attribute) 1252 isLinked (relational attribute) 1254 to the data entity AO 101-01 (data entity) 1256. AO 101-01 data entity 1256 isAKindOf (relational attribute) 1258 SetPoint Command (class entity) 1260. Thus, the data in data entity AO 101-01 1256 may be set via a command by the user or other entity, and may be used to control the Thermostat object entity 1202. Accordingly, in various embodiments, entity graph 1200 provides a user friendly view of the various relationships between the entities and data processing flow, which provides for ease of navigation, browsing, and analysis of data.

Referring again to FIG. 11, the entity service 1024 may transform raw data samples and/or raw timeseries data into data corresponding to entity data. For example, as discussed above with reference to FIG. 8, entity service 1024 can create data entities that use and/or represent data points in the timeseries data. Entity service 1024 includes a web service 1100, a registration service 1102, a management service 1104, a transformation service 1106, a search service 1108, and the storage 1110. In some embodiments, the storage 1110 may be internal storage or external storage. For example, the storage 1110 may be storage 1026 (see FIG. 10), internal storage with relation to the entity service 1024, and/or may include a remote database, cloud-based data hosting, or other remote data storage.

The web service 1100 can be configured to interact with web-based applications to send entity data and/or receive raw data (e.g., data samples, timeseries data, and the like). For example, the web service 1100 can provide an interface (e.g., API, UI/UX, and the like) to manage (e.g., register, create, edit, delete, and/or update) an entity (e.g., class entity, object entity, data entity, relational entity, and/or the like). In some embodiments, the web service 1100 provides entity data to web-based applications. For example, if one or more of the applications 1012 are web-based applications, the web service 1100 can provide entity data to the web-based applications. In some embodiments, the web service 1100 receives raw data samples and/or raw timeseries data including device information from a web-based data collector, or a web-based security service to identify authorized entities and to exchange secured messages. For example, if the data collector 1022 is a web-based application, the web service 1100 can receive the raw data samples and/or timeseries data including a device attribute indicating a type of device (e.g., IoT device) from which the data samples and/or timeseries data are received from the data collector 1022. In some embodiments, the web service 1100 may message the security service 1027 to request authorization information and/or permission information of a particular user, building, BMS, building subsystem, device, application, or other entity. In some embodiments, the web service 1100 receives derived timeseries data from the timeseries service 1030, and/or may provide entity data to timeseries service 1030. In some embodiments, the entity service 1024 processes and transforms the collected data to generate the entity data.

The registration service 1102 can perform registration of devices and entities. For example, the registration service 1102 can communicate with the building subsystems 1008 and the client devices 1002 (e.g., via the web service 1100) to register each entity (e.g., building, BMS, building subsystems, devices, and the like) with the cloud building management platform 1010. In some embodiments, registration service 1102 registers a particular building subsystem 1008 (or the devices therein) with a specific user and/or a specific set of permissions and/or entitlements. For example, a user may register a device key and/or a device ID associated with the device via a web portal (e.g., the web service 1100). In some embodiments, the device ID and the device key may be unique to the device. The device ID may be a unique number associated with the device such as a unique alphanumeric string, a serial number of the device, and/or any other static identifier. In various embodiments, the device is provisioned by a manufacturer and/or any other entity. In various embodiments, the device key and/or device ID are saved to the device or building subsystem 1008 based on whether the device includes a trusted platform module (TPM). If the device includes a TPM, the device or building subsystem 1008 may store the device key and/or device ID according to the protocols of the TPM. If the device does not include a TPM, the device or the building subsystem 1008 may store the device key and/or device ID in a file and/or file field which may be stored in a secure storage location. Further, in some embodiments, the device ID may be stored with BIOS software of the device. For example, a serial number of BIOS software may become and/or may be updated with the device ID.

In various embodiments, the device key and/or the device ID are uploaded to registration service 1102 (e.g., an IoT hub such as AZURE® IoT Hub). In some embodiments, the registration service 1102 is configured to store the device key and the device ID in secure permanent storage and/or may be stored by security service 1027 (e.g., by a security API). In some embodiments, a manufacturer and/or any other individual may register the device key and the device ID with registration service 1102 (e.g., via the web service 1100). In various embodiments, the device key and the device ID are linked to a particular profile associated with the building subsystem 1008 or device and/or a particular user profile (e.g., a particular user). In this regard, a device (or the building subsystem 1008) can be associated with a particular user. In various embodiments, the device key and the device ID make up the profile for device. The profile may be registered as a device that has been manufactured and/or provisioned but has not yet been purchased by an end user.

In various embodiments, the registration service 1102 adds and/or updates a device in a building hub device registry. In various embodiments, the registration service 1102 may determine if the device is already registered, can set various authentication values (e.g., device ID, device key), and can update the building hub device registry. In a similar manner, the registration service 1102 can update a document database with the various device registration information.

In some embodiments, the registration service 1102 can be configured to create a virtual representation (e.g., "digital twins" or "shadow records") of each object entity (e.g., person, room, building subsystem, device, and the like) in the building within the cloud building management platform 1010. In some embodiments, the virtual representations are smart entities that include attributes defining or characterizing the corresponding object and are associated to the corresponding object entity via relational entities defining the relationship of the object and the smart entity representation thereof. In some embodiments, the virtual representations maintain shadow copies of the object entities with versioning information so that entity service 1024 can store not only the most recent update of an attribute (e.g., a dynamic attribute) associated with the object, but records of previous states of the attributes (e.g., dynamic attributes) and/or entities. For example, the shadow record may be created as a type of data entity that is related to a linked data entity corresponding to the dynamic attribute of the object entity (e.g., the person, room, building subsystem, device, and the like). For example, the shadow entity may be associated with the linked data entity via a relational entity (e.g., isLinked, hasStorage, hasOperation, and the like). In this case, the shadow entity may be used to determine additional analytics for the data point of the dynamic attribute. For example, the shadow entity may be used to determine an average value, an expected value, or an abnormal value of the data point from the dynamic attribute.

The management service 1104 may create, modify, or update various attributes, data entities, and/or relational entities of the objects managed by the entity service 1024 for each entity rather than per class or type of entity. This allows for separate processing/analytics for each individual entity rather than only to a class or type of entity. Some attributes (or data entities) may correspond to, for example, the most recent value of a data point provided to BMS 1000 or Cloud building management platform 1010 via the raw data samples and/or timeseries data. For example, the "Current indoor temperature" dynamic attribute of the "Thermostat" object entity 802 in the example discussed above may be the most recent value of indoor temperature provided by the Thermostat device. The management service 706 can use the relational entities of the entity data for Thermostat to determine where to update the data of the attribute.

For example, the management service 1104 may determine that a data entity (e.g., AI 201-01) is linked to the "Current indoor temperature" dynamic attribute of Thermostat via an isLinked relational entity. In this case, the management service 1104 may automatically update the attribute data in the linked data entity. Further, if a linked data entity does not exist, the management service 1104 can create a data entity (e.g., AI 201-01) and an instance of the isLinked relational entity 1224 to store and link the "Current indoor temperature" dynamic attribute of Thermostat therein. Accordingly, processing/analytics for the Thermostat 1202 may be automated. As another example, a "most recent view" attribute (or linked data entity) of a webpage object entity may indicate the most recent time at which the webpage was viewed. The management service 1104 can use the entity data from a related click tracking system object entity or web server object entity to determine when the most recent view occurred and can automatically update the "most recent view" attribute (or linked data entity) of the webpage entity accordingly.

Other data entities and/or attributes may be created and/or updated as a result of an analytic, transformation, calculation, or other processing operation based on the raw data and/or entity data. For example, management service 1104 can use the relational entities in entity data to identify a related access control device (e.g., a card reader, a keypad, etc.) at the entrance/exit of a building object entity. The management service 1104 can use raw data received from the identified access control device to track the number of occupants entering and exiting the building object entity (e.g., via related card entities used by the occupants to enter and exit the building). The management service 706 can update a "number of occupants" attribute (or corresponding data entity) of the building object each time a person enters or exits the building using a related card entity, such that the "number of occupants" attribute (or data entity) reflects the current number of occupants within the building object. As another example, a "total revenue" attribute associated with a product line object may be the summation of all the revenue generated from related point of sales entities. The management service 1104 can use the raw data received from the related point of sales entities to determine when a sale of the product occurs, and can identify the amount of revenue generated by the sales. The management service 1104 can then update the "total revenue" attribute (or related data entity) of the product line object by adding the most recent sales revenue from each of the related point of sales entities to the previous value of the attribute.

In some embodiments, management service 1104 may use derived timeseries data generated from the timeseries service 1030 to update or create a data entity (e.g., Daily Average 1) that uses or stores the data points in the derived timeseries data. For example, the derived timeseries data may include a virtual data point corresponding to the daily average steps calculated by the timeseries service 1030, and the management service 1104 may update the data entity or entities that store or use the data corresponding to the virtual data point as determined via the relational entities. In some embodiments, if a data entity corresponding to the virtual data point does not exist, the management service 1104 may automatically create a corresponding data entity and one or more relational entities that describe the relationship between the corresponding data entity and other entities.

In some embodiments, the management service 1104 uses entity data and/or raw data from multiple different data sources to update the attributes (or corresponding data entities) of various object entities. For example, an object entity representing a person (e.g., a person's cellular device or other related object entity) may include a "risk" attribute that quantifies the person's level of risk attributable to various physical, environmental, or other conditions. The management service 1104 can use relational entities of the person object entity to identify a related card device and/or a related card reader from a related building object entity (e.g., the building in which the person works) to determine the physical location of the person at any given time. The management service 1104 can determine from raw data (e.g., time that the card device was scanned by the card reader) or derived timeseries data (e.g., average time of arrival) whether the person object is located in the building or may be in transit to the building. The management service 1104 can associate weather data from a weather service in the region in which the building object entity is located with the building object entity, and analytics service 1028 can generate a risk score for the possibility that any severe weather is approaching the person's location based on the associated weather data, building entity, and person entity. Similarly, the management service 1104 can associate building data from related building entities with the building object entity, and the analytics service 1028 can determine whether the building in which the person is located is experiencing any emergency conditions (e.g., fire, building lockdown, etc.) or environmental hazards (e.g., detected air contaminants, pollutants, extreme temperatures, etc.) that could increase the person's level of risk. The management service 1104 can provide these and other types of data to the analytics service 1028 as inputs to a risk function that calculates the value of the person object's "risk" attribute and can update the person object (or related device entity of the person object) accordingly.

In some embodiments, the management service 1104 can be configured to synchronize configuration settings, parameters, and other device-specific or object-specific information between the entities and the cloud building management platform 1010. In some embodiments, the synchronization occurs asynchronously. The management service 1104 can be configured to manage device properties dynamically. The device properties, configuration settings, parameters, and other device-specific information can be synchronized between the smart entities created by and stored within the cloud building management platform 1010.

In some embodiments, the management service 1104 is configured to manage a manifest for each of the building subsystems 1008 (or devices therein). The manifest may include a set of relationships between the building subsystems 1008 and various entities. Further, the manifest may indicate a set of entitlements for the building subsystems 1008 and/or entitlements of the various entities and/or other entities. The set of entitlements may allow a BMS 1000, the building subsystem 1008 and/or a user to perform certain actions within the building or (e.g., control, configure, monitor, and/or the like).

Still referring to FIG. 11, the transformation service 1106 can provide data virtualization, and can transform various predefined standard data models for entities in a same class or type to have the same entity data structure, regardless of the object, device, or Thing that the entity represents. For example, each object entity under an object class may include a location attribute, regardless of whether or not the location attribute is used or even generated. Thus, if an application is later developed requiring that each object entity includes a location attribute, manual mapping of heterogeneous data of different entities in the same class may be avoided. Accordingly, interoperability and scalability of applications may be improved.

In some embodiments, the transformation service 1106 can provide entity matching, cleansing, and correlation so that a unified cleansed view of the entity data including the entity related information (e.g., relational entities) can be provided. The transformation service 1106 can support semantic and syntactic relationship description in the form of standardized relational entities between the various entities. This may simplify machine learning because the relational entities themselves provide all the relationship description between the other entities. Accordingly, the rich set of pre-built entity models and standardized relational entities may provide for rapid application development and data analytics.

Still referring to FIG. 11, the search service 1108 provides a unified view of product related information in the form of the entity graph, which correlates entity relationships (via relational entities) among multiple data sources (e.g., CRM, ERP, MRP and the like). In some embodiments, the search service 1108 is based on a schema-less and graph based indexing architecture. The search service 1108 facilitates simple queries without having to search multiple levels of the hierarchical tree of the entity graph. For example, search service 1108 can return results based on searching of entity type, individual entities, attributes, or even relational entities without requiring other levels or entities of the hierarchy to be searched.

Timeseries Data Platform Service

Figure 13:
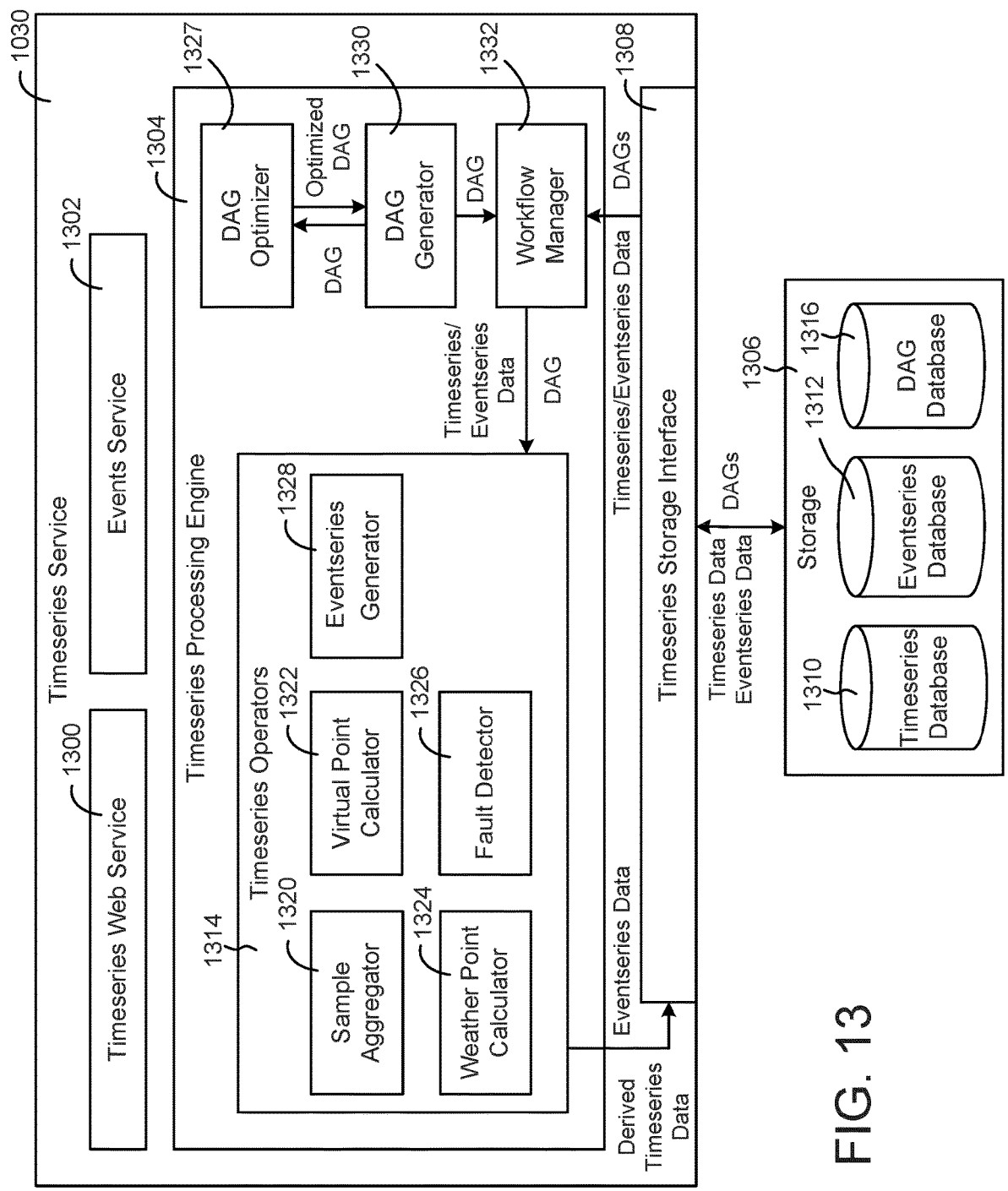
FIG. 13 is a block diagram illustrating the timeseries service of FIG. 10 in greater detail, according to an exemplary embodiment.

Referring now to FIG. 13, a block diagram illustrating the timeseries service 1030 in greater detail is shown, according to some embodiments. Timeseries service 1030 can include a timeseries web service 1300, an events service 1302, a timeseries processing engine 1304, and a timeseries storage interface 1308. The timeseries web service 1300 can be configured to interact with web-based applications to send and/or receive timeseries data. In some embodiments, the timeseries web service 1300 provides timeseries data to web-based applications. For example, if one or more of the applications 1012 are web-based applications, the timeseries web service 1300 can provide derived timeseries data and/or raw timeseries data to the web-based applications. In some embodiments, the timeseries web service 1300 receives raw timeseries data from a web-based data collector. For example, if the data collector 1022 is a web-based application, the timeseries web service 1300 can receive raw data samples or raw timeseries data from the data collector 1022. In some embodiments, the timeseries web service 1300 and the entity service web service 1100 may be integrated as parts of the same web service.

The timeseries storage interface 1308 can be configured to store and read samples of various timeseries (e.g., raw timeseries data and derived timeseries data) and eventseries (described in greater detail below). The timeseries storage interface 1308 can interact with the storage 1026. For example, timeseries storage interface 1308 can retrieve timeseries data from a timeseries database 1310 within the storage 1306. In some embodiments, the timeseries storage interface 1308 reads samples from a specified start time or start position in the timeseries to a specified stop time or a stop position in the timeseries. Similarly, the timeseries storage interface 1308 can retrieve eventseries data from an eventseries database 1312 within the storage 1306. Timeseries storage interface 1308 can also store timeseries data in timeseries database 1310 and can store eventseries data in the eventseries database 1312. Advantageously, timeseries storage interface 1308 provides a consistent interface which enables logical data independence.

In some embodiments, the timeseries storage interface 1308 stores timeseries as lists of data samples, organized by time. For example, the timeseries storage interface 1308 can store timeseries in the following format:

[<key, timestamp$_1$, value$_1$>, <key, timestamp$_2$, value$_2$>, <key, timestamp$_3$, value$_3$>]

where key is an identifier of the source of the data samples (e.g., timeseries ID, sensor ID, device ID, etc.), timestamp$_i$ identifies a time associated with the ith sample, and value$_i$ indicates the value of the ith sample.

In some embodiments, the timeseries storage interface 1308 stores eventseries as lists of events having a start time, an end time, and a state. For example, the timeseries storage interface 916 can store eventseries in the following format:

[<eventID$_1$, start_timestamp$_1$, end_timestamp$_1$, state$_1$>, . . . , <eventID$_N$, start_timestamp$_N$, end_timestamp$_N$, state$_N$>]

where eventID$_i$ is an identifier of the ith event, start_timestamp$_i$ is the time at which the ith event started, end_timestamp$_i$ is the time at which the ith event ended, state$_i$ describes a state or condition associated with the ith event (e.g., cold, hot, warm, etc.), and N is the total number of events in the eventseries.

In some embodiments, the timeseries storage interface 1308 stores timeseries and eventseries in a tabular format. Timeseries storage interface 1308 can store timeseries and eventseries in various tables having a column for each attribute of the timeseries/eventseries samples (e.g., key, timestamp, value). The timeseries tables can be stored in timeseries database 1310, whereas the eventseries tables can be stored in the eventseries database 1312. In some embodiments, the timeseries storage interface 1308 caches older data to the storage 1026 but stores newer data in RAM. This may improve read performance when the newer data are requested for processing.

In some embodiments, the timeseries storage interface 1308 omits one or more of the attributes when storing the timeseries samples. For example, the timeseries storage interface 1308 may not need to repeatedly store the key or timeseries ID for each sample in the timeseries. In some embodiments, the timeseries storage interface 1308 omits timestamps from one or more of the samples. If samples of a particular timeseries have timestamps at regular intervals (e.g., one sample each minute), the timeseries storage interface 1308 can organize the samples by timestamps and store the values of the samples in a row. The timestamp of the first sample can be stored along with the interval between the timestamps. The timeseries storage interface 1308 can determine the timestamp of any sample in the row based on the timestamp of the first sample and the position of the sample in the row.

In some embodiments, the timeseries storage interface 1308 stores one or more samples with an attribute indicating a change in value relative to the previous sample value. The change in value can replace the actual value of the sample when the sample is stored in the timeseries database 1310. This allows timeseries storage interface 1308 to use fewer bits when storing samples and their corresponding values. The timeseries storage interface 1308 can determine the value of any sample based on the value of the first sample and the change in value of each successive sample.

In some embodiments, the timeseries storage interface 1308 invokes entity service 1024 to create data entities in which samples of timeseries data and/or eventseries data can be stored. The data entities can include JSON objects or other types of data objects to store one or more timeseries samples and/or eventseries samples. The timeseries storage interface 1308 can be configured to add samples to the data entities and read samples from the data entities. For example, the timeseries storage interface 1308 can receive a set of samples from the data collector 1022, the entity service 1024, the timeseries web service 1300, the events service 1302, and/or the timeseries processing engine 1304. The timeseries storage interface 1308 can add the set of samples to a data entity by sending the samples to entity service 1024 to be stored in the data entity, for example, or may directly interface with the data entity to add/modify the sample to the data entity.

The timeseries storage interface 1308 can use data entities when reading samples from the storage 1026. For example, timeseries storage interface 1308 can retrieve a set of samples from the storage 1026 or from entity service 1024, and add the samples to a data entity (e.g., directly or via the entity service 1024). In some embodiments, the set of samples include all samples within a specified time period (e.g., samples with timestamps in the specified time period) or eventseries samples having a specified state. The timeseries storage interface 1308 can provide the samples in the data entity to the timeseries web service 1300, the events service 1302, the timeseries processing engine 1304, the applications 1012, and/or other components configured to use the timeseries/eventseries samples.

Still referring to FIG. 13, the timeseries processing engine 1304 is shown to include several the timeseries operators 1314. The timeseries operators 1314 can be configured to apply various operations, transformations, or operations to one or more input timeseries to generate output timeseries and/or eventseries. The input timeseries can include raw timeseries data and/or derived timeseries data. The timeseries operators 1314 can be configured to calculate aggregate values, averages, or apply other mathematical operations to the input timeseries. In some embodiments, the timeseries operators 1314 generate virtual point timeseries by combining two or more input timeseries (e.g., adding the timeseries together), creating multiple output timeseries from a single input timeseries, or applying mathematical operations to the input timeseries. In some embodiments, the timeseries operators 1314 perform data cleansing operations or deduplication operations on an input timeseries. In some embodiments, the timeseries operators 1314 use the input timeseries to generate eventseries based on the values of the timeseries samples. The output timeseries can be stored as derived timeseries data in the storage 1306 as one or more timeseries data entities. Similarly, the eventseries can be stored as eventseries data entities in the storage 1306.

In some embodiments, the timeseries operators 1314 do not change or replace the raw timeseries data, but rather generate various "views" of the raw timeseries data (e.g., as separate data entities) with corresponding relational entities defining the relationships between the raw timeseries data entity and the various views data entities. The views can be queried in the same manner as the raw timeseries data. For example, samples can be read from the raw timeseries data entity, transformed to create the view entity, and then provided as an output. Because the transformations used to create the views can be computationally expensive, the views can be stored as "materialized view" data entities in timeseries database 1310. Instances of relational entities can be created to define the relationship between the raw timeseries data entity and the materialize view data entities. These materialized views are referred to as derived data timeseries throughout the present disclosure.

The timeseries operators 1314 can be configured to run at query time (e.g., when a request for derived data timeseries is received) or prior to query time (e.g., when new raw data samples are received, in response to a defined event or trigger, etc.). This flexibility allows the timeseries operators 1314 to perform some or all of their operations ahead of time and/or in response to a request for specific derived data timeseries. For example, the timeseries operators 1314 can be configured to pre-process one or more timeseries that are read frequently to ensure that the timeseries are updated whenever new data samples are received, and the pre-processed timeseries may be stored in a corresponding data entity for retrieval. However, the timeseries operators 1314 can be configured to wait until query time to process one or more timeseries that are read infrequently to avoid performing unnecessary processing operations.

In some embodiments, the timeseries operators 1314 are triggered in a particular sequence defined by a directed acyclic graph (DAG). The DAG may define a workflow or sequence of operations or transformations to apply to one or more input timeseries. For example, the DAG for a raw data timeseries may include a data cleansing operation, an aggregation operation, and a summation operation (e.g., adding two raw data timeseries to create a virtual point timeseries). The DAGs can be stored in a DAG database 1316 within the storage 1026, or internally within the timeseries processing engine 1304. DAGs can be retrieved by the workflow manager 1318 and used to determine how and when to process incoming data samples. Exemplary systems and methods for creating and using DAGs are described in greater detail below.

The timeseries operators 1314 can perform aggregations for dashboards, cleansing operations, logical operations for rules and fault detection, machine learning predictions or classifications, call out to external services, or any of a variety of other operations which can be applied to timeseries data. The operations performed by the timeseries operators 1314 are not limited to timeseries data. The timeseries operators 1314 can also operate on event data or operate as a billing engine for a consumption or tariff-based billing system. The timeseries operators 1314 are shown to include a sample aggregator 1320, a virtual point calculator 1322, a weather point calculator 1324, a fault detector 1326, and an eventseries generator 1328. These operators are described in further detail in U.S. patent application Ser. No. 15/644,519 filed on Jun. 7, 2017, the entire disclosure of which is incorporated by reference herein.

Still referring to FIG. 13, the timeseries processing engine 1304 is shown to include a DAG optimizer 1327. The DAG optimizer 1327 can be configured to combine multiple DAGs or multiple steps of a DAG to improve the efficiency of the operations performed by the timeseries operators 1314. For example, suppose that a DAG has one functional block which adds "Timeseries A" and "Timeseries B" to create "Timeseries C" (i.e., A+B=C) and another functional block which adds "Timeseries C" and "Timeseries D" to create "Timeseries E" (i.e., C+D=E). The DAG optimizer 1327 can combine these two functional blocks into a single functional block which computes "Timeseries E" directly from "Timeseries A," "Timeseries B," and "Timeseries D" (i.e., E=A+B+D). Alternatively, both "Timeseries C" and "Timeseries E" can be computed in the same functional block to reduce the number of independent operations required to process the DAG.

In some embodiments, the DAG optimizer 1327 combines DAGs or steps of a DAG in response to a determination that multiple DAGs or steps of a DAG will use similar or shared inputs (e.g., one or more of the same input timeseries). This allows the inputs to be retrieved and loaded once rather than performing two separate operations that both load the same inputs. In some embodiments, the DAG optimizer 1327 schedules timeseries operators 1314 to nodes where data is resident in memory in order to further reduce the amount of data required to be loaded from the timeseries database 1310.

The timeseries processing engine 1304 can include a directed acyclic graph (DAG) generator 1330. The DAG generator 1330 can be configured to generate one or more DAGs for each raw data timeseries. Each DAG may define a workflow or sequence of operations which can be performed by the timeseries operators 906 on the raw data timeseries. When new samples of the raw data timeseries are received, the workflow manager 1332 can retrieve the corresponding DAG and use the DAG to determine how the raw data timeseries should be processed. In some embodiments, the DAGs are declarative views which represent the sequence of operations applied to each raw data timeseries. The DAGs may be designed for timeseries rather than structured query language (SQL).

In some embodiments, DAGs apply over windows of time. For example, the timeseries processing operations defined by a DAG may include a data aggregation operation that aggregates raw data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the data samples of timeseries provided as an input to the DAG.

In operation, the sample aggregator 1320 can use the DAG to identify the duration of the time window (e.g., an hour, a day, a week, etc.) over which the data aggregation operation will be performed. The sample aggregator 1320 can use the timestamps of the data samples in the timeseries provided as an input to the DAG to identify the location of the time window (i.e., the start time and the end time). The sample aggregator 1320 can set the start time and end time of the time window such that the time window has the identified duration and includes the timestamps of the data samples. In some embodiments, the time windows are fixed, having predefined start times and end times (e.g., the beginning and end of each hour, day, week, etc.). In other embodiments, the time windows may be sliding time windows, having start times and end times that depend on the timestamps of the data samples in the input timeseries.

Figure 14:
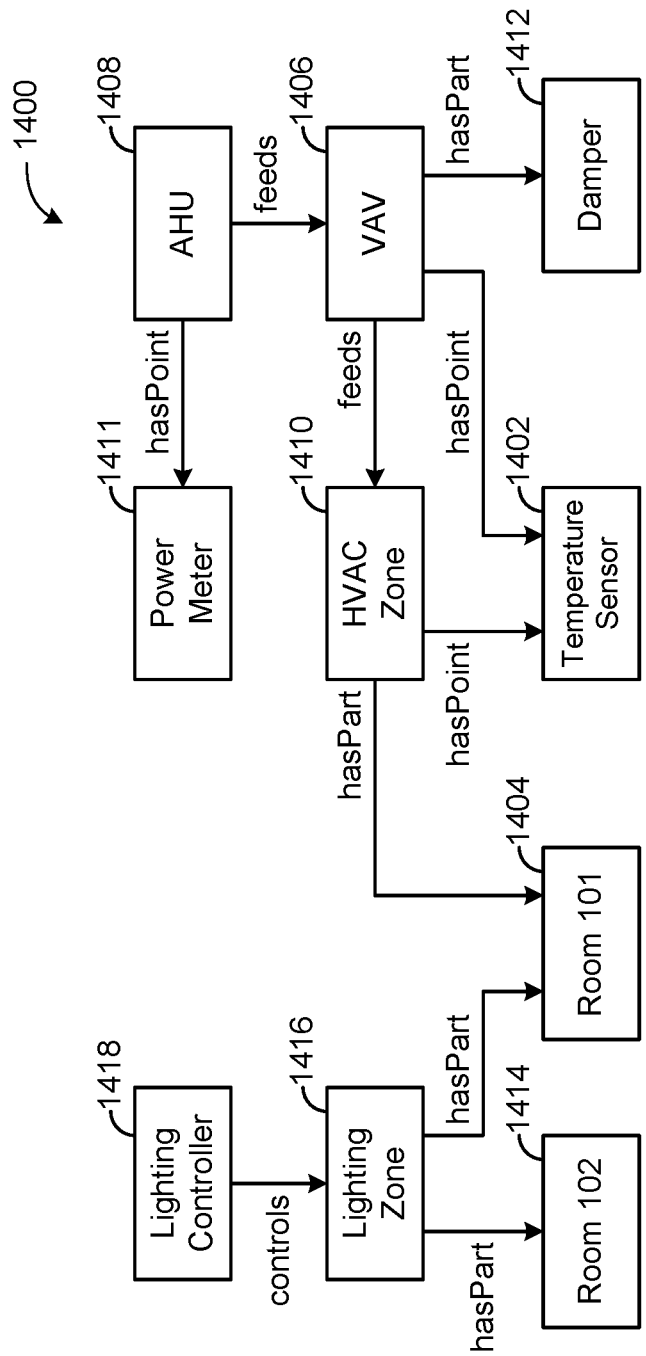
FIG. 14 is an example entity graph of entity data, according to an exemplary embodiment.

FIG. 14 is an example entity graph of entity data according to an embodiment of the present disclosure. The example of FIG. 14 assumes that an HVAC fault detection application has detected an abnormal temperature measurement with respect to Temperature Sensor 1402. However, the Temperature Sensor 1402 itself may be operating properly, but may rely on various factors, conditions, and other systems and devices to measure the temperature properly. Accordingly, for example, the HVAC fault detection application may need to know the room 1404 in which the Temperature Sensor 1402 is located, the corresponding temperature setpoint, the status of the VAV 1406 that supplies conditioned air to the room 1404, the status of the AHU 1408 that feeds the VAV 1406, the status of the vents in the HVAC zone 1410, etc., in order to pin point the cause of the abnormal measurement. Thus, the HVAC fault detection application may require additional information from various related subsystems and devices (e.g., entity objects), as well as the zones and rooms (e.g., entity objects) that the subsystems and devices are configured to serve, to properly determine or infer the cause of the abnormal measurement.

Referring to FIG. 14, entity graph 1400 shows the relationship between the Temperature Sensor 1402 and related entities via relational entities (e.g., feeds, hasPoint, hasPart, Controls, etc.). For example, the entity graph 1400 shows that the Temperature Sensor 1402 provides temperature readings (e.g., hasPoint) to the VAV 1406 and the HVAC Zone 1410. An AHU 1408 provides (e.g., feeds) the VAV 1406 with chilled and/or heated air. The AHU 1408 receives/provides power readings (e.g., hasPoint) from/to a Power Meter 1411. The VAV 1406 provides (e.g., feeds) air to HVAC Zone 1410 using (e.g., hasPart) a Damper 1412. The HVAC Zone 1410 provides the air to Room 1404. Further, Rooms 1404 and 1414 are located in (e.g., hasPart) Lighting Zone 1416, which is controlled (e.g., controls) by Lighting Controller 1418.

Accordingly, in the example of FIG. 14, in response to receiving the faulty measurement from the Temperature Sensor 142, the HVAC fault detection application and/or the analytics service 1028 can determine from the entity graph that the fault could be caused by some malfunction in one or more of the other related entities, and not necessarily a malfunction of the Temperature Sensor 1402. Thus, the HVAC fault detection application and/or the analytics service 1028 can further investigate into the other related entities to determine or infer the most likely cause of the fault.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. In addition, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system with artificial intelligence based control of a building, the system comprising:
   a processing system comprising one or more processing circuits and one or more non-transitory memory devices, wherein the processing system is configured to implement a plurality of data collectors, a learning engine, and a plurality of cognitive agents:
   wherein the plurality of data collectors are configured to:
      receive data from a plurality of subsystems of the building; and
      generate a plurality of data streams based on the data, wherein a data stream of the plurality of data streams is associated with each of the plurality of subsystems of the building;
   wherein the learning engine is configured to:
      identify a building event occurring at the building by correlating data of the plurality of data streams for the plurality of subsystems; and
      provide the building event to the plurality of cognitive agents;
   wherein the plurality of cognitive agents comprise a first cognitive agent configured to operate a first building subsystem of a first type, wherein the plurality of cognitive agents comprise a second cognitive agent configured to operate a second building subsystem of a second type different than the first type, wherein operation of the first building subsystem by the first cognitive agent and operation of the second building subsystem by the second cognitive agent together achieve a common outcome responsive to the building event.

2. The system of claim 1, wherein each of the plurality of cognitive agents are configured to generate a control decision based on the building event by generating the control decision with a reactive function, wherein the reactive function is unique to a type of building subsystem that each of the plurality of cognitive agents is associated with.

3. The system of claim 1, wherein the building event of the building is an emergency event indicating that the building is experiencing an emergency.

4. The system of claim 1, wherein the learning engine is configured to identify the building event of the building by correlating data from the plurality of data streams for the plurality of subsystems by:
   extracting one or more features from the plurality of data streams, wherein the one or more features comprises a portion of the plurality of data streams;
   transforming the one or more features; and
   identifying the building event by correlating the one or more features by performing machine learning on the one or more features.

5. The system of claim 1, wherein the plurality of data streams comprises an augmented reality data stream of an augmented reality system;
   wherein the learning engine is configured to:
      identify a building component of interest to user based on the augmented reality data stream;
      extract one or more features from the plurality of data streams of the plurality of subsystems, the one or more features being associated with the building component of interest;
      determine, based on the one or more features, a reason that the building component of interest is of interest to the user; and
      provide the reason to the augmented reality system, wherein the augmented reality system is configured to present the reason to the user.

6. The system of claim 1, wherein the processing system is configured to implement a prioritization engine, wherein the prioritization engine is configured to:
   generate a prioritization function for each of the plurality of cognitive agents; and
   send the prioritization function of each of the plurality of cognitive agents to the plurality of cognitive agents;
   wherein the plurality of cognitive agents are configured to determine whether to override an operation of a particular subsystem of the plurality of subsystems based on the prioritization function and data of the particular subsystem or the building event.

7. The system of claim 1, wherein the plurality of data streams comprise a natural language data stream of a natural language input system;
   wherein the learning engine is configured to:
      determine, based on the natural language data stream, a particular event state of interest to the user, wherein the particular event of interest comprises a building draft event indicating that the building is experiencing an air draft; and
      provide the building draft event to each of the plurality of cognitive agents.

8. The system of claim 7, wherein one of the plurality of cognitive agents are associated with a security subsystem of the plurality of subsystems, wherein the one of the plurality of cognitive agents associated with the security subsystem is configured to determine, based on data of the security subsystem, whether one or more doors or windows are open in response to a reception of the building draft event; and
   wherein a second one of the plurality of cognitive agents is associated with an HVAC subsystem of the plurality of subsystems, wherein the second one of the plurality of cognitive agents associated with the HVAC subsystem is configured to determine, based on data of the HVAC subsystem, whether a damper of the HVAC subsystem is stuck in response to receiving the building draft state.

9. The system of claim 1, wherein the plurality of subsystems comprise a fire detection subsystem, a video surveillance subsystem, and a heating, ventilation, and air conditioning (HVAC) subsystem;
   wherein the learning engine is configured to identify the building event of the building by correlating data of a first data stream of the fire detection subsystem, a second data stream of the video surveillance subsystem, and a third data stream of the HVAC subsystem, wherein the building event is a fire event indicative of a fire in the building;
   wherein each of the plurality of cognitive agents is configured to control the fire in the building in response to a reception of the fire event.

10. The system of claim 9, wherein each of the plurality of cognitive agents is configured to generate a particular control decision based on the fire event by determining the particular control decision based on a plurality of reactive functions, the plurality of reactive functions comprising a reactive function for each of the plurality of cognitive agents, wherein the plurality of reactive functions comprise:
   a first reactive function that generates the particular control decision for the HVAC subsystem, the particular control decision for the HVAC subsystem causing the HVAC subsystem to operate to reduce an oxygen level of an unoccupied area of the building;
   a second reactive function that generates the particular control decision for the HVAC subsystem, the particular control decision for the HVAC subsystem causing the HVAC subsystem to operate to exhaust smoke from exit routes of the building; and
   a third reactive function that generates the particular control decision for a human-machine interaction system, the particular control decision for the human-machine interaction system causing the human-machine interaction system to provide occupants of the occupied area with details regarding the exit routes.

11. The system of claim 9, wherein the building state is a fire event, wherein one of the plurality of cognitive agents is associated with a plurality of dampers of the HVAC subsystem, wherein the one of the plurality of cognitive agents is configured to:
   receive a humidity value of outdoor air outside the building, wherein the humidity value is measured by the HVAC subsystem;
   determine whether the humidity value of outdoor air is greater than a predefined threshold;
   generate a control decision to open dampers in an area of the building associated with the fire in response to a determination that the humidity value of outdoor air is greater than the predefined threshold and in response to the reception of the fire event; and
   operate the plurality of dampers to open the plurality of dampers based on the control decision to open the plurality of dampers.

12. A method for controlling a building with artificial intelligence, the method comprising:

receiving, by a plurality of data collectors, data from a plurality of subsystems of the building;

generating, by the plurality of data collectors, a plurality of data streams based on the data, wherein a data stream of the plurality of data streams is associated with each of the plurality of subsystems of the building;

identifying, by a learning engine, a building event occurring at the building by correlating data of the plurality of data streams for the plurality of subsystems;

providing, by the learning engine, the building event to a plurality of cognitive agents;

receiving, by each of the plurality of cognitive agents, the building event from the learning engine;

operating, by a first cognitive agent of the plurality of cognitive agents, a first building subsystem of a first type; and operating, by a second cognitive agent of the plurality of cognitive agents, a second building subsystem of a second type, wherein the second type is different than the first type, wherein operation of the first building subsystem by the first cognitive agent and operation of the second building subsystem by the second cognitive agent together achieve a common outcome responsive to the building event.

13. The method of claim 12, further comprising generating, by each of the plurality of cognitive agents, a control decision based on the building event comprises generating the control decision with a reactive function, wherein the reactive function is unique to a type of building subsystem that each of the plurality of cognitive agents is associated with.

14. The method of claim 12, wherein the building event of the building is an emergency event indicating that the building is experiencing an emergency.

15. The method of claim 12, wherein the plurality of data streams comprises an augmented reality data stream of an augmented reality system;
wherein the method further comprises:
identifying, by the learning engine, a building component of interest to a user based on the augmented reality data stream;
extracting, by the learning engine, one or more features from the plurality of data streams of the plurality of subsystems, the one or more features being associated with the building component of interest;
determining, by the learning engine, based on the one or more features, a reason that the building component of interest is of interest to the user; and
providing, by the learning engine, the reason to the augmented reality system, wherein the augmented reality system is configured to present the reason to the user.

16. The method of claim 12, wherein the plurality of subsystems comprise a fire detection subsystem, a video surveillance subsystem, and a heating, ventilation, and air conditioning (HVAC) subsystem;
wherein identifying, by the learning engine, the building event of the building comprises correlating data of a first data stream of the fire detection subsystem, a second data stream of the video surveillance subsystem, and a third data stream of the HVAC subsystem, wherein the building event is a fire event indicative of a fire in the building;
wherein the method further comprises controlling, by each of the plurality of cognitive agents, the fire in the building in response to a reception of the fire event by generating a particular control decision based on the fire event by determining the particular control decision based on one of a plurality of reactive functions, the plurality of reactive functions comprising a reactive function for each of the plurality of cognitive agents, wherein the plurality of reactive functions comprise:
a first reactive function that generates the particular control decision for the HVAC subsystem, the particular control decision for the HVAC subsystem causing the HVAC subsystem to operate to reduce an oxygen level of an unoccupied area of the building;
a second reactive function that generates the particular control decision for the HVAC subsystem, the particular control decision for the HVAC subsystem causing the HVAC subsystem to operate to exhaust smoke from exit routes of the building; and
a third reactive function that generates the particular control decision for a human-machine interaction system, the particular control decision for the human-machine interaction system causing the human-machine interaction system to provide occupants of the occupied area with details regarding the exit routes.

17. The method of claim 12, wherein the plurality of data streams comprise a natural language data stream of a natural language input system;
wherein the method further comprises:
determining, by the learning engine, based on the natural language data stream, a particular event of interest to the user, wherein the particular event of interest comprises a building draft event indicating that the building is experiencing an air draft; and
providing, by the learning engine, the building draft event to each of the plurality of cognitive agents.

18. The method of claim 17, wherein one of the plurality of cognitive agents is associated with a security subsystem of the plurality of subsystems;
wherein a second one of the plurality of cognitive agents is associated with an HVAC subsystem of the plurality of subsystems;
wherein the method further comprises:
determining, by the one of the plurality of cognitive agents associated with the security subsystem, based on data of the security subsystem, whether one or more doors or windows are open in response to a reception of the building draft event; and
determining, by the second one of the plurality of cognitive agents associated with the HVAC subsystem based on data of the HVAC subsystem, whether a damper of the HVAC subsystem is stuck in response to receiving the building draft event.

19. A building management system with artificial intelligence based control of a building, the system comprising:
a processing circuit configured to implement a plurality of data collectors, a learning engine, and a plurality of cognitive agents:
wherein the plurality of data collectors are configured to:
receive data from a plurality of subsystems of the building; and
generate a plurality of data streams based on the data, wherein a data stream of the plurality of data streams is associated with each of the plurality of subsystems of the building;
wherein the learning engine is configured to:
identify a building event occurring at the building by correlating data of the plurality of data streams for the plurality of subsystems, wherein the building event is an emergency event indicating that the building is experiencing an emergency; and provide the emergency event to the plurality of cognitive agents;

wherein the plurality of cognitive agents comprise a first cognitive agent configured to operate a first building subsystem of a first type, wherein the plurality of cognitive agents comprise a second cognitive agent configured to operate a second building subsystem of a second type different than the first type, wherein operation of the first building subsystem by the first cognitive agent and operation of the second building subsystem by the second cognitive agent together achieve a common outcome responsive to the building event.

20. The system of claim 19, wherein each of the plurality of cognitive agents is configured to generate a control decision based on the emergency event by generating the control decision with a reactive function, wherein the reactive function is unique to a type of building subsystem that each of the plurality of cognitive agents is associated with.

\* \* \* \* \*